United States Patent
Tsuchimoto et al.

(10) Patent No.: US 8,849,192 B2
(45) Date of Patent: Sep. 30, 2014

(54) METHOD OF DETERMINING RELIABILITY OF RECEIVED SIGNAL, METHOD OF CALCULATING CODE PHASE ERROR, AND APPARATUS FOR DETERMINING RELIABILITY OF RECEIVED SIGNAL

(75) Inventors: Kazuhiko Tsuchimoto, Shiojiri (JP); Hiroki Yoshioka, Matsumoto (JP); Fumikazu Sano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 520 days.

(21) Appl. No.: 13/280,272

(22) Filed: Oct. 24, 2011

(65) Prior Publication Data
US 2012/0100799 A1    Apr. 26, 2012

(30) Foreign Application Priority Data
Oct. 25, 2010   (JP) .................. 2010-238920

(51) Int. Cl.
*H04B 7/185* (2006.01)
*H04B 17/00* (2006.01)
*H04B 1/74* (2006.01)

(52) U.S. Cl.
CPC .............. *H04B 17/0075* (2013.01); *H04B 1/74* (2013.01); *H04B 7/18534* (2013.01); *H04B 7/18513* (2013.01)
USPC .......................................... 455/12.1; 455/427

(58) Field of Classification Search
CPC ........... H04B 7/18513; H04B 7/18517; H04B 7/18534; H04B 1/74
USPC ............. 455/3.03, 12.1, 13.2, 98, 427, 404.1, 455/404.2, 456.1
See application file for complete search history.

(56) References Cited

U.S. PATENT DOCUMENTS

| | | | |
|---|---|---|---|
| 6,933,886 B1 * | 8/2005 | Sahai et al. | 342/357.63 |
| 6,954,485 B1 * | 10/2005 | Hashimoto et al. | 375/147 |
| 8,547,225 B2 * | 10/2013 | Tillotson | 340/539.19 |
| 2008/0122692 A1 * | 5/2008 | Houtman | 342/357.12 |
| 2009/0168925 A1 * | 7/2009 | Shirai | 375/340 |

FOREIGN PATENT DOCUMENTS

| | | |
|---|---|---|
| JP | 2008-170214 A | 7/2008 |
| JP | 2009-159261 A | 7/2009 |

\* cited by examiner

*Primary Examiner* — Dominic E Rego
(74) *Attorney, Agent, or Firm* — Kilpatrick Townsend & Stockton LLP

(57) ABSTRACT

A method of determining reliability of a received signal is provided, which includes correlating a received signal from a satellite to a replica code, determining reliability of the received signal according to a predetermined reference using a first value and a second value, the first value being a correlation value of a peak phase obtained from the correlating and the second value being a correlation value of a phase delayed for a predetermined phase from the peak phase and changing the reference according to the satellite.

8 Claims, 41 Drawing Sheets

273

| GPS SATELLITE | DETERMINATION RANGE A (FLAG F1) | | DETERMINATION RANGE B (FLAG F2) | | DETERMINATION RANGE C (FLAG F3) | |
|---|---|---|---|---|---|---|
| | CENTER VALUE | WIDTH | CENTER VALUE | WIDTH | CENTER VALUE | WIDTH |
| S1 | 4 | 6 | 110 | 20 | 110 | 20 |
| S2 | 1 | 6 | 125 | 20 | 125 | 20 |
| S3 | 8 | 6 | 118 | 20 | 118 | 20 |
| ⋮ | ⋮ | ⋮ | ⋮ | ⋮ | ⋮ | ⋮ |

FIG.40

| SATELLITE GROUP | $\Delta PE \geq 0$ | $\Delta PE < 0$ |
| --- | --- | --- |
| FIRST SATELLITE GROUP (LARGE AMPLITUDE OF $\Delta PL$ VALUE) | $\theta p1$ | $\theta m1$ |
| SECOND SATELLITE GROUP (INTERMEDIATE AMPLITUDE OF $\Delta PL$ VALUE) | $\theta p2$ | $\theta m2$ |
| THIRD SATELLITE GROUP (SMALL AMPLITUDE OF $\Delta PL$ VALUE) | $\theta p3$ | $\theta m3$ |

HOWEVER, $\theta p1 < \theta p2 < \theta p3$
$\theta m1 > \theta m2 > \theta m3$

FIG.43

METHOD OF DETERMINING RELIABILITY OF RECEIVED SIGNAL, METHOD OF CALCULATING CODE PHASE ERROR, AND APPARATUS FOR DETERMINING RELIABILITY OF RECEIVED SIGNAL

This application claims priority to Japanese Patent Application No. 2010-238920, filed Oct. 25, 2010, the entirety of which is hereby incorporated by reference.

BACKGROUND

1. Technical Field

The present invention relates to a method of determining reliability of a received signal, a method of calculating a code phase error, and an apparatus for determining reliability of a received signal.

2. Related Art

As a positioning system using satellite signals, a GPS (Global Positioning System) is widely known, and is used in a receiving apparatus that is built into a portable phone or car navigation. The GPS performs a position calculation for obtaining position coordinates of the receiving apparatus and timepiece error, based on information on positions of a plurality of GPS satellites and pseudo distances from the respective GPS satellites to the receiving apparatus.

One of the main causes of error occurrence in calculating a position using a satellite signal may be a multipath. An environment where a multipath occurs is called a "multipath environment". The multipath environment is an environment where indirect wave signals, such as a reflected wave that is reflected from a building or the ground, a transmitted wave that is transmitted through an obstacle, a diffracted wave that is diffracted by an obstacle, and the like, are received as a multipath signal in superimposition with a direct wave signal from a source of the satellite signal (in the case of a GPS, a GPS satellite). In the multipath environment, the indirect wave signal becomes an error signal which makes decoding difficult, or a false code phase is calculated to cause an error that occurs during position calculation to be increased.

In order to solve the problem of the error that is caused by the multipath, for example, JP-A-2008-170214 discloses a technique of determining a positioning satellite that has a high possibility of being affected by the multipath as an inadequate positioning satellite and performing position calculation except for the inadequate positioning satellite.

One method for a multipath countermeasure may be a method that uses captured satellite signals in performing the position calculation to the exclusion of the multipath signal. This is because using the multipath signal in performing the position calculation may deteriorate the accuracy of position calculation. However, in a receiving environment such as an urban canyon environment where there are neighboring high-rise buildings, most of the received satellite signals may be the multipath signals. In this case, if all the multipath signals are excluded, the number of satellites that are required for the position calculation is unable to be secured. Accordingly, there is a demand for using satellite signals having high reliability, which are permissible for use in the position calculation, in performing the position calculation as much as possible.

SUMMARY

An advantage of some aspects of the invention is to provide a new structure for determining the quality of the received satellite signal.

According to a first aspect of the invention, there is provided a method of determining reliability of a received signal, which includes correlating a received signal from a satellite to a replica code; determining reliability of the received signal according to a predetermined reference using a first value and a second value, the first value being a correlation value of a peak phase obtained from the correlating and the second value being a correlation value of a phase delayed for a predetermined phase from the peak phase; and changing the reference according to the satellite.

According to another aspect of the invention, there is provided an apparatus for determining reliability of a received signal, which includes a correlator that correlates a received signal from a satellite to a replica code; a determination unit that determines reliability of the received signal according to a predetermined reference using a first value and a second value, the first value being a correlation value of a peak phase obtained by the correlator and the second value being a correlation value of a phase delayed for a predetermined phase from the peak phase; and a change unit that changes the reference according to the satellite.

According to the first and other aspects of the invention, a correlation of a received signal from a satellite and a replica code is performed. Further, the reliability of the received signal is determined according to a predetermined reference using a first value and a second value, the first value being a correlation value of a peak phase and the second value being a correlation value of a phase delayed for a predetermined phase from the peak phase, and the reference is changed according to the satellite.

Since an indirect wave has a long propagation distance from a positioning satellite to a receiver in comparison to a direct wave, it becomes a delayed signal with respect to the direct wave. Due to this, if the received signal is a multipath signal, the influence of the indirect wave appears greatly on the phase delayed for the predetermined phase from the peak phase, and thus the correlation value is increased. Accordingly, by focusing on the first value and the second value, the degree of influence that the indirect wave exerts on the direct wave can be determined, and thus from this, the quality of the received signal can be determined. Further, the degree of influence that the indirect wave exerts on the direct wave may differ according to the satellite, and thus by changing the reference according to the satellite, the reliability of the received signal can be determined more accurately. This method is useful in the case where the received signal is the multipath signal.

Further, according to a second aspect of the invention, in the method of determining reliability of a received signal according to the first aspect of the invention, the determining may include calculating an index value of a delay distance of an indirect wave against a direct wave using the first value and the second value, the indirect wave included in the received signal; and determining the reliability of the received signal as the reference which the index value satisfies a predetermined threshold value condition, wherein the changing comprises changing the threshold value condition according to the satellite.

According to the second aspect of the invention, an index value of a delay distance of an indirect wave against a direct wave is calculated, which is included in the received signal, using the first value and the second value. Further, the reliability of the received signal is determined according to the reference that the index value satisfies a predetermined threshold value condition. However, the threshold value condition is changed according to the satellite. By determining the threshold value for the index value of the delay distance, the degree of influence that the indirect wave exerts on the direct wave can be determined more appropriately. Further, by changing the threshold value condition according to the satellite, the accuracy of the reliability determination of the received signal can be heightened.

Further, according to a third aspect of the invention, in the method of determining reliability of a received signal according to the second aspect of the invention, the threshold value condition may be a condition determined based on a changing trend of the index value in case of calculating the index value by changing a phase difference between the direct wave and the indirect wave.

The size of the index value of the delay distance of the indirect wave against the direct wave may be changed according to the phase difference between the direct wave and the indirect wave. Due to this, in the third aspect of the invention, the threshold value condition is determined based on a changing trend of the index value in the case of calculating the index value by changing a phase difference between the direct wave and the indirect wave. Accordingly, the reliability of the received signal can be determined according to the threshold value condition according to the phase difference between the direct wave and the indirect wave which are included in the received signal.

Further, according to a fourth aspect of the invention, in the method of determining reliability of a received signal according to the third aspect of the invention, the threshold value condition may be determined for each group to which the satellite belongs based on the changing trend.

According to the fourth aspect of the invention, since the threshold value condition is determined for each group to which the satellite belongs based on the changing trend of the index value, the process can be simplified in comparison to a case where the threshold value conditions are individually determined with respect to all the satellites.

Further, according to a fifth aspect of the invention, in the method of determining reliability of a received signal according to the third or fourth aspect of the invention, a first threshold value condition in case where a type of interference of the indirect wave against the direct wave is an increased interference and a second threshold value condition in case where a type of interference is a decreased interference may be determined, and the determining may include detecting the type of the interference using the first value and a third value, the third value being a correlation value having a phase advanced for a predetermined phase from the peak phase, and determining the reliability of the received signal according to the threshold value condition that corresponds to the type of the interference of the first and second threshold value conditions.

According to the fifth aspect of the invention, the type of the interference of the indirect wave against the direct wave is detected using the first value and a third value that is a correlation value having a phase advanced for a predetermined phase from the peak phase, and the reliability of the received signal is determined according to the threshold value condition that corresponds to the type of the interference of the first and second threshold value conditions. It can be known that the type of the interference of the indirect wave against the direct wave is changed according to the phase difference between the direct wave and the indirect wave, and the changing trend of the index value of the delay distance differs according to the type of the interference. Accordingly, by determining the threshold value condition according to the type of the interference of the indirect wave against the direct wave and determining the reliability of the received signal according to the threshold value condition that corresponds to the type of the detected interference, the accuracy of the reliability determination of the received signal is heightened.

Further, according to a sixth aspect of the invention, in the method of determining reliability of a received signal according to the fifth aspect of the invention, the first threshold value condition may be determined so that an amplitude of a change of the index value and a threshold value for the index value have a negative correlation, and the second threshold value condition may be determined so that the amplitude of the change of the index value and the threshold value for the index value have a positive correlation.

As described above, according to the type of the interference of the indirect wave against the direct wave, the changing trend of the index value of the delay distance differs. For example, if the type of the interference is the increased interference, the index value tends to be changed in the decreasing direction, while if the type of the interference is the decreased interference, the index value tends to be changed in the increasing direction. Accordingly, in the sixth aspect of the invention, for example, by determining the first threshold value condition so that an amplitude of the change of the index value and the threshold value for the index value have a negative correlation and determining the second threshold value condition so that the amplitude of the change of the index value and the threshold value for the index value have a positive correlation, the threshold value condition is optimized according to the type of the interference.

Further, according to a seventh aspect of the invention, there may be provided a method of calculating a code phase error, which includes executing a method of determining reliability of the received signal according to any form of the first to sixth aspects of the invention; and calculating an error from a true code phase of the peak phase using the reliability determined by the method of determining reliability of the received signal.

According to the seventh aspect of the invention, an error from a true code phase of a peak phase is calculated using reliability that is determined by the above-described method of determining reliability of a received signal. Accordingly, by appropriately correcting the code phase using the code phase error that is obtained as above, it becomes possible to obtain the code phase that is near to the true code phase.

BRIEF DESCRIPTION OF THE DRAWINGS

The invention will be described with reference to the accompanying drawings, wherein like numbers reference like elements.

FIG. 40 is a diagram illustrating an example of the configuration of a flag determination range table.

FIG. 43 is a diagram illustrating an example of the configuration of a threshold value table for determining reliability.

DESCRIPTION OF EXEMPLARY EMBODIMENTS

Figure 1:
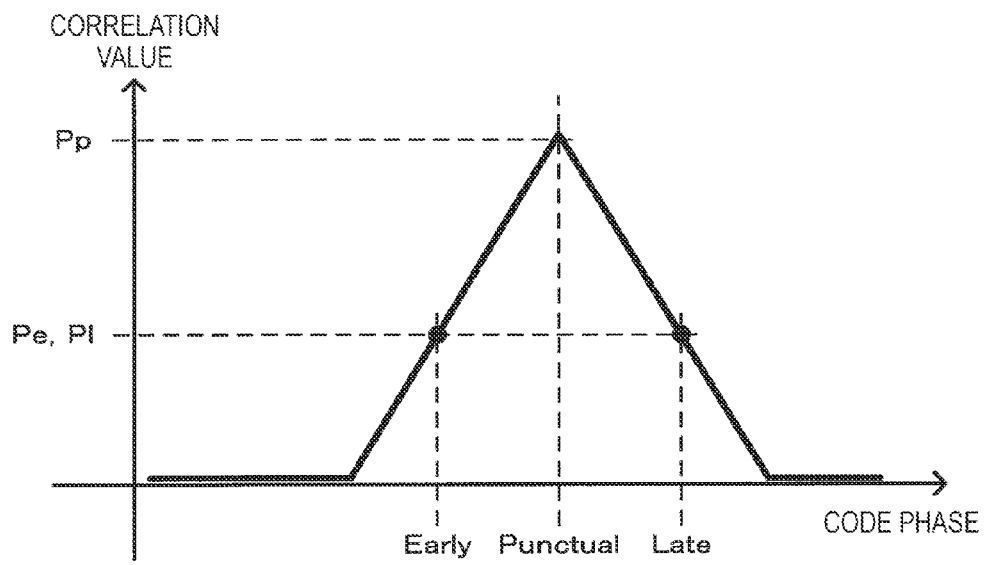
FIG. 1 is an explanatory diagram of peak detection of a correlation value.

Hereinafter, embodiments of the invention will be described in detail with reference to the accompanying drawings. The embodiments of the invention are embodiments using a GPS (Global Positioning System) that is a kind of satellite positioning system.

1. Principle

One purpose of the embodiment of the invention is to perform reliability determination of a received GPS satellite signal that is output from a GPS satellite. Further, another purpose of the invention is to calculate a code phase error that is an error which may be included in a detected code phase in detecting a code phase that is a phase of a diffusion code of a received GPS satellite signal.

A method of determining reliability of a received signal according to this embodiment is useful in the case where the received signal is a multipath signal. Accordingly, if it is determined that a received signal is accurately a multipath signal or if it is determined that a received signal has a possibility of being a multipath signal, it is effective to determine the reliability of the received signal using the method of determining reliability of a received signal according to this embodiment. In determining whether or not the received signal is a multipath signal, diverse known techniques may be applicable. In this embodiment, an example of a method of determining a multipath signal will also be described.

1-1. Determination of a Multipath Signal

First, a method of determining a multipath signal in this embodiment will be described. A GPS satellite signal output from a GPS satellite is a communication signal of 1.57542 [GHz] that is modulated in a CDMA (Code Division Multiple Access) method that is known as a spectrum diffusion method by a C/A (Coarse and Acquisition) code that is a kind of diffusion code. The C/A code is a pseudo-random noise code having a cycle period of 1 ms, which sets a code length of 1023 chips as 1 PN frame, and is a code that is inherent to each GPS satellite.

Although the frequency (regulated carrier frequency) when the GPS satellite sends a GPS satellite signal is predetermined as 1.57542 [GHz], the frequency when a GPS receiver receives the GPS satellite signal does not always coincide with the regulated carrier frequency due to the Doppler effect or the like that occurs by the movement of the GPS satellite and the GPS receiver. Due to this, the GPS receiver acquires the GPS satellite signal among the received signals by performing a correlation operation of the received GPS satellite signal and a replica C/A code that is a pseudo-C/A code generated inside the apparatus in both frequency and phase directions.

The correlation operation in the frequency direction is an operation (so-called frequency search) for specifying the frequency of a received carrier signal (hereinafter referred to as a "received frequency") which is the signal of the received carrier. Further, the correlation operation in the phase direction is an operation (so-called phase search) for specifying the phase of the received C/A code (hereinafter referred to as a "code phase") that is a C/A code included in the received carrier signal. That is, the GPS receiver performs the correlation operation of the received signal and the replica C/A code while changing the frequency of a carrier removal signal for removing the carrier and the phase of the replica C/A code. Further, the GPS receiver specifies the received frequency and the code phase by detecting a peak of the obtained correlation value.

However, since the position of the GPS satellite is always changed, the position relationship between the GPS satellite and the GPS receiver is always being changed. The carrier removal signal has the same frequency as the frequency of the received carrier signal, but the frequency of the received carrier signal is changed by the influence of Doppler or the like. Further, as the distance between the GPS satellite and the GPS receiver is changed, the code phase is also changed. Due to this, it is required for the GPS receiver to track the acquired GPS satellite signal.

Figure 2:
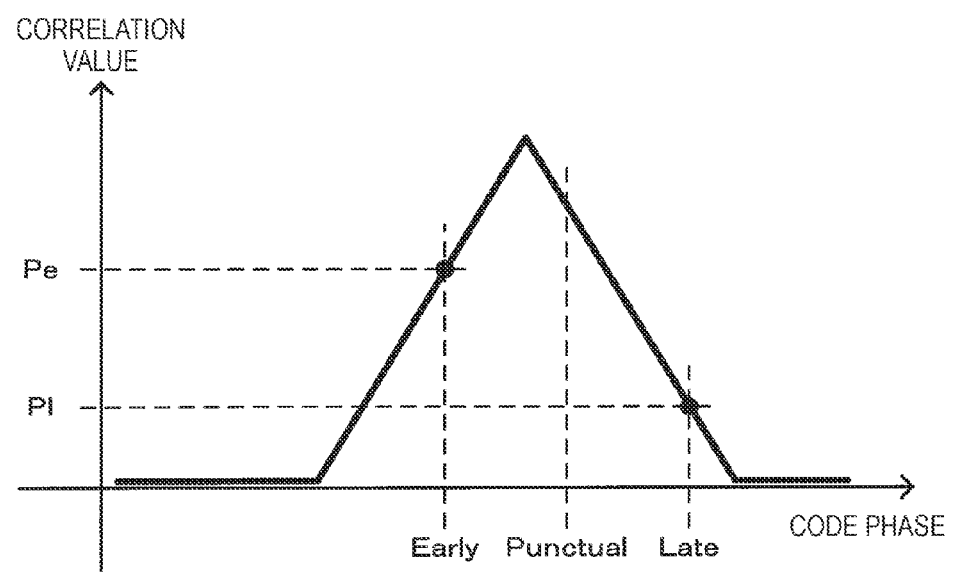
FIG. 2 is an explanatory diagram of peak detection of a correlation value.
Figure 3:
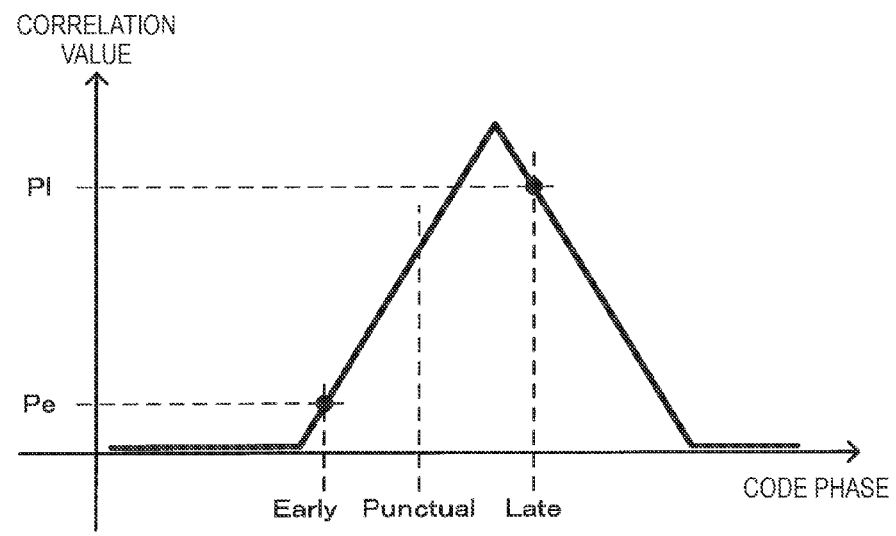
FIG. 3 is an explanatory diagram of peak detection of a correlation value.

FIGS. 1 to 3 are explanatory diagrams of detection of the phase of which the correlation value becomes the maximum (peak) (hereinafter referred to as a "peak phase"). In FIGS. 1 to 3, the horizontal axis represents a code phase, the vertical axis represents a correlation value, and examples of autocorrelation values of the C/A code are illustrated. In the following description, the correlation value means the size (absolute value) of the correlation value.

The autocorrelation value of the C/A code, for example, is expressed substantially in the form of a triangle which is symmetrical about the peak value as the vertex. That is, the correlation value of a phase delayed for the same amount from the peak phase becomes equal to the correlation value of the advanced phase. Due to this, the code phase can be specified by using the correlation value of a predetermined amount advanced phase (hereinafter referred to as an "early phase") and the correlation value of a predetermined amount delayed phase (hereinafter referred to as a "late phase") with respect to the code phase being currently tracked (hereinafter referred to as a "punctual phase"). That is, by searching a phase at which the correlation value of the late phase (hereinafter referred to as a "late correction value") PI becomes equal to the correlation value of the early phase (hereinafter referred to as an "early correlation value"), the punctual phase is detected (FIGS. 2 and 3). In this case, the predetermined amount, for example, may be "⅓ chip".

However, in the multipath environment, the GPS receiver receives a signal (multipath signal) in which indirect wave signals, such as a reflected wave that is reflected from a building or ground, a transmitted wave that is transmitted through an obstacle, a diffracted wave that is diffracted by an obstacle, and the like, are superimposed with a direct wave signal that is the GPS satellite signal transmitted from the GPS satellite.

Figure 4:
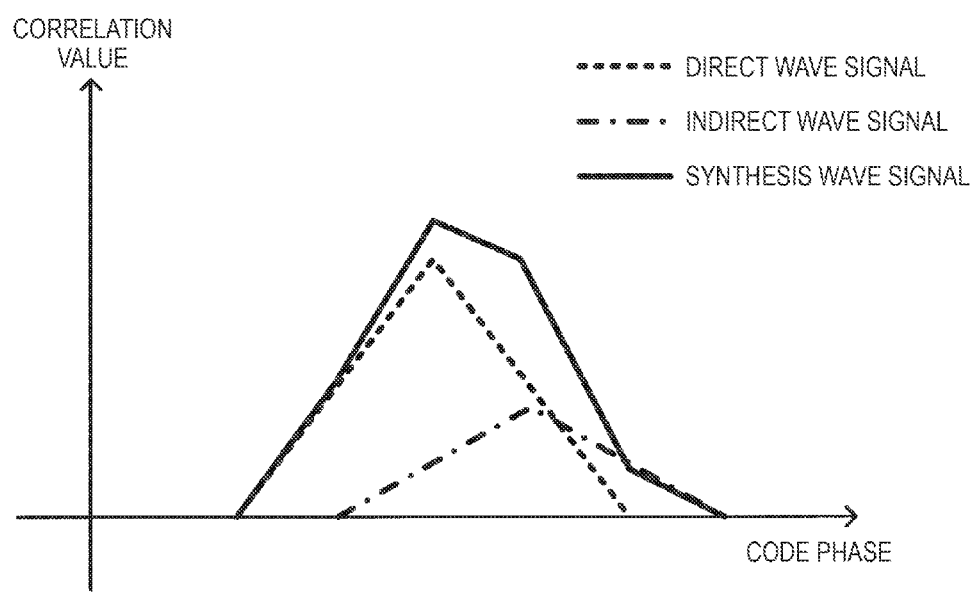
FIG. 4 is a diagram illustrating a correlation result of a multipath signal.

FIG. 4 is a diagram illustrating an example of a correlation result of a multipath signal. In FIG. 4, examples of graphs of respective correlation values of a direct wave signal, an indirect wave signal, and a synthesis wave signal (multipath signal) that is obtained by synthesizing the direct wave signal and the indirect wave signal are illustrated. In FIG. 4, the horizontal axis represents a code phase, and the vertical axis represents a correlation value. Although the correlation value of the indirect wave signal is substantially in the form of a triangle in the same manner as the correlation value of the direct wave signal, the size of the peak value of the correlation value (correlation peak value) of the indirect wave signal is smaller than the correlation peak value of the direct wave signal. This is caused by the fact that the signal strength of the GPS satellite signal when the GPS satellite signal is sent from the GPS satellite becomes weak when the GPS satellite signal is received due to the reflection of the GPS satellite signal from a building or ground and/or the transmission of the GPS satellite signal through an obstacle.

Figure 5:
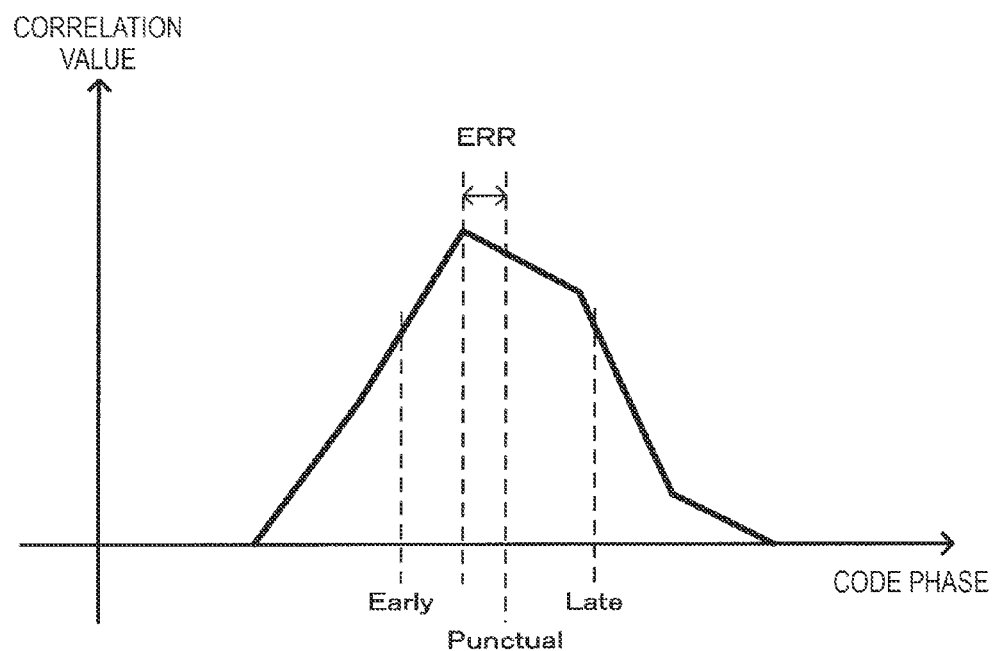
FIG. 5 is an explanatory diagram of a code phase error ERR.

Further, the peak phase of the indirect wave signal is later than the peak phase of the direct wave signal. This is caused by the fact that the propagation distance of the GPS satellite signal sent from the GPS satellite from the GPS satellite to the GPS receiver becomes lengthened due to the reflection of the GPS satellite signal from a building or ground and/or the diffraction of the GPS satellite signal by an obstacle. Further, since the correlation value of the multipath signal becomes the sum of the correlation value of the direct wave signal and the correlation value of the indirect wave signal, the triangular shape is distorted, and is not symmetrical about the peak value. Due to this, as illustrated in FIG. 5, the punctual phase of the multipath signal does not coincide with the peak phase.

In this embodiment, the phase difference between the peak phase and the punctual phase is defined as a "code phase error", and is expressed as "ERR". Further, the code of the code phase error in the case where the punctual phase is later than the peak phase is defined as "positive", and the code of the code phase error in the case where the punctual phase is earlier than the peak phase is defined as "negative". The positive and negative of the code phase error are changed according to the types of interference between the direct wave signal and the indirect wave signal, which is caused by the phase difference between the phase of the direct wave signal and the phase of the indirect wave signal. The types of interference includes two types of an "increased interference" that corresponds to a state where the direct wave signal and the indirect wave signal are strengthened and a "decreased interference" that corresponds to a state where the direct wave signal and the indirect wave signal are weakened.

Figure 6:
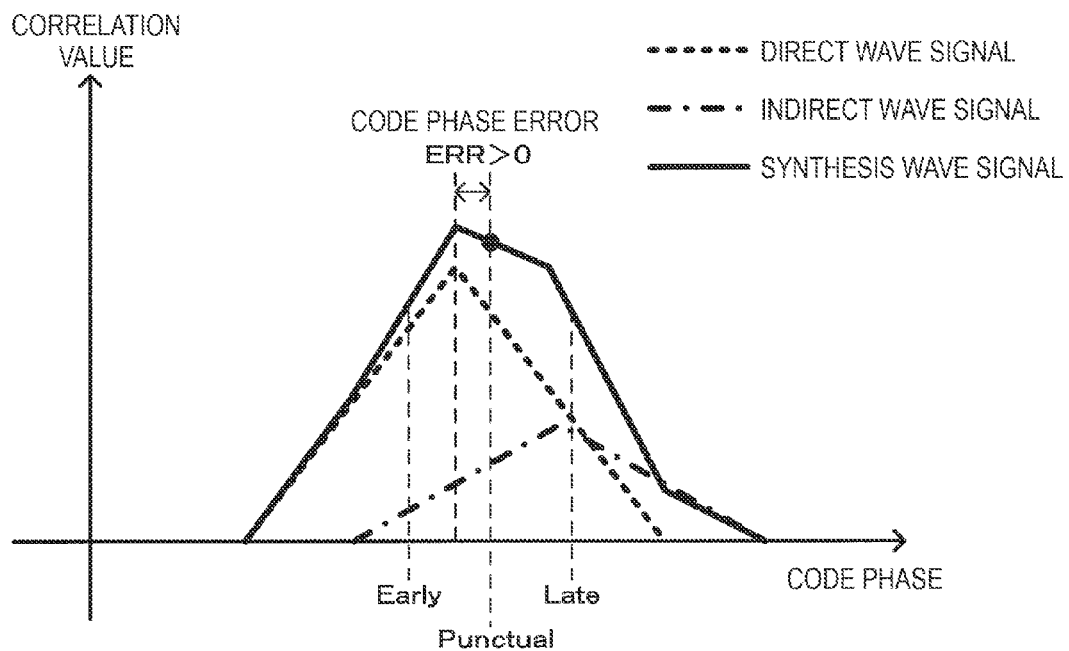
FIG. 6 is an explanatory diagram of a code phase error ERR.
Figure 7:
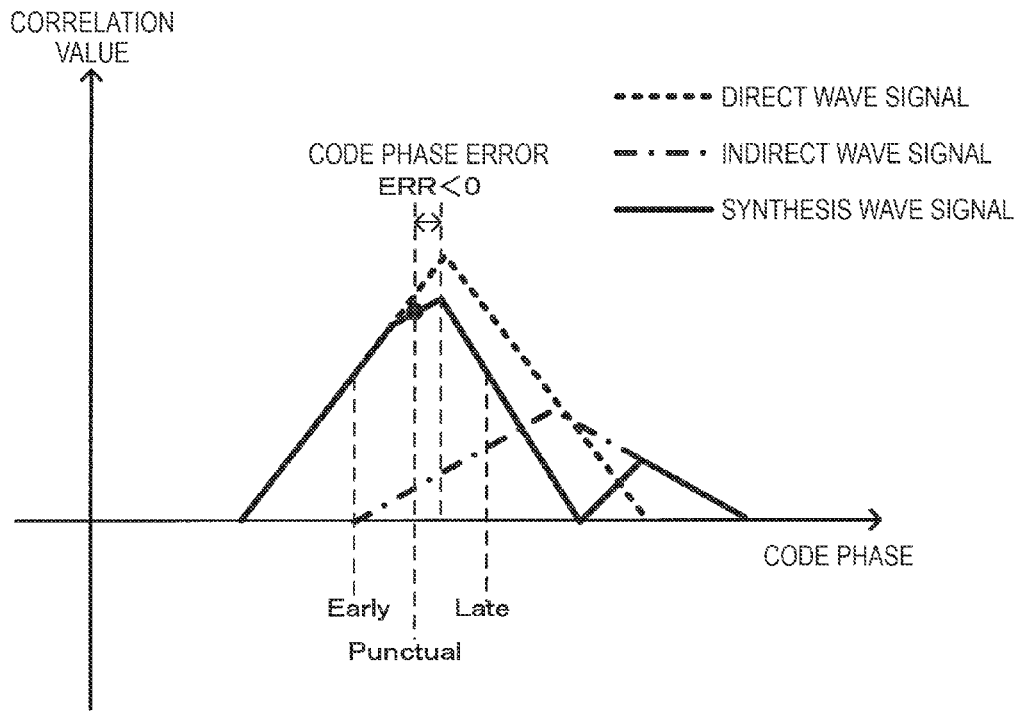
FIG. 7 is an explanatory diagram of a code phase error ERR.

FIGS. 6 and 7 are diagrams illustrating examples of the correlation results in the case where the direct wave signal has the same phase as the indirect wave signal and in the case where the direct wave signal has the reverse phase to the indirect wave signal. Here, explanation will be made on the assumption that the phase of the indirect wave signal is "θ". In the case where the indirect wave signal reaches the GPS receiver with the same phase as the direct wave signal (0≤θ≤π), the direct wave signal and the indirect wave signal are strengthened with each other. Accordingly, as shown in FIG. 6, the correlation value of the synthesis signal is expressed as the sum of the correlation value of the direct wave signal and the correlation value of the indirect wave signal. In this case, since the punctual phase is a delayed phase of the peak phase, the code phase error ERR has a positive value.

On the other hand, in the case where the indirect wave signal reaches the GPS receiver with the reverse phase to the direct wave signal ($\pi<\theta<2\pi$), the direct wave signal and the indirect wave signal are weakened with each other. Accordingly, as shown in FIG. 7, the correlation value of the synthesis signal is expressed as the subtracted value that is obtained by subtracting the correlation value of the indirect wave signal from the correlation value of the direct wave signal. In this case, since the punctual phase is an advanced phase of the peak phase, the code phase error ERR has a negative value. Further, in the case where the correlation value of the indirect wave signal is larger than the correlation value of the direct wave signal, the subtracted value of the correlation value becomes a negative value, but the subtracted value is expressed as a positive value since an absolute value is calculated.

In this embodiment, in consideration of the characteristics of the above-described correlation value of the multipath signal, the determination of the multipath signal is performed using two types of index values called a "PE value" and a "vector angle $\theta$".

Figure 8:
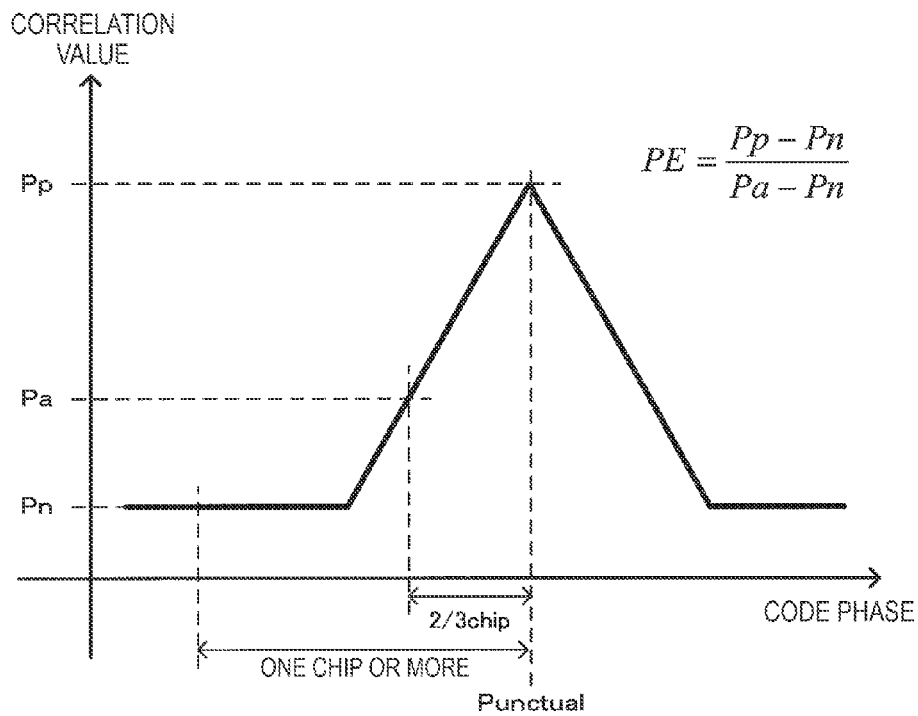
FIG. 8 is an explanatory diagram of a method of calculating a PE value.

FIG. 8 is an explanatory diagram of a method of calculating a PE value, and illustrates an example of the correlation result of the received signal. In the drawing, from a punctual correlation value Pp, a correlation value Pn of a phase that is advanced by one chip or more from the punctual phase, and a correlation value Pa of a phase that is advanced by N chips from the punctual phase, a PE value is calculated according to the following equation (1).

$$PE=(Pp-Pn)/(Pa-Pn) \quad (1)$$

However, "N" denotes a value that satisfies "0<N<1", and for example, may be "n=2/3" as shown in FIG. 8. The PE value expresses the ratio of the punctual correlation value Pp of the correlation value Pn to the correlation value Pa of the correlation value Pn. Since the correlation value Pn is the correlation value of the phase that is distant for one chip or more from the punctual phase, it may be the correlation value of noise floor (the correlation value of a signal that is considered as a noise).

Figure 9:
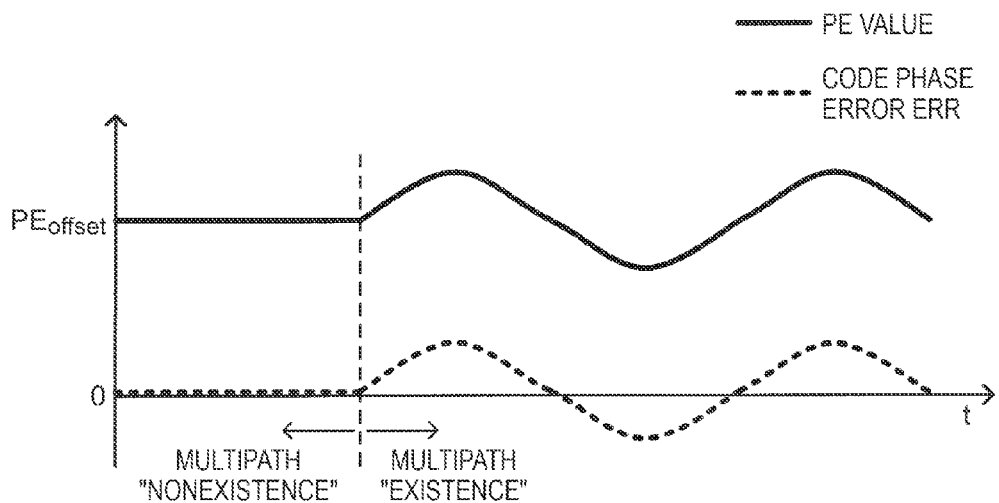
FIG. 9 is a diagram of the relationship between a PE value and a code phase error ERR.

As a result of experiment performed by the inventor, it could be known that the PE value and the code phase error ERR had the following relationship. FIG. 9 is a diagram illustrating the relationship between the PE value of the received signal and the code phase error ERR in the case where the effect of the multipath is changed from "nonexistence" to "existence". In FIG. 9, the horizontal axis represents a common time axis, a solid line indicates the temporal change of the PE value, and a dashed line indicates the temporal change of the code phase error ERR.

In a state where the effect of the multipath "does not exist", the received signal in the GPS receiver includes only the direct wave signal. In this case, the code phase error ERR is almost zero, and the PE value is a constant value. This is because the shape of the curve of the correlation value of the direct wave signal is not changed with the lapse of time. The PE value in a state where the effect of the multipath "does not exist", that is, in the case where the indirect wave signal does not exist, is defined as a "PE offset value", and is indicated as "$PE_{offset}$". The PE offset value "$PE_{offset}$" is used to calculate an index value that is called a "$\Delta PE$ value" later.

Since the degree of inclination of a triangle of a correlation value differs according to a PRN code of the GPS satellite signal, the PE offset value differs for each GPS satellite. Further, since the height of the triangle of the correlation value differs according to the signal strength of the GPS satellite signal, the PE offset value "$PE_{offset}$" is changed according to the signal strength of the GPS satellite signal. Accordingly, the PE offset value "$PE_{offset}$" may be a value that depends on the number (PRN number) of the GPS satellite and the signal strength of the GPS satellite signal.

On the other hand, in a state where the effect of the multipath "exists", the received signal becomes a multipath signal in which the indirect wave signal is superimposed with the direct wave signal. In this case, the code phase error ERR and the PE value are all changed with the lapse of time. This is because the relative positional relationship between the GPS satellite signal and the GPS receiver is changed because the movement of the GPS satellite or the GPS receiver, and the shape of the correlation value of the curve of the multipath signal is changed as the indirect wave signal is changed. That is, this is because the correlation values Pp and Pa are changed in FIG. 8. The change of the PE value can be approximated to a sine wave, and its amplitude is determined by the signal strength relationship between the direct wave signal and the indirect wave signal or the difference between the carrier frequencies.

From FIG. 9, it can be known that the PE value and the code phase error ERR make almost the same temporal change. That is, if the code phase error ERR is increased, the PE value is also increased. By contrast, if the code phase error ERR is decreased, the PE value is also decreased. As described above, if the type of interference between the direct wave signal and the indirect wave signal is the increased interference, the code phase error ERR has a positive value, while if the type of the interference is the decreased interference, the code phase error ERR has a negative value. Accordingly, if the type of the interference is the increased interference, the PE value is changed in the increasing direction, while if the type of the interference is the decreased interference, the PE value is changed in the decreasing direction.

Figure 10:
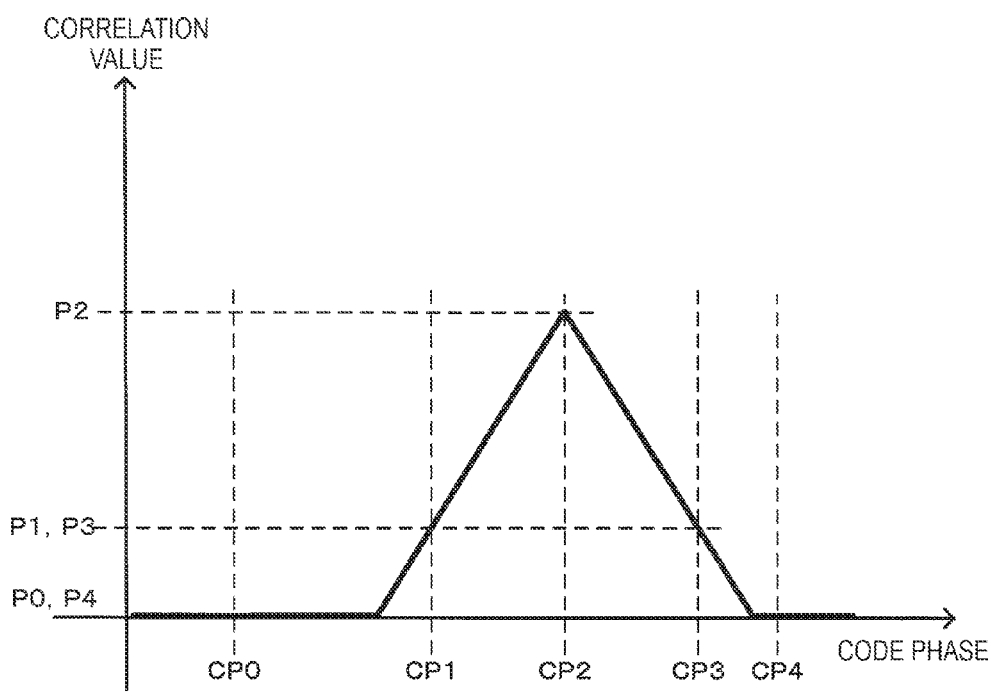
FIG. 10 is a diagram illustrating a correlation result of a direct wave signal.
Figure 11:
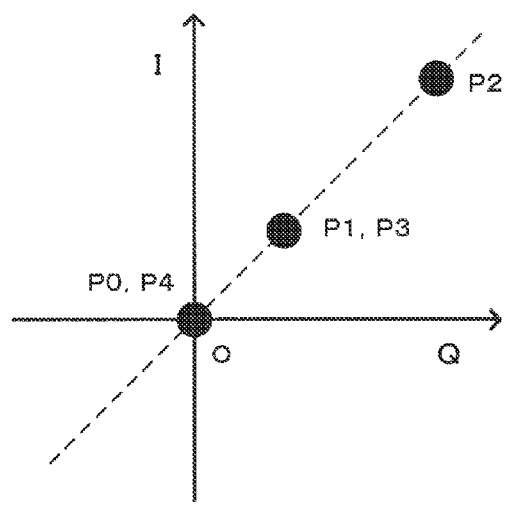
FIG. 11 is a diagram illustrating a correlation result of a direct wave signal.

Next, a "vector angle $\theta$" is defined. The vector angle $\theta$ is defined as follows. FIGS. 10 and 11 are diagrams illustrating an example of the correlation result of the direct wave signal. FIG. 10 shows a graph of a correlation value of the code phase of the direct wave signal, and FIG. 11 is a diagram in which the correlation value P of each code phase in FIG. 10 is plotted onto an IQ coordinate plane in which the horizontal axis represents a Q component (orthogonal component) of the correlation value and the vertical axis represents an I component (in-phase component) of the correlation value. However, the correlation value is "$P=(I^2+Q^2)^{1/2}$".

Referring to FIG. 11, the correlation value P of the direct wave signal is distributed substantially in the form of a straight line that passes the original point O on the IQ coordinate plane. That is, the I component and the Q component of the correlation values P0 and P4 of the code phases CP0 and CP4 are all zero, and the correlation values P0 and P4 are plotted onto the original point O on the IQ coordinate plane. Further, since neither the I component nor the Q component of the correlation values P1 to P3 of the code phases CP1 to CP3 are zero, the correlation values are plotted onto positions which are apart from the original point O, and particularly, the correlation value P2 of the code phase (peak phase) CP2 in which the correlation value P becomes maximum is plotted onto a position that is farthest from the original point O.

That is, the correlation value P from the phase CP0 that is advanced for one chip or more from the peak phase CP2 to the phase CP4 that is delayed for one chip or more from the peak phase CP2 draws a trace substantially in the form of a straight line on the IQ coordinate plane in a manner that the correlation value P moves to get out of the original point O, reaches a point that is farthest from the peak phase, and then returns to the original point O. Further, although the trace substantially in the form of a straight line, which is drawn by the correlation value P, has an angle of about 45 degrees against the Q axis in the same drawing, it may differ according to the phase of the carrier of the direct wave signal or the method of selecting an IQ coordinate system.

Figure 12:
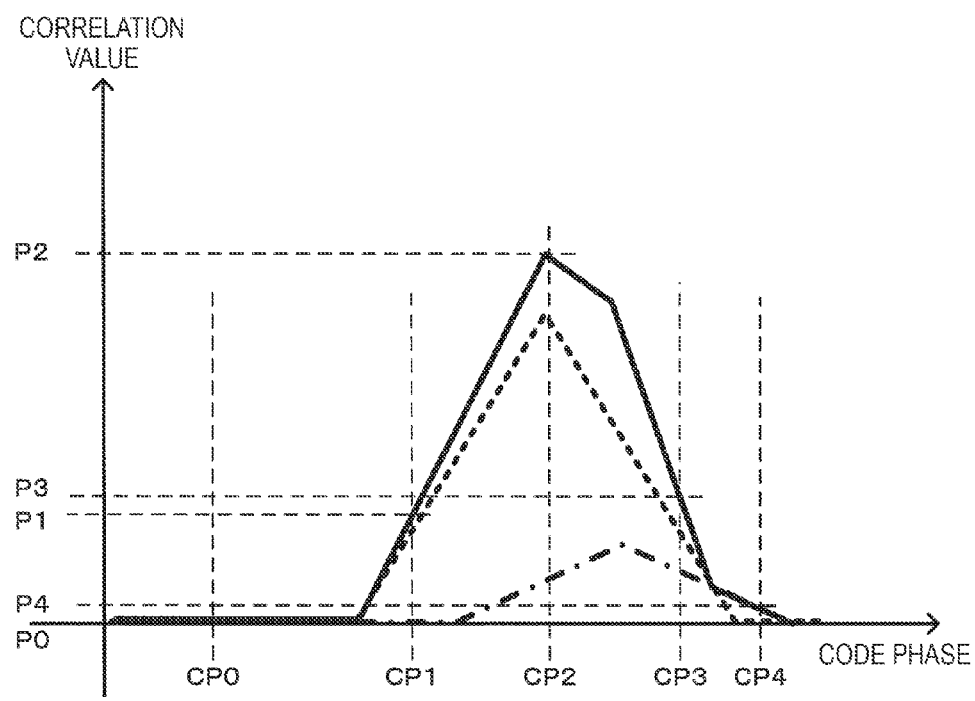
FIG. 12 is a diagram illustrating a correlation result of a multipath signal.
Figure 13:
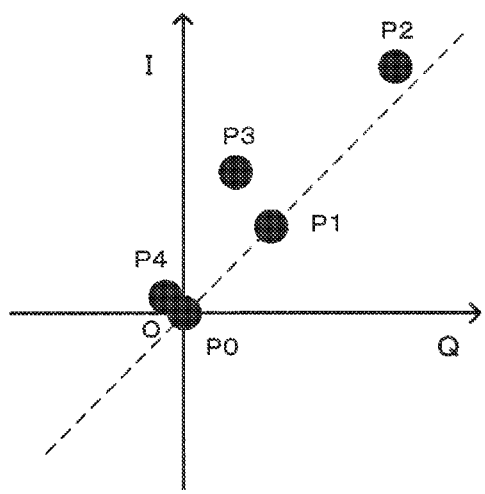
FIG. 13 is a diagram illustrating a correlation result of a multipath signal.

FIGS. 12 and 13 show the correlation result of a multipath signal in which an indirect wave signal is synthesized with a direct wave signal as illustrated in FIGS. 4 and 5. FIG. 12 shows a graph of the correlation value of the code phase of the multipath signal, and FIG. 13 is a diagram in which the correlation values of the respective code phases in FIG. 12 are plotted onto the IQ coordinate plane.

Referring to FIG. 13, the correlation value P of the multipath signal is distributed to draw the trace of a closed curve on the IQ coordinate plane. That is, the I component and the Q component of the correlation value P0 are all zero, and the code phase CP0 is plotted onto the original point O of the IQ coordinate plane. Further, since neither the I components nor the Q components of the correlation values P1 to P4 are zero, the correlation values P1 to P4 of the code phases CP1 to CP4 are plotted onto positions which are apart from the original point O, and particularly, the correlation value P2 of the peak phase CP2 is plotted onto a position that is farthest from the original point O. That is, the correlation value P of the multipath signal draws a trace of a closed curve in a manner that the correlation value P moves to get out of the original point O, reaches a point that is farthest from the peak phase, and then returns to the original point O.

Figure 14:
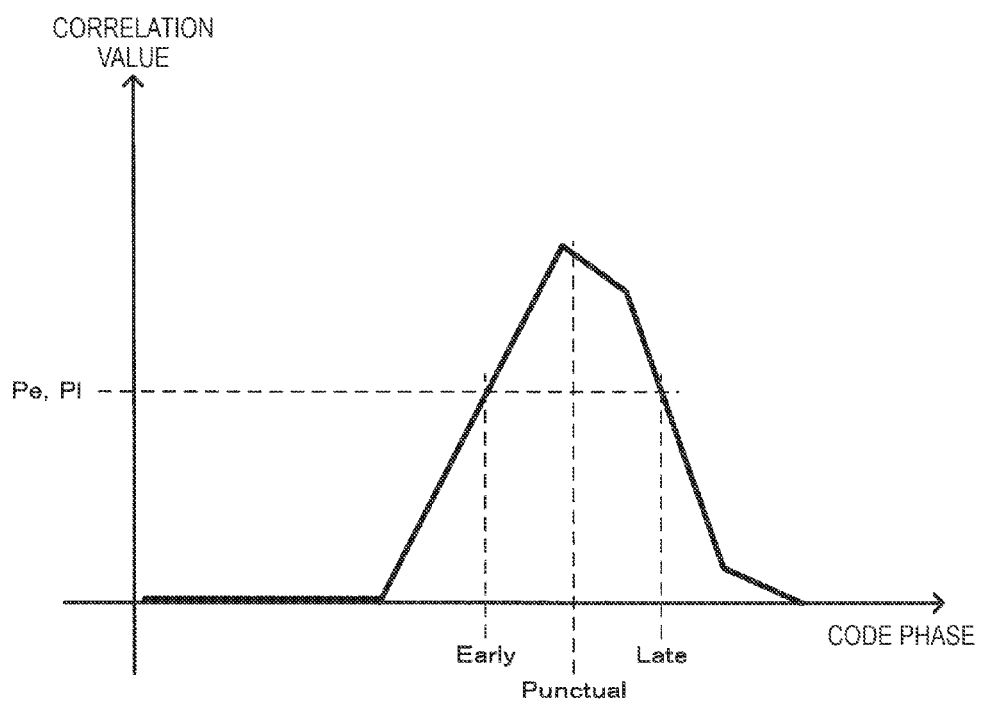
FIG. 14 is an explanatory diagram of a vector angle.
Figure 15:
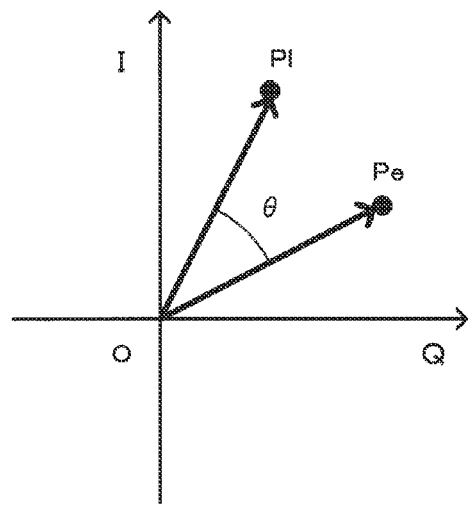
FIG. 15 is an explanatory diagram of a vector angle.

Further, if early and late correlation values P among the correlation values P of the multipath signal are plotted onto the IQ coordinate plane, the results are shown in FIGS. 14 and 15. FIG. 14 shows a graph of the correlation value of the multipath signal, and FIG. 15 is a diagram in which the correlation values of the respective code phases in FIG. 14 are plotted onto the IQ coordinate plane.

In FIG. 15, it is assumed that a position vector that is directed from the original point O to the position of the early correlation value Pe is called an "early correlation vector", and a position vector that is directed to the position of the late correlation value P1 is called a "late correlation vector". The angle θ that is formed between the early correlation vector and the late correlation vector is defined as a "vector angle". Further, since the correlation values Pl and Pe are equal to each other, the size of the early correlation vector is equal to the size of the late correlation vector in the IQ coordinate plane.

Figure 16:
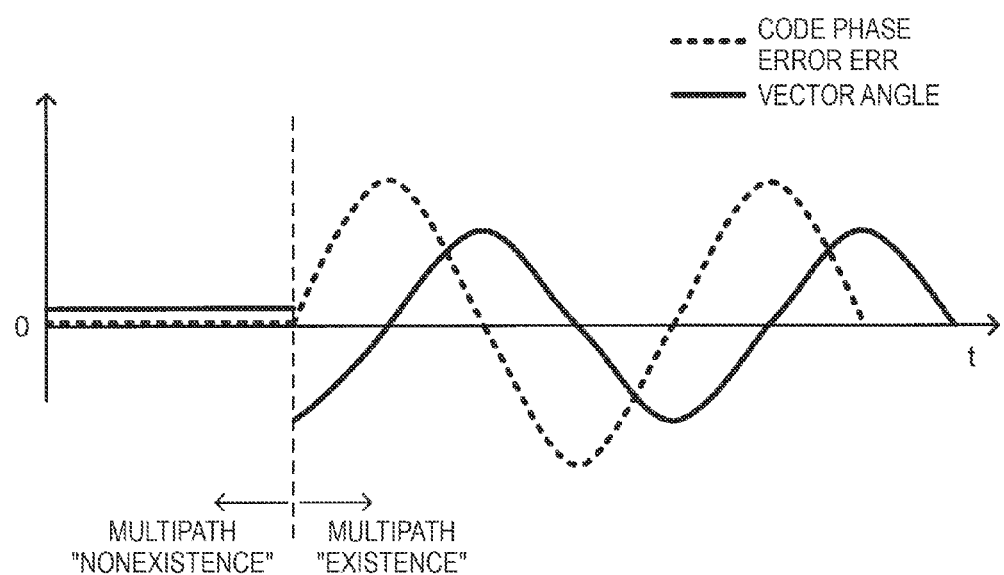
FIG. 16 is a diagram of the relationship between a vector angle and a code phase error.

FIG. 16 is a diagram illustrating the relationship between the vector angle θ and the code phase error ERR in the case where the effect of the multipath is changed from "existence" to "nonexistence". In FIG. 16, the horizontal axis represents common time, a solid line indicates the temporal change of the vector angle θ, and a dashed line indicates the temporal change of the code phase error ERR.

In a state where the effect of the multipath "does not exist", the received signal includes only the direct wave signal. In this case, the code phase error ERR is zero, and the vector angle θ has a constant value (in theory, zero). This is because the correlation value P of the direct wave signal is distributed to draw a trace substantially in the form of a straight ling on the IQ coordinate plane as shown in FIG. 11. At this time, in theory, since the early correlation value and the late correlation value of the direct wave signal are equal to each other, the vector angle θ is zero. However, in practice, since the correlation operation is performed as the phase is shifted by a predetermined phase width, the vector angle becomes a constant value that is determined according to the performance of hardware.

On the other hand, in a state where the effect of the multipath "exists", the received signal becomes the multipath signal, and the code phase error ERR and the vector angle θ are all changed with the lapse of time. The change of the vector angle θ can be approximated to a sine wave, and its amplitude is determined by the signal strength relationship between the direct wave signal and the indirect wave signal or the difference between the carrier frequencies. Further, in a state where the effect of the multipath "exists", the vector angle θ and the code phase error ERR are changed in a manner that the vector angle θ becomes near to the state where the effect of the multipath "does not exist" (constant value approximately zero) as the code phase error ERR becomes larger, whereas the vector angle θ becomes greater as the code phase error ERR becomes smaller.

Figure 17:
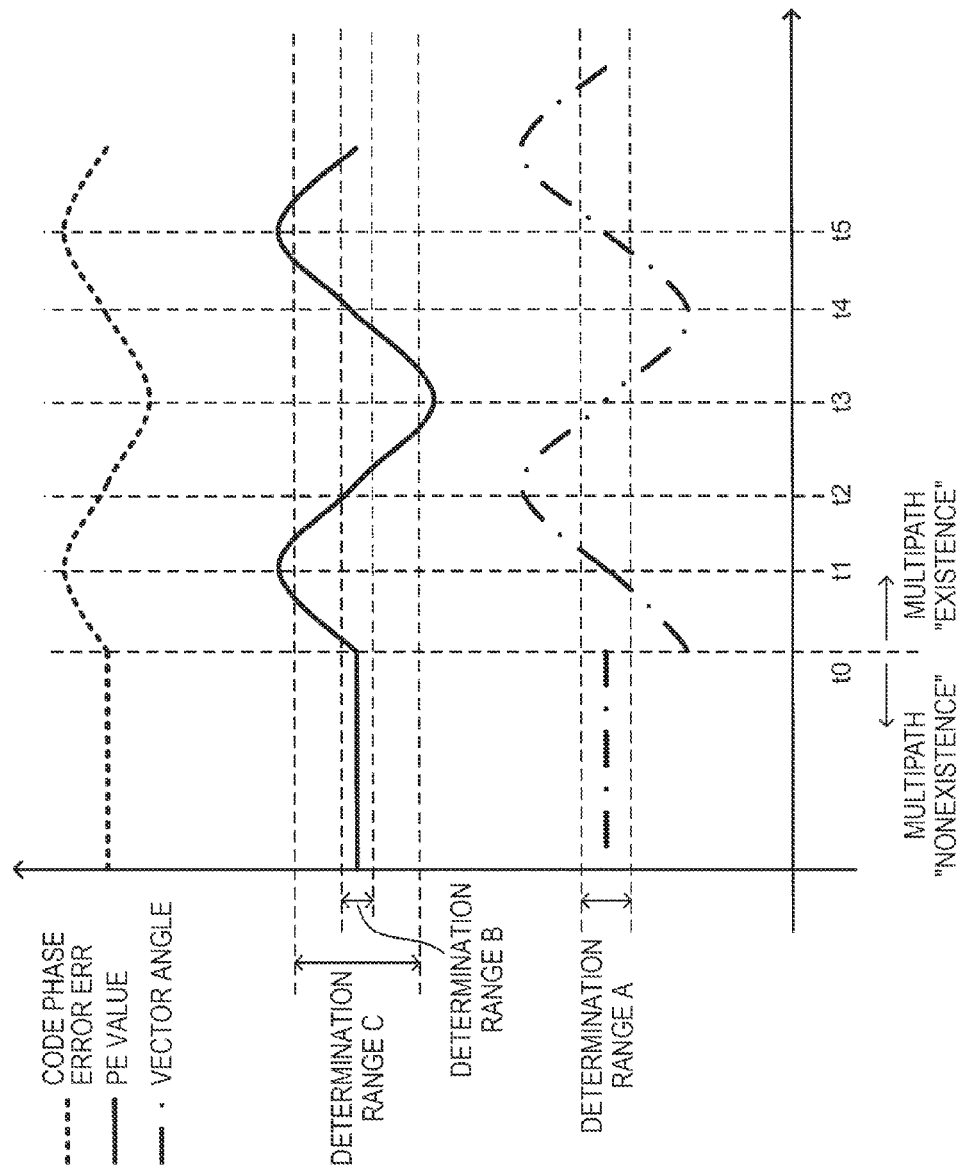
FIG. 17 is an explanatory diagram of determination of a multipath signal.

Whether or not the received signal is the multipath signal is determined as follows based on the relationship between the PE value and the vector angle θ and the code phase error ERR. That is, as shown in FIG. 17, the determination range is established with respect to the PE value and the vector angle θ. FIG. 17 is a diagram illustrating the temporal change of the code phase error ERR, the PE value, and the vector angle θ in the case where the effect of the multipath is changed from the "nonexistence" state to the "existence" state. The horizontal axis represents a common time axis, a dashed line indicates the temporal change of the code phase error ERR, a solid line indicates the temporal change of the PE value, and a dashed dot line indicates the temporal change of the vector angle θ.

As illustrated in FIG. 17, determination ranges B and C of the PE value are determined. These determination ranges B and C have a center value of a common range. This center value is equal to the PE value (that is, a predetermined value according to a C/A code included in the direct wave signal) in the case where the received signal includes only the direct wave signal. Further, the width of the determination range C is determined to be larger than the width of the determination range B.

However, the PE value of the direct wave signal differs according to the C/A code of the GPS satellite signal that is included in the corresponding direct wave signal. Accordingly, the center value of the determination ranges B and C differs according to the GPS satellite to be acquired. Further, a determination range A of the vector angle θ is determined. The center value of the determination range A is equal to the value of the vector angle θ in the case where the received signal includes the direct wave signal.

Further, if at least one condition of "condition A: the PE value is out of the determination range B, and the vector angle θ is out of the determination range A" and "condition B: the PE value is out of the determination range C" is satisfied, it is determined that the received signal is the multipath signal, and if neither of them is satisfied, it is determined that the received signal is not the multipath signal. This follows the following reasons.

In a state where the effect of the multipath "does not exist", the PE value becomes a constant value according to the satellite to be acquired, and the vector angle θ becomes a constant value (in theory, zero). That is, neither of the "condition A" and "condition B" is satisfied, and thus it is determined that the received signal is not the multipath signal.

On the other hand, in a state where the effect of the multipath "exists", the PE value is changed to substantially coincide with the code phase error ERR. Further, the absolute value of the vector angle θ is changed in a manner that the absolute value of the vector angle θ becomes smaller as the absolute value of the code phase error ERR becomes greater, while it becomes greater as the absolute value of the code phase error ERR becomes smaller. That is, from the relationship between the code phase error ERR and the vector angle θ, the "condition A" may not be satisfied even in the case where the received signal is the multipath signal. For example, in FIG. 17, in a period near the time t1, t3, or t5, the "condition A" is not satisfied, but the absolute value of the code phase error ERR becomes large. Accordingly, by the "condition B", it is determined that the received signal is the multipath signal in the case where the PE value is somewhat large regardless of the value of the vector angle θ.

1-2. Determination of Reliability of a Received Signal

Next, a method of determining reliability of a received signal will be described. The "reliability of a received signal" means the degree of acceptance in which the received signal of the GPS satellite signal is used for position calculation. That is, as the reliability of the received signal is higher, the degree of acceptance in which the corresponding received signal is used for the position calculation becomes higher.

Since it may be easy to be close to a true code phase by correction of the code phase error as the width of change (amplitude of change) of the code phase error ERR becomes smaller, the reliability of the received signal may be high. In this embodiment, an index value that is called a "ΔPL value" is defined as an index value of a delay distance of the indirect wave that is included in the multipath signal to the direct wave, and the reliability of the received signal is determined using the ΔPL value. This ΔPL value is calculated using the index value that is called the PL value. Hereinafter, a method of calculating the "ΔPL value" will be described.

1. Calculation of a ΔPL Value

Figure 18:
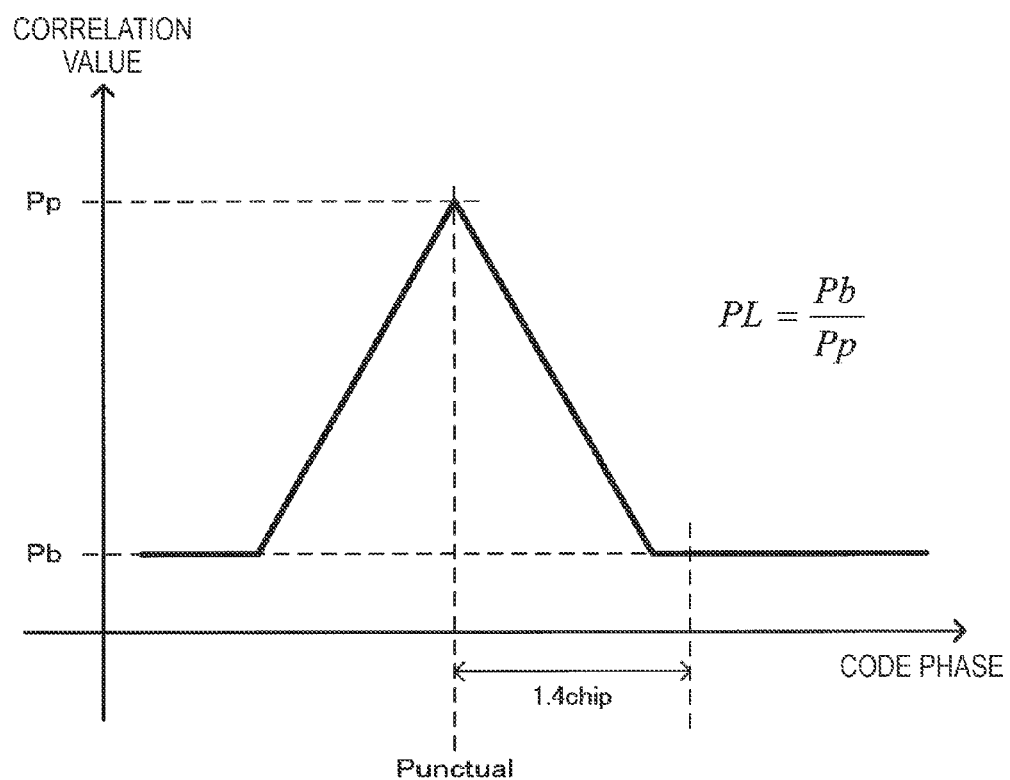
FIG. 18 is an explanatory diagram of a method of calculating a PL value.

FIG. 18 is an explanatory diagram illustrating a method of calculating a PL value, and shows an example of the correlation result of the received signal. In FIG. 18, using the punctual correlation value Pp and the correlation value Pb of the phase that is delayed for M chips from the punctual phase, the PL value is calculated according to the following equation (2).

$$PL = Pb/Pp \quad (2)$$

However, "M" is a value that satisfies "1≤M<2", and for example, as shown in FIG. 18, "M" may be "M=1.4". That is, the PL value indicates the ratio of the correlation value Pb of the phase that is delayed for a predetermined phase from the punctual phase to the punctual correlation value Pp.

As a result of experiment performed by the inventor, it could be known that by comparing with the phase delayed for less than one chip from the punctual phase and the phase delayed for two chips or more from the punctual phase, the influence of the indirect wave signal appeared greater on the phase delayed for equal to or more than one chip and less than two chips, and the absolute value of the correlation value tended to be greater. Due to this, in this embodiment, the PL value is calculated using the correlation value of the phase delayed for "equal to or more than one chip and less than two chips" (1≤M<2) as a predetermined phase.

Figure 19:
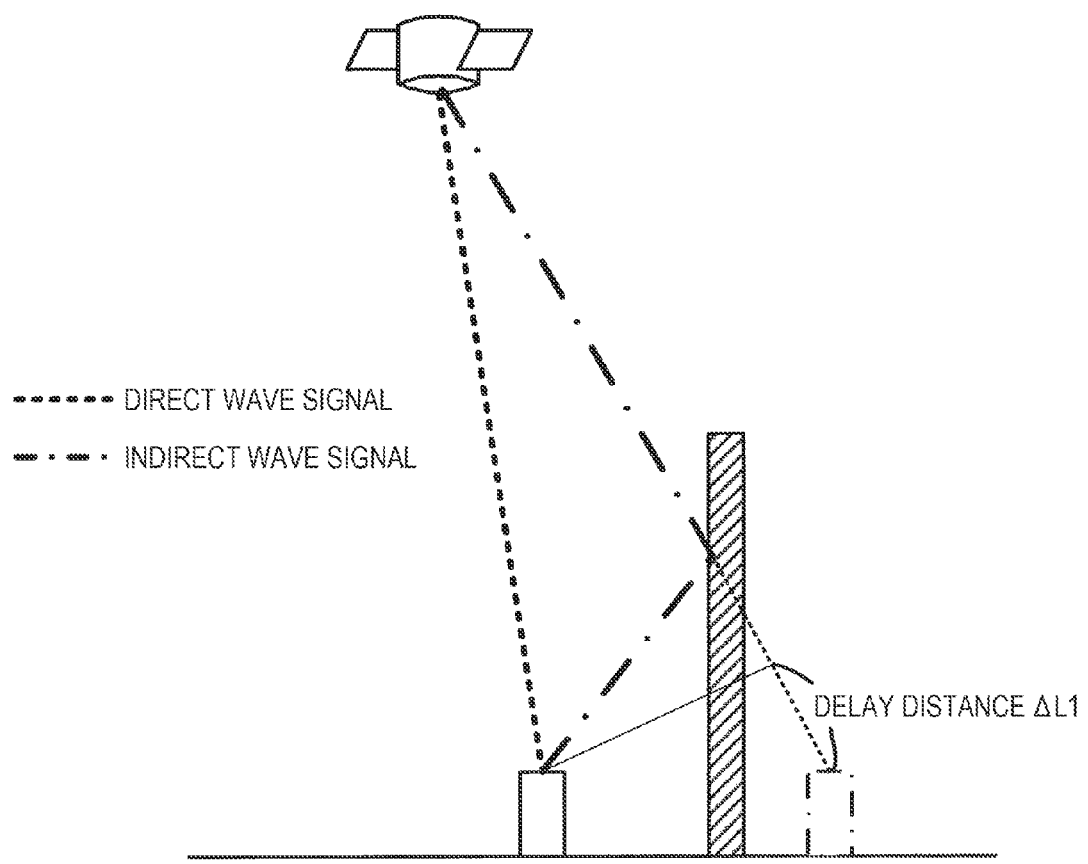
FIG. 19 is an explanatory diagram of a PL value.

FIGS. 19 to 22 are diagrams explaining the meanings indicated by a PL value. FIG. 19 shows a case where the GPS satellite signal originating from the GPS satellite is reflected by a building and reaches the GPS receiver to be the multipath signal. First, explanation will be made focusing on the increased interference in which the direct wave signal and the indirect wave signal are strengthened. In FIG. 19, it is assumed that the delay distance of the indirect wave signal included in the multipath signal against the direct wave signal is "ΔL1".

Figure 20:
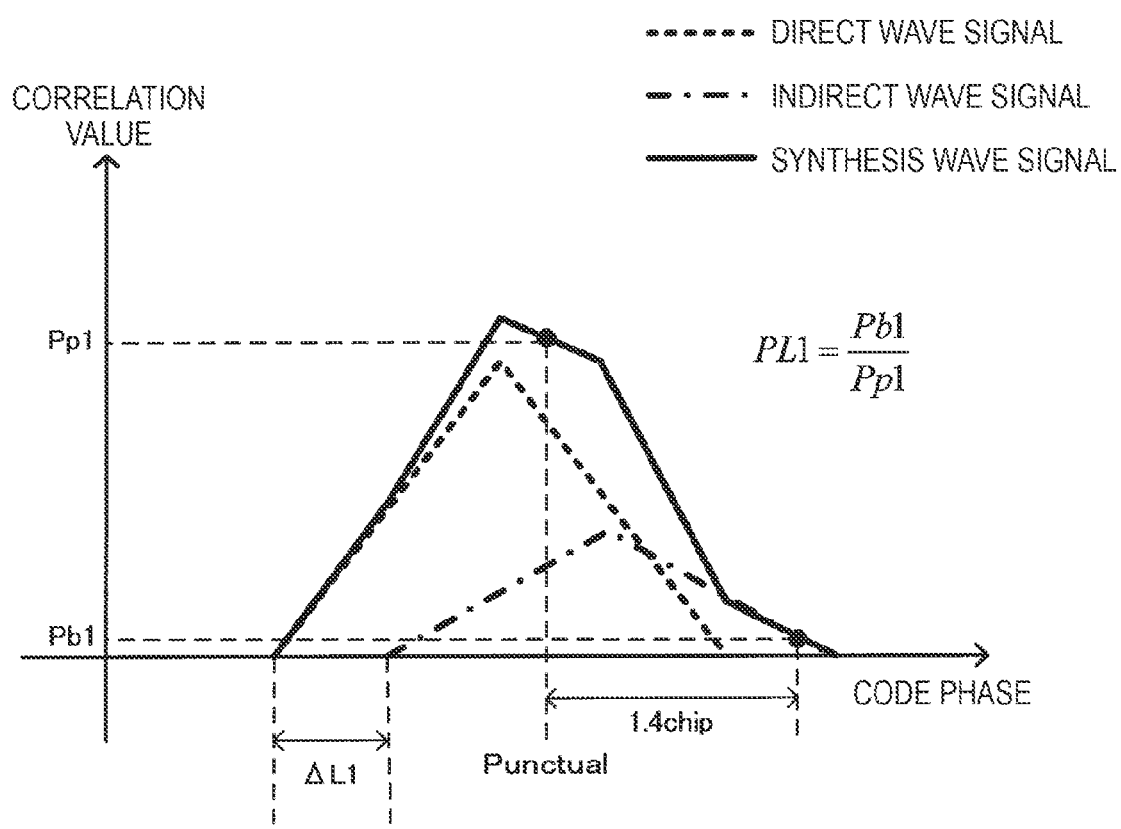
FIG. 20 is an explanatory diagram of a PL value.

FIG. 20 is a diagram illustrating an example of the correlation result of the multipath signal of FIG. 19, and shows a graph of the respective correlation values of the direct wave signal, the indirect wave signal, and the synthesis signal. In FIG. 20, if the PL value is calculated using the punctual correlation value Pp1 and the correlation value Pb1 of the phase that is delayed for M (=1.4) chips from the punctual phase, it becomes PL1=Pb1/Pp1.

Figure 21:
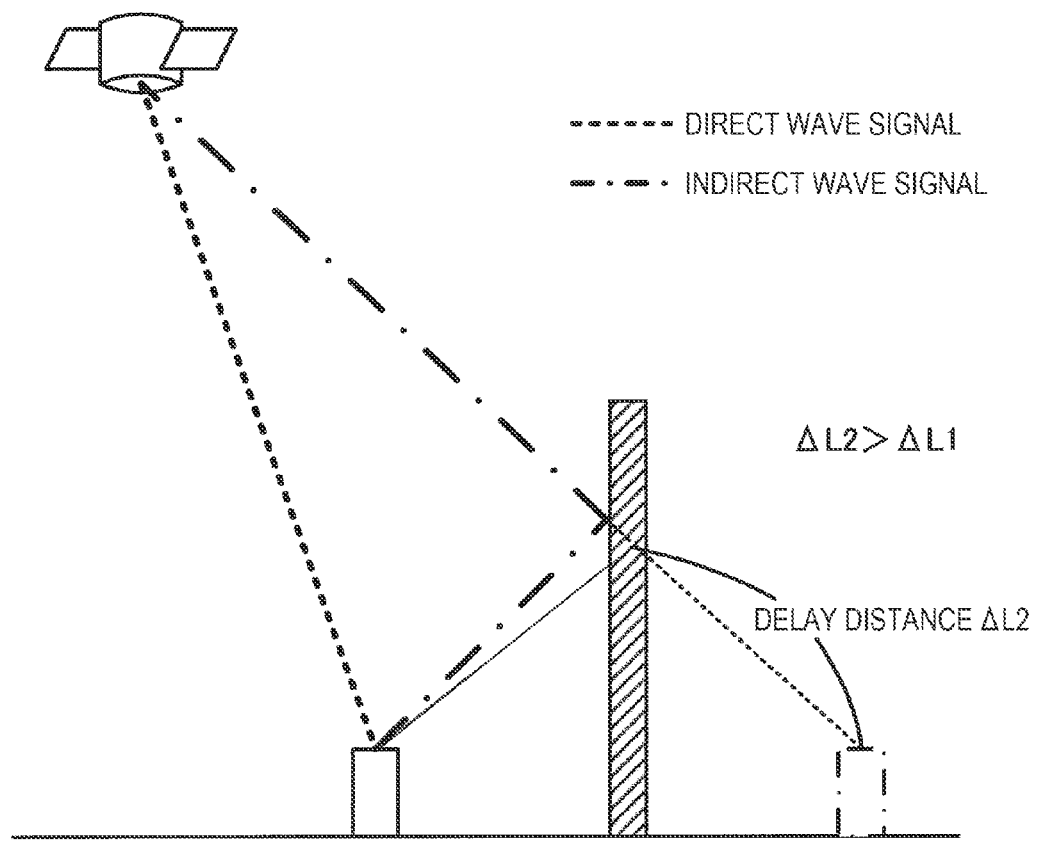
FIG. 21 is an explanatory diagram of a PL value.

In the same manner as in FIG. 19, FIG. 21 shows a case where the GPS satellite signal originating from the GPS satellite is reflected by a building and reaches the GPS receiver so that the received signal of the GPS satellite signal becomes the multipath signal. Here, explanation will be made focusing on the increased interference in which the direct wave signal and the indirect wave signal are strengthened. In FIG. 21, in comparison to FIG. 19, the time (propagation time) in which the GPS satellite signal originating from the GPS satellite is reflected by a building and reaches the GPS receiver is lengthened. Accordingly, the delay distance "ΔL2" is lengthened in comparison to the delay distance "ΔL1" of FIG. 19 (ΔL2>ΔL1).

Figure 22:
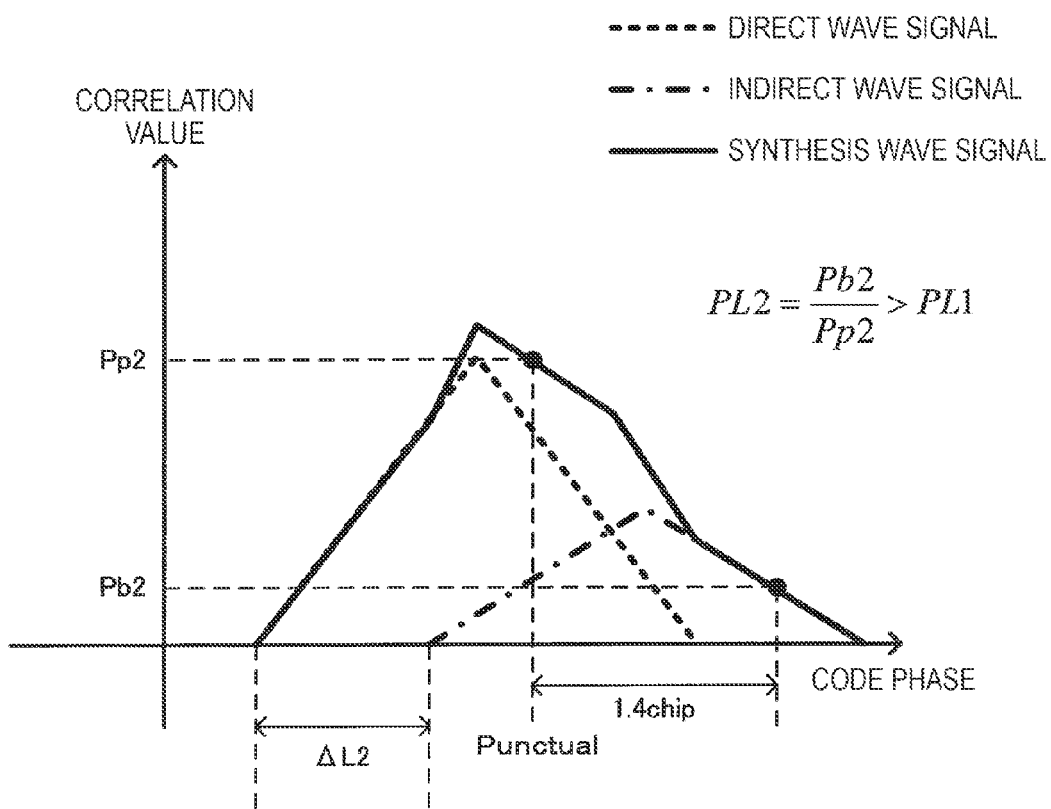
FIG. 22 is an explanatory diagram of a PL value.

FIG. 22 is a diagram illustrating the correlation result of the multipath signal of FIG. 21, and shows a graph of the respective correlation values of the direct wave signal, the indirect wave signal, and the synthesis signal. In FIG. 22, if the PL value is calculated using the punctual correlation value Pp2 and the correlation value Pb2 of the phase that is delayed for M (=1.4) chips from the punctual phase, it becomes PL2=Pb2/Pp2.

The peak phase of the indirect wave signal is delayed in comparison to the peak phase of the direct wave signal. Further, since the delay distance is lengthened (ΔL2>ΔL1), the delay of the peak phase of the indirect wave signal in FIG. 22 becomes greater than the delay of the peak phase of the indirect wave signal in FIG. 20. Due to this, in FIG. 22, the influence of the indirect wave signal on the phase that is shifted for M (=1.4) chips from the punctual phase becomes greater in comparison to the case of FIG. 20, and the size of the correlation value Pb2 becomes larger than the size of the correlation value Pb1.

Accordingly, if the ratio of Pb1 to Pp1 is compared with the ratio of Pb2 to Pp2, the ratio of Pb2 to Pp2 becomes greater. That is, in the defining equation of the PL value in equation (2), the PL value condition becomes PL2>PL1. Accordingly, if the delay distance is lengthened (ΔL2>ΔL1), the PL value condition becomes PL2>PL1, and the relationship exists, in which the PL value becomes larger as the delay distance ΔL becomes longer. That is, positive correlation is expected between the delay distance ΔL and the PL value.

Figure 23A:
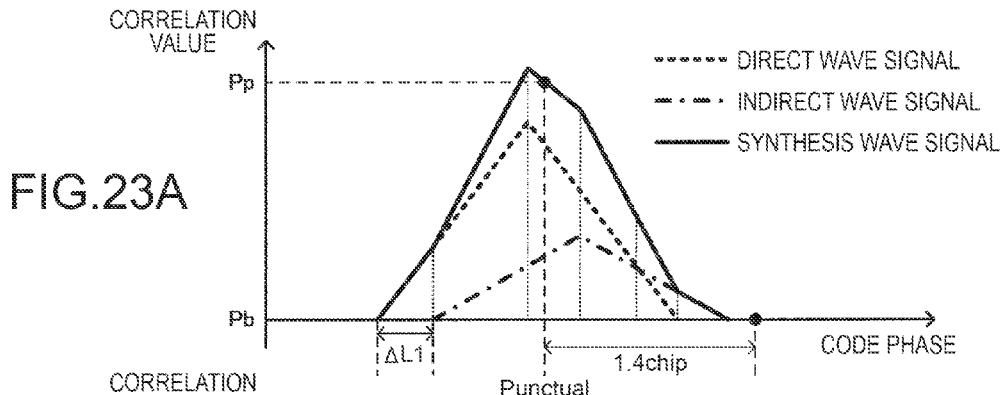
FIGS. 23A to 23D are explanatory diagrams of the relationship between a delay distance ΔL and a PL value in the case of an increased interference.
Figure 23B:
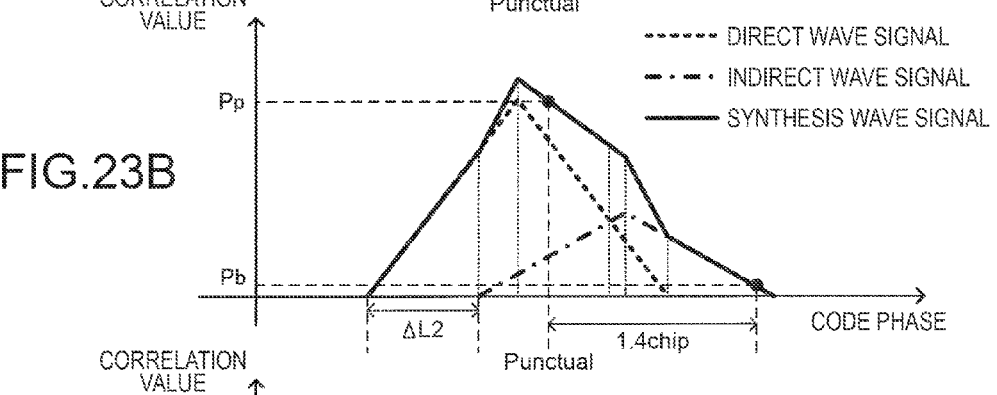
Figure 23C:
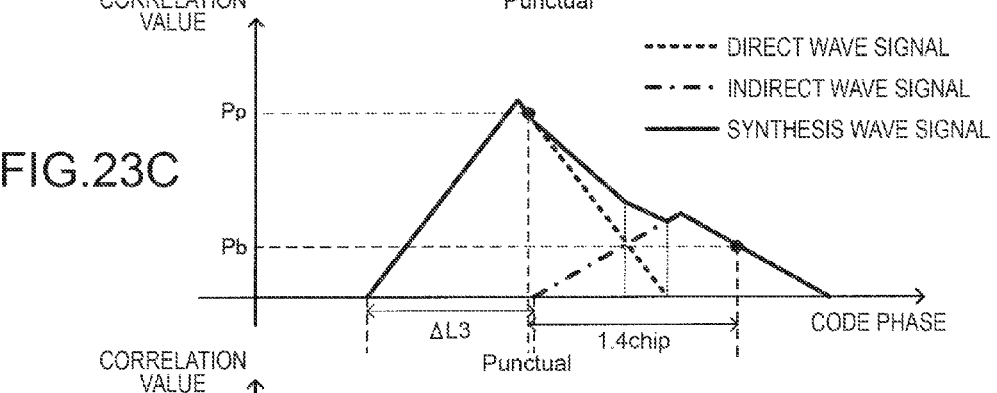
Figure 23D:
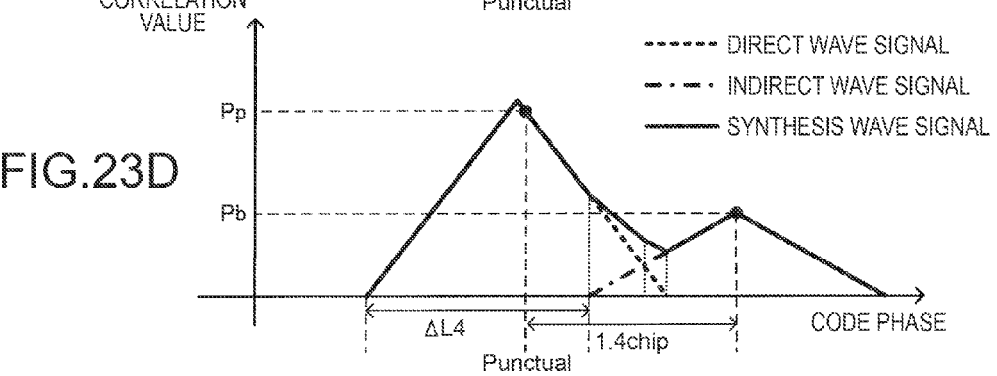
Figure 24A:
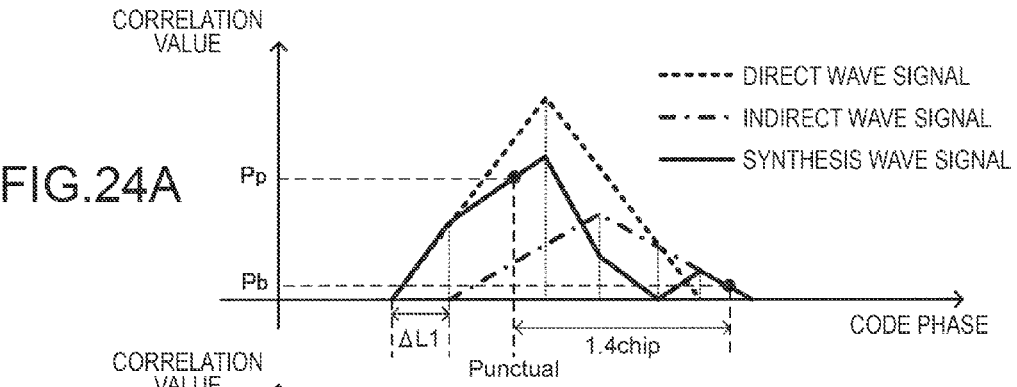
FIGS. 24A to 24D are explanatory diagrams of the relationship between a delay distance ΔL and a PL value in the case of a decreased interference.
Figure 24B:
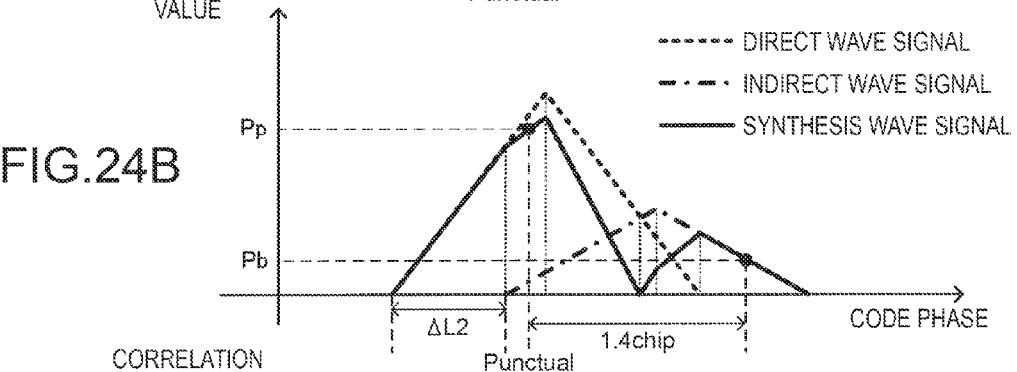
Figure 24C:
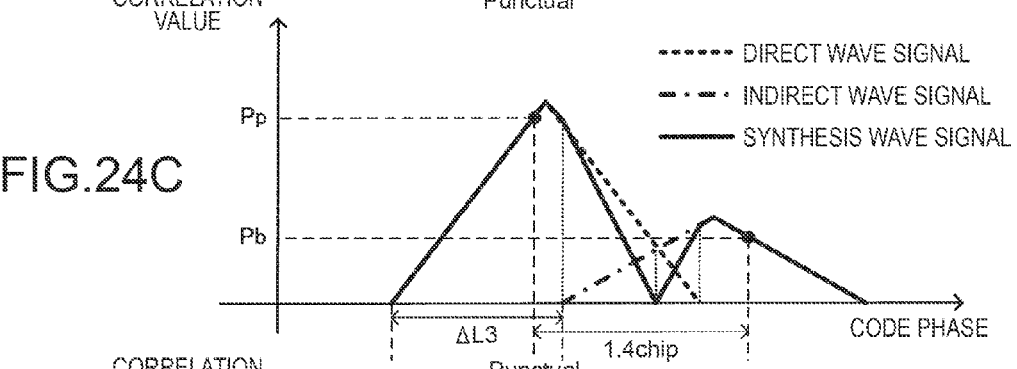
Figure 24D:
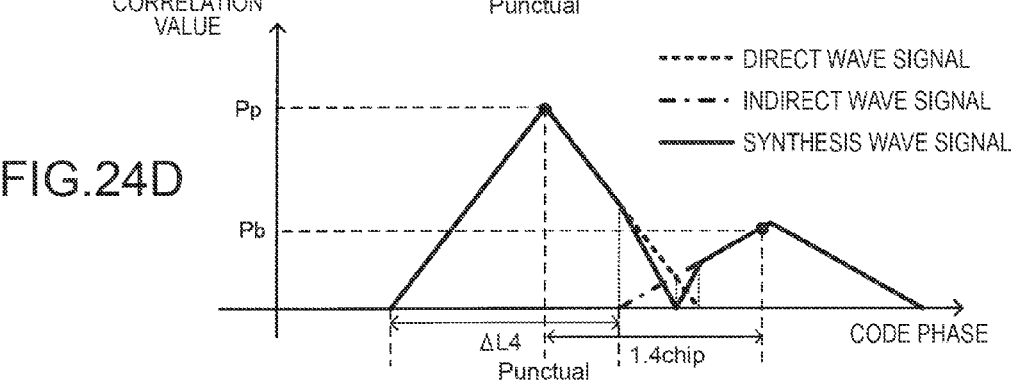

In order to prove the above-described correlation, the relationship between the delay distance ΔL and the PL value was considered in the case where the type of interference was the increased interference and in the case where the type of interference was the decreased interference, respectively. FIGS. 23A to 23D show the results of consideration in the case where the type of interference is the increased interference, and FIGS. 24A to 24D show the results of consideration in the case where the type of interference is the decreased interference. In the respective cases, graphs of the correlation values in the respective delay distances ΔL were drawn by gradually lengthening the delay distance up to ΔL1 to ΔL4. FIG. 23A or 24A shows a case where the delay distance is ΔL1, FIG. 23B or 24B shows a case where the delay distance is ΔL2, FIG. 23C or 24C shows a case where the delay distance is ΔL3, and FIG. 23D or 24D shows a case where the delay distance is ΔL4. In this case, the delay distances ΔL (ΔL1 to ΔL4) in FIGS. 23A to 23D and 24A to 24D and the delay distances ΔL (ΔL1 and ΔL2) in FIGS. 19 to 22 bear no relation to each other.

In the case where the type of the interference is the increased interference, the direct wave signal and the indirect wave signal are strengthened with each other. Accordingly, as illustrated in FIGS. 23A to 23D, the correlation value of the synthesis signal is indicated as the sum of the correlation value of the direct wave signal and the correlation value of the indirect wave signal. It can be known that as the delay distance ΔL is lengthened, the influence of the indirect wave signal on the phase that is delayed for M (=1.4) chips from the punctual phase becomes greater. Specifically, as the delay distance ΔL is lengthened, the correlation value Pb, which was almost zero at first, starts to rise toward the mountain top of the correlation value of the indirect wave signal, and at this time, the ratio of the correlation value Pb to the punctual correlation value Pp is gradually increased to increase the PL value. Accordingly, in the case of the increased interference, it can be known that the delay distance ΔL and the PL value have the positive correlation.

In the case where the type of interference is the decreased interference, the direct wave signal and the indirect wave signal are weakened with each other. Accordingly, as illustrated in FIGS. 24A to 24D, the correlation value of the synthesis signal is indicated as a difference between the correlation value of the direct wave signal and the correlation value of the indirect wave signal. Even in the case of the decreased interference, as the delay distance ΔL is lengthened, the correlation value Pb starts to rise toward the mountain top of the correlation value of the indirect wave signal, and at this time, the ratio of the correlation value Pb to the punctual correlation value Pp is gradually increased to increase the PL value. Accordingly, even in the case of the decreased interference, it can be known that the delay distance ΔL and the PL value have the positive correlation.

Figure 25:
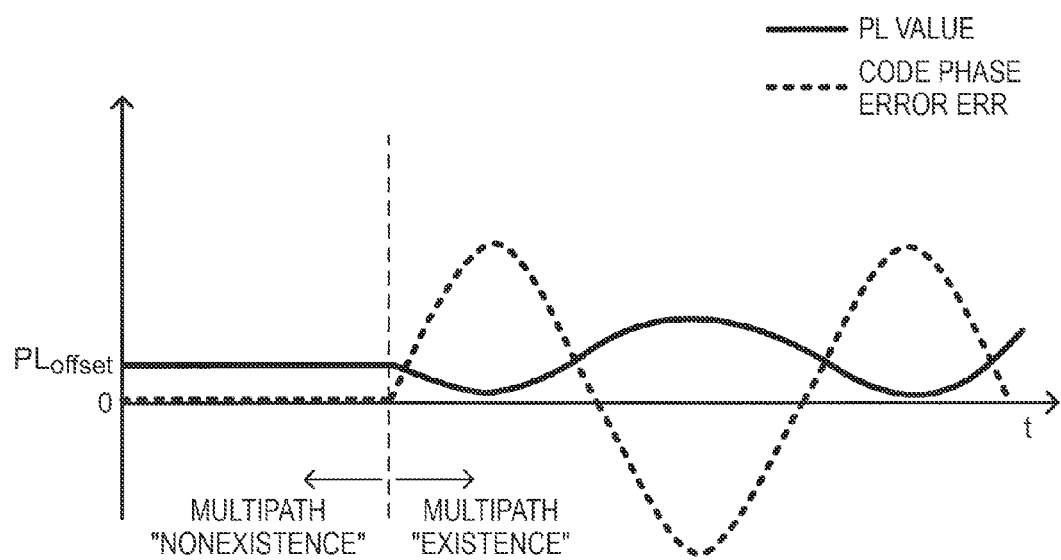
FIG. 25 is a diagram of the relationship between a PL value and a code phase error.

Next, the relationship between the PL value and the code phase error ERR will be described. FIG. 25 is a diagram illustrating the relationship between the PL value of the received signal and the code phase error ERR in the case where simulation experiment is performed by changing the influence of the multipath from "nonexistence" state to "existence" state. In FIG. 25, the horizontal axis is a common time axis, a solid line indicates the temporal change of the PL value, and a dashed line indicates the temporal change of the code phase error ERR.

In the drawing, in a state where the influence of the multipath "does not exist", the received signal in the GPS receiver includes only the direct wave signal. In this case, the code phase error ERR is almost zero, and the PL value becomes a specified value that is close to zero. This is because, as shown in FIG. 18, in the case where the received signal includes only the direct wave signal, the correlation value of the phase that is shifted for one chip or more from the punctual phase is almost zero, and thus the defining equation of the PL value of equation (2) becomes "Pb≅0". The PL value in a state where the influence of the multipath "does not exist", that is, in the case where the indirect wave signal does not exist, is defined as the "PL offset value", and is indicated as "$PL_{offset}$". The PL offset value "$PL_{offset}$" is used to calculate an index value that is called a "ΔPL value" later.

Since the degree of inclination of a triangle of a correlation value differs according to a PRN code of the GPS satellite signal, the PL offset value differs for each GPS satellite. Further, since the height of the triangle of the correlation value differs according to the signal strength of the GPS satellite signal, The PL offset value "$PL_{offset}$" is changed according to the signal strength of the GPS satellite signal. Accordingly, the PL offset value "$PL_{offset}$" may be a value that depends on the number (PRN number) of the GPS satellite and the signal strength of the GPS satellite signal.

On the other hand, in a state where the effect of the multipath "exists", the received signal becomes a multipath signal in which the indirect wave signal is superimposed with the direct wave signal. In this case, the code phase error ERR and the PL value are all changed with the lapse of time. The change of the PL value can be approximated to a sine wave, and its amplitude is determined by the signal strength of the direct wave signal and the indirect wave signal or the difference between carrier distances.

Further, from FIG. 25, it can be known that the PL value and the code phase error ERR make almost the opposite temporal change. That is, if the code phase error ERR is increased, the PL value is decreased. By contrast, if the code phase error ERR is decreased, the PL value is increased. As described above, if the type of interference between the direct wave signal and the indirect wave signal is the increased interference, the code phase error ERR has a positive value, while if the type of the interference is the decreased interference, the code phase error ERR has a negative value. Also, in equation (2), the PL value is calculated as a value that is equal to or more than zero (PL≥0). Further, in the case of the increased interference, the PL value is changed in the decreasing direction, while in the case of the decreased interference, the PL value is change in the increasing direction.

As described above, the direction of increase and decrease of the PL value is changed according to the type of interference (increased interference and decreased interference) between the direct wave signal and the indirect wave signal. On the other hand, the signal strength of the received signal is changed in real time, and the size of increase and decrease (the total size) of the PL value is changed according to the signal strength relationship between the direct wave signal and the indirect wave signal. Due to this, even though the change of the PL value is observed, it is unable to distinguish whether the change is caused by the difference in interference type between the direct wave signal and the indirect wave signal or by the change of the signal strength.

Accordingly, in this embodiment, the value that is obtained by subtracting the PL offset value "$PL_{offset}$" from the PL value is defined as the "ΔPL value", and the reliability determination of the received signal is performed using the ΔPL value. That is, the ΔPL value is calculated according to the calculation equation of "$\Delta PL = PL - PL_{offset}$". In changing increase and decrease of the PL value in FIG. 25, if the PL value is changed in the increasing direction and becomes larger than the PL offset value "$PL_{offset}$" ($PL > PL_{offset}$), the ΔPL value becomes a positive value (ΔPL>0). By contrast, if the PL value is changed in the decreasing direction and becomes smaller than the PL offset value "$PL_{offset}$" ($PL < PL_{offset}$), the ΔPL value becomes a negative value (ΔPL<0). The ΔPL value is a kind of index value of the delay distance of the indirect wave to the direct wave that is included in the multipath signal.

2. Reliability Determination

As the delay distance ΔL becomes longer, the total size of the ΔPL value tends to become larger. Further, focusing on the relationship between the delay distance ΔL and the code phase error ERR, as the delay distance ΔL becomes longer, the amplitude of the change of the code phase error ERR tends to become smaller. From this, as the total size of the ΔPL value becomes larger, the amplitude of the change of the code phase error ERR may become smaller. If the amplitude of the change of the code phase error ERR is small, it is easy to put the code phase close to the true value. Accordingly, as the ΔPL value is totally larger, the amplitude of the change of the code phase error ERR becomes smaller, and the reliability of the received signal becomes higher.

Accordingly, in this embodiment, by performing determination of a threshold value of the ΔPL value, the reliability of the received signal is classified into any one of "high" and "low". That is, it is determined whether the ΔPL value is equal to or larger than the threshold value for reliability determination (or exceeds the threshold value for reliability determination) and whether the ΔPL value is smaller than the threshold value for reliability determination (or is equal to or smaller than the threshold value for reliability determination). In the former case, the reliability of the received signal is determined to be "high", and in the latter case, the reliability of the received signal is determined to be "low".

Figure 26:
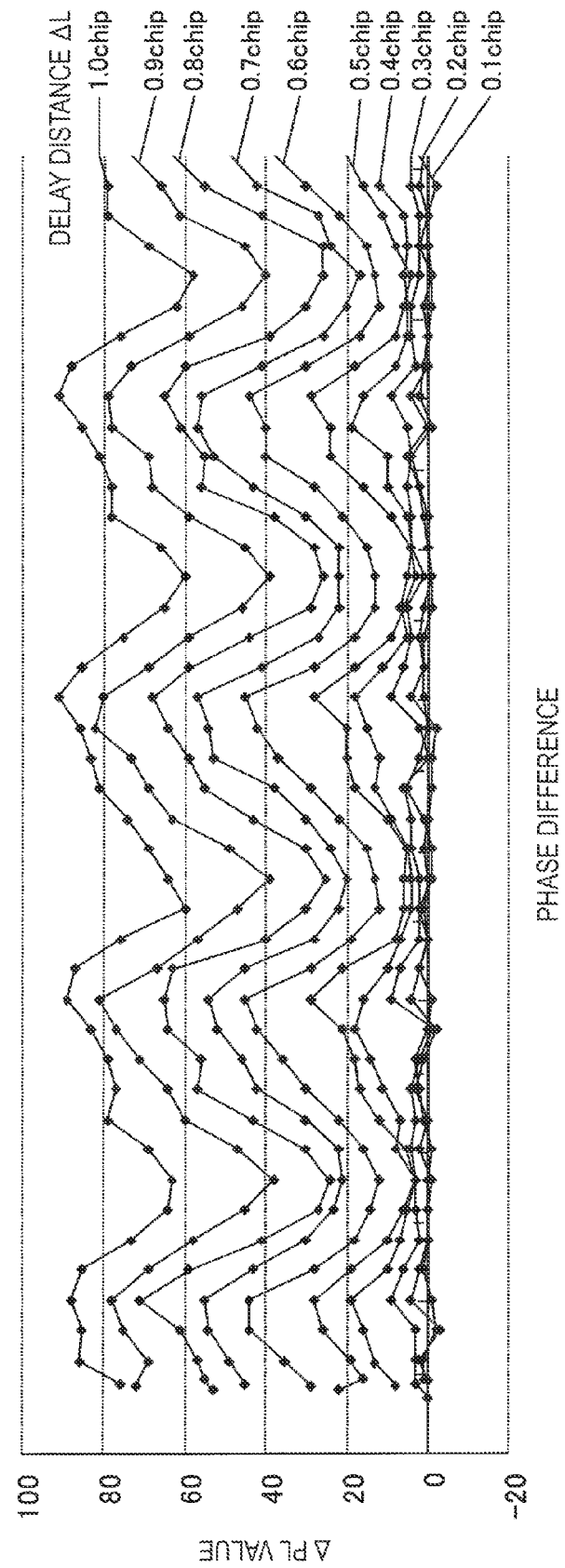
FIG. 26 is a diagram illustrating an example of the result of experiment that measures the changing trend of a ΔPL value for each delay distance ΔL.

FIG. 26 is a graph illustrating an example of the result of experiment that measures the changing trend of the ΔPL value. Focusing on a certain GPS satellite, an experiment for changing the delay distance ΔL in the unit of 0.1 chip in the range of 0.1 to 1.0 chip and investigating the ΔPL value in the respective delay distances ΔL was performed. Here, the temporal change of the ΔPL value was plotted in the case where the phase difference between the direct wave signal and the indirect wave signal was changed to go round in 10 seconds in the range of "0° to 360°". In FIG. 26, the horizontal axis represents a phase difference (time), and the vertical axis represents the ΔPL value.

Referring to FIG. 26, the ΔPL value vibrates up and down according to the phase difference, and the changing trends of increase and decrease are equal to each other regardless of the delay distance ΔL. It is characteristic of the ΔPL values that the ΔPL values become the same value as that in the case where the ΔPL values are totally biased. As the delay distance ΔL becomes longer, the ΔPL value tends to totally become larger.

Figure 27:
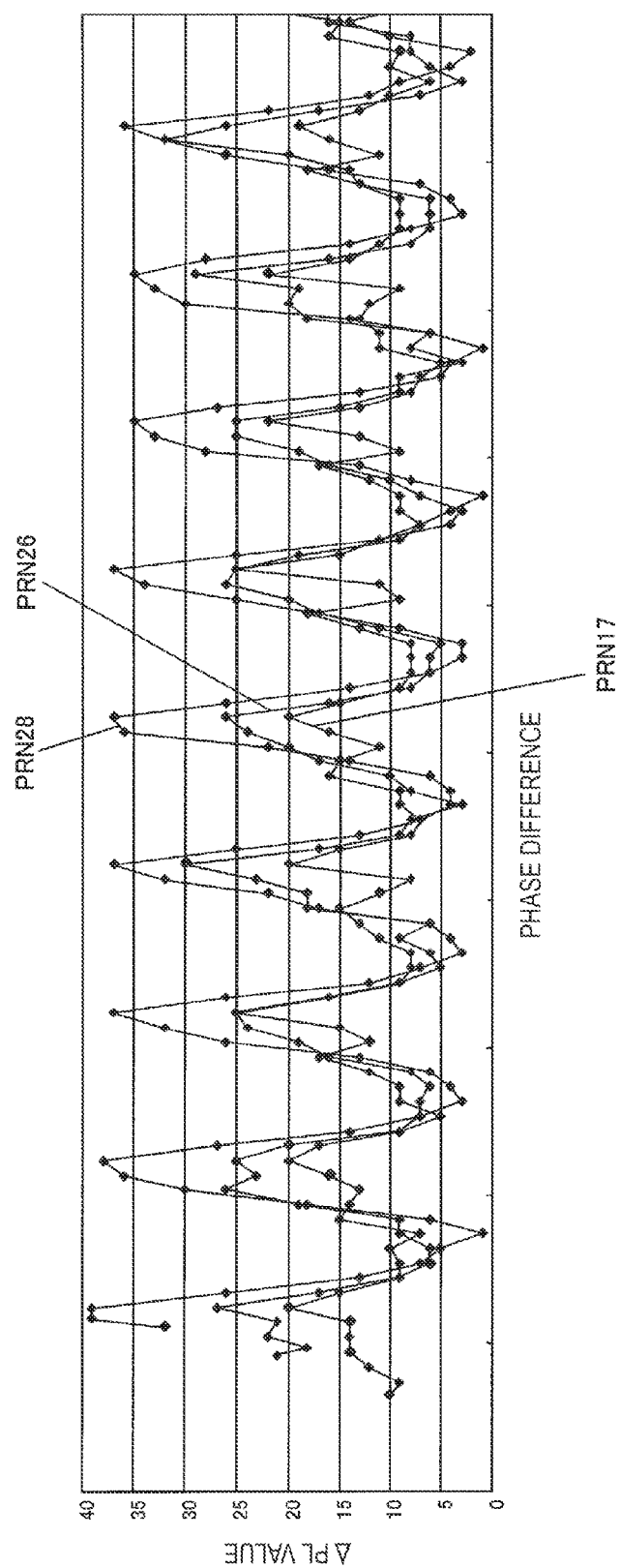
FIG. 27 is a diagram illustrating an example of the result of experiment that measures the changing trend of a ΔPL value for each GPS satellite.

FIG. 27 is a diagram illustrating an example of the result of experiment that measures the changing trend of the ΔPL value for each GPS satellite. An experiment for investigating the changing trend of the ΔPL value for each GPS satellite was performed in a state where the delay distance ΔL is fixed. In this experiment, three GPS satellites having PRN numbers of "17", "26", and "28" were extracted and the ΔPL value was investigated. Even in this experiment, the temporal change of the ΔPL value was plotted in the case where the phase difference between the direct wave signal and the indirect wave signal was changed to go round in 10 seconds in the range of "0° to 360°". In FIG. 27, the horizontal axis represents a phase difference (time), and the vertical axis represents the ΔPL value.

As seen in this drawing, it can be known that the changing trends of increase and decrease of the ΔPL value are equal to each other regardless of the GPS satellites. However, it can be known that the amplitude of the increase and decrease change of the ΔPL value differs according to the GPS satellites. That is, although the timing of increase and decrease of the ΔPL value is almost the same with respect to the respective GPS satellites, the amplitude of the increase and decrease change differs for each satellite. Accordingly, by performing the experiment for investigating the increase and decrease change of the ΔPL value with respect to all the GPS satellites, it could be known that the amplitude of the increase and decrease change of the ΔPL value could be briefly classified into three groups.

Figure 28:
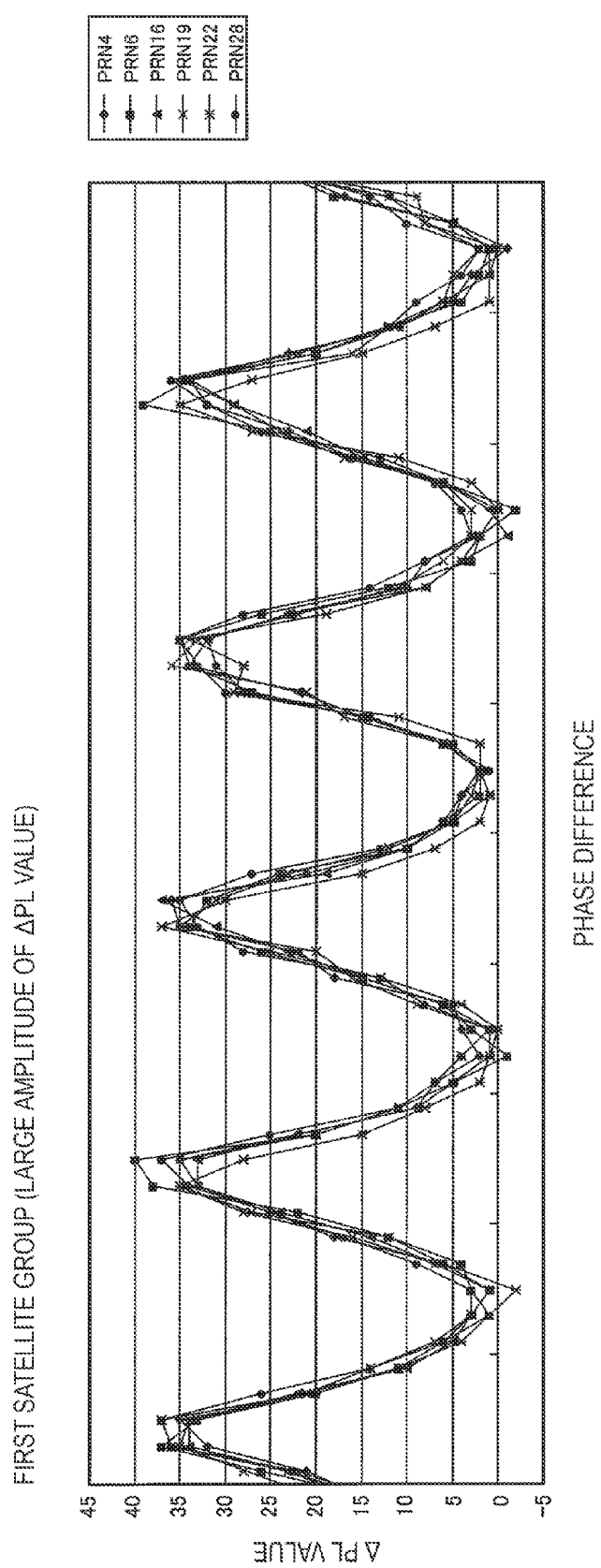
FIG. 28 is a diagram illustrating an example of the result of experiment that measures the changing trend of a ΔPL value of a first satellite group.
Figure 29:
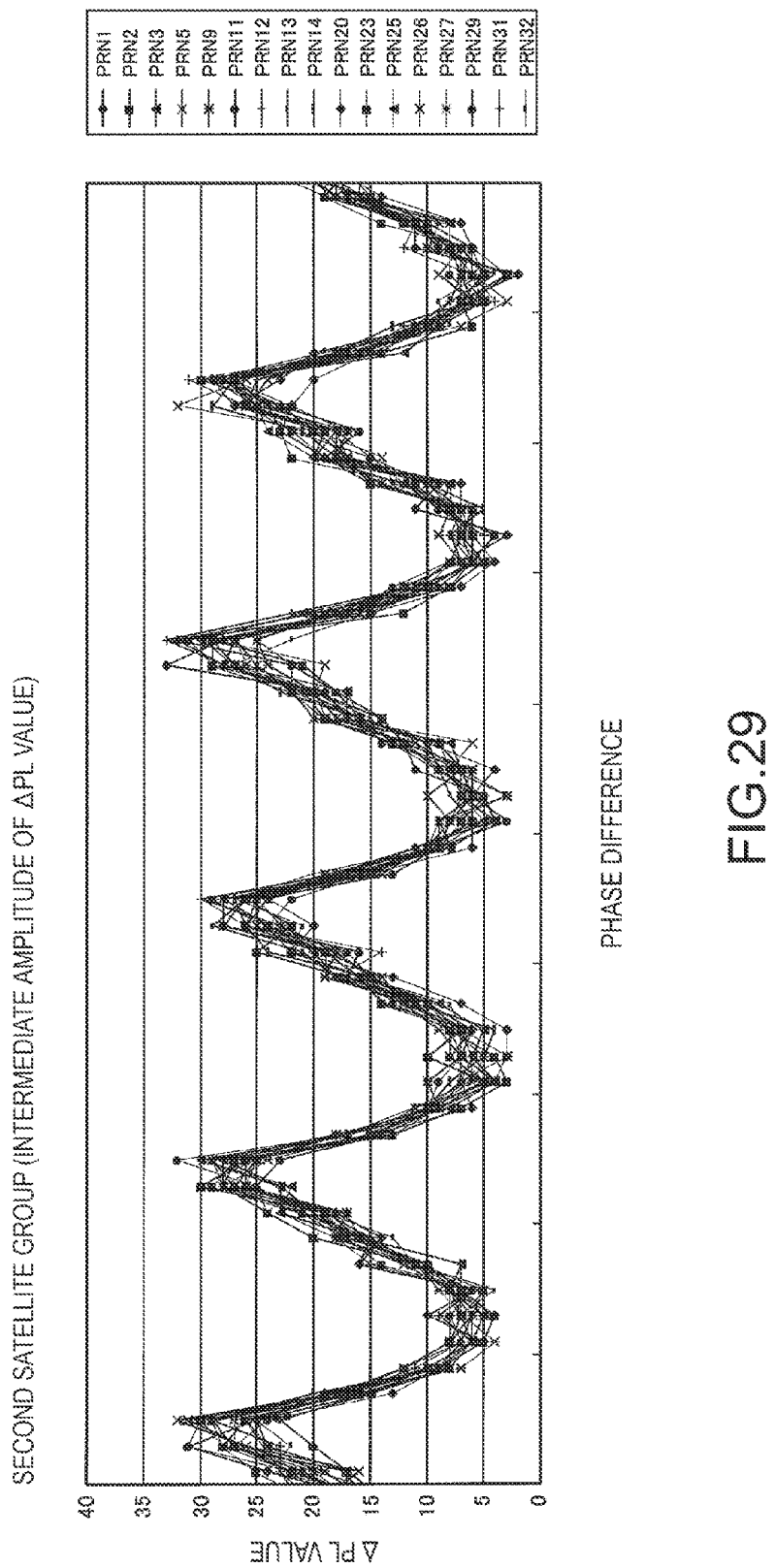
FIG. 29 is a diagram illustrating an example of the result of experiment that measures the changing trend of a ΔPL value of a second satellite group.
Figure 30:
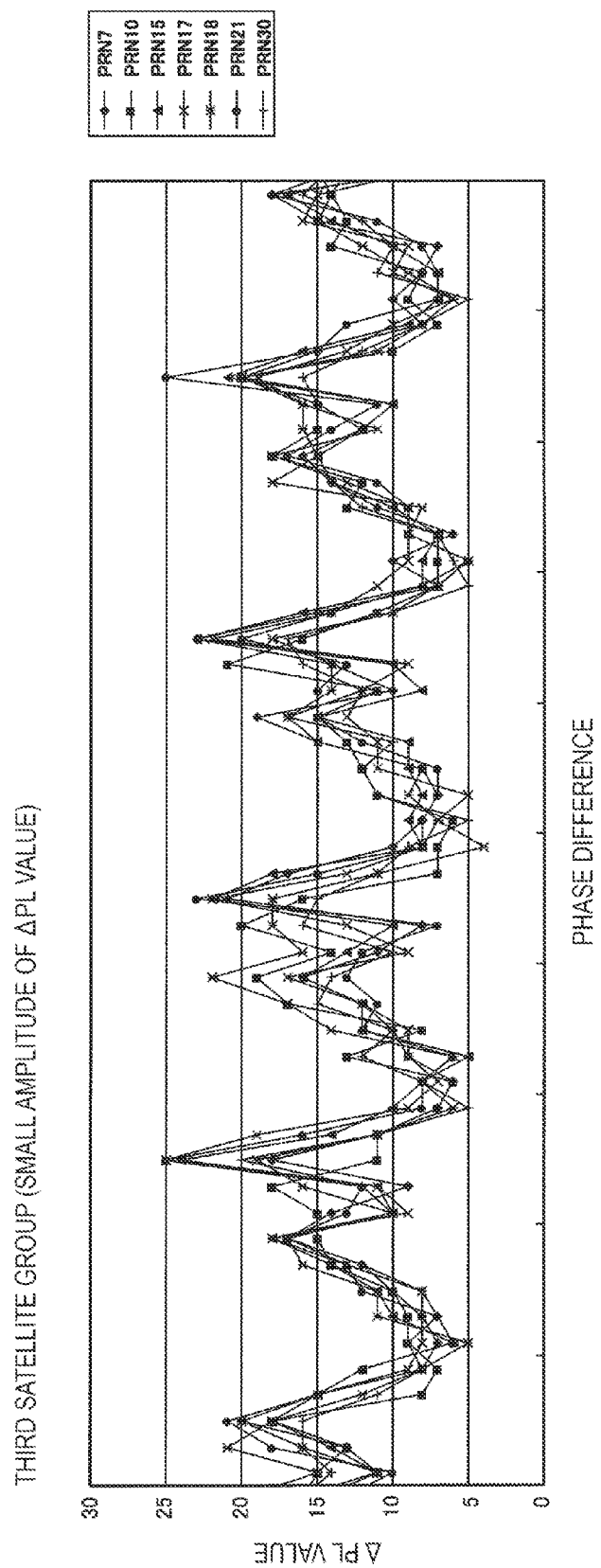
FIG. 30 is a diagram illustrating an example of the result of experiment that measures the changing trend of a ΔPL value of a third satellite group.

FIGS. 28 to 30 are diagrams illustrating the result of grouping the ΔPL values measured with respect to the respective GPS satellites according to the amplitudes of the increase and decrease change of the ΔPL values. It is assumed that a satellite group having a large amplitude of the ΔPL value is "a first satellite group (large amplitude of the ΔPL value)", a satellite group having an intermediate amplitude of the ΔPL value is "a second satellite group (intermediate amplitude of the ΔPL value)", and a satellite group having a small amplitude of the ΔPL value is "a third satellite group (small amplitude of the ΔPL value)", and the results of the respective satellite groups are shown in FIGS. 28 to 30. In the drawings, the horizontal axis represents a phase difference (time), and the vertical axis represents the ΔPL value.

As seen from the drawings, the width of increase and decrease change (double the amplitude) from the maximum value to the minimum value of the ΔPL value is about "35" in the first satellite group of FIG. 28. Further, the width is about "25 to 35" in the second satellite group of FIG. 29, and the width is about "20 or less" in the third satellite group of FIG. 30. From the results, it can be known that the amplitudes of increase and decrease change of the ΔPL values in the satellite groups are different from one another. The inventor considered the reason why the above-described results were obtained.

A C/A code is a code inherent to each GPS satellite (PRN number). That is, although the C/A code is composed of 1023 chips, the changing pattern of the value of each chip (hereinafter referred to as a "chip value") differs for each GPS satellite (PRN number). The inventor presumed if the changing pattern of the chip value of each C/A code was related to the amplitude of increase and decrease change of the ΔPL value. Accordingly, the inventor investigated the changing pattern of the chip value of the C/A code.

Figure 31:
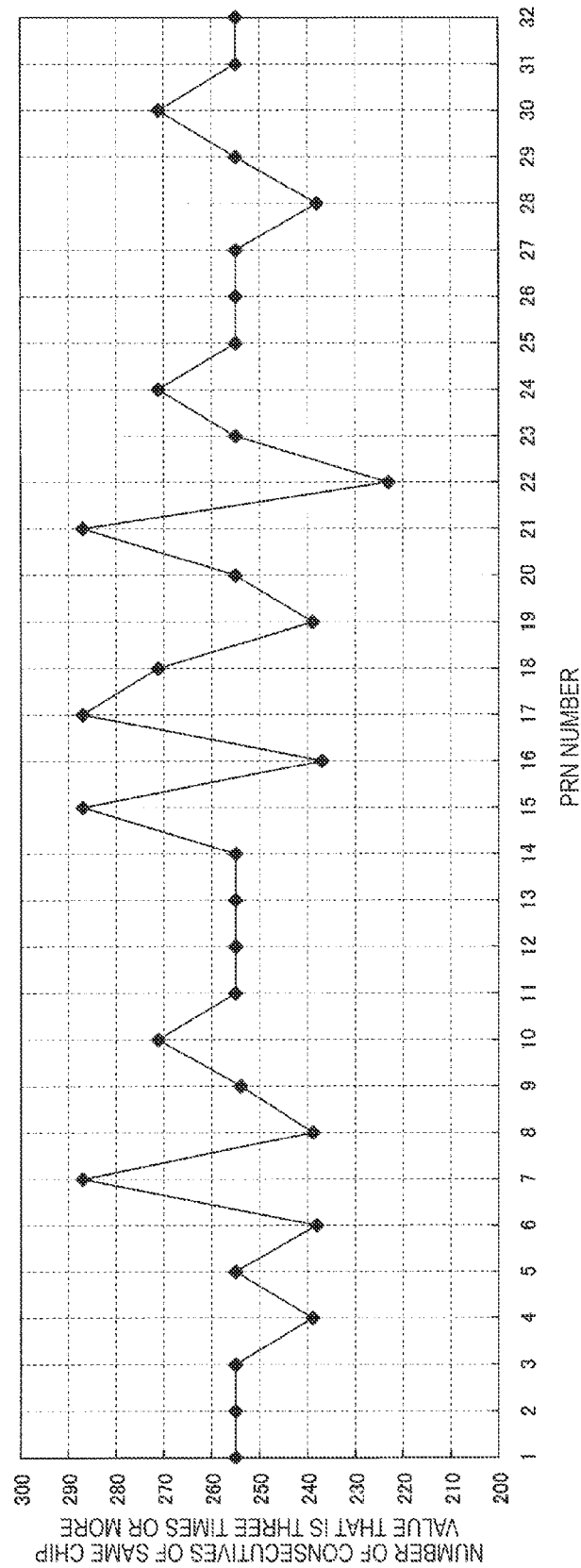
FIG. 31 is a diagram illustrating an example of the result of experiment that examines the continuity of a chip value.

FIG. 31 is a diagram illustrating an example of the result of experiment for investigating the changing pattern of the chip value of the C/A code. In FIG. 31, the horizontal axis represents PRN numbers of "1 to 32". Further, the vertical axis represents the number of times (hereinafter simply referred to as "the number of consecutives") "S", the same chip value is consecutive three or more times with respect to the C/A code of the corresponding PRN number. As seen from this graph, it can be known that the number of consecutives "S" differs for each PRN number, but can be briefly classified into a group of "S>255", a group of "S=254 or 255", and a group of "S<254".

Specifically, the PRN numbers {7, 10, 15, 17, 18, 21, 24, 30} belong to the group of "S>255", the PRN numbers {1, 2, 3, 5, 9, 11, 12, 13, 14, 20, 23, 25, 26, 27, 29, 31, 32} belong to the group of "S=254 or 255", and the PRN numbers {4, 6, 8, 16, 19, 22, 28} belong to the group of "S<254". By comparing three groups that are classified according to the number of consecutives with the first to third satellite groups illustrated in FIGS. 28 to 30, it can be known that they are under the same classification except for the PRN numbers "8" and "24". From this, it is expected there is relevance between the number of consecutives of the chip values such as the C/A codes and the amplitude of increase and decrease change of the ΔPL values.

Figure 32:
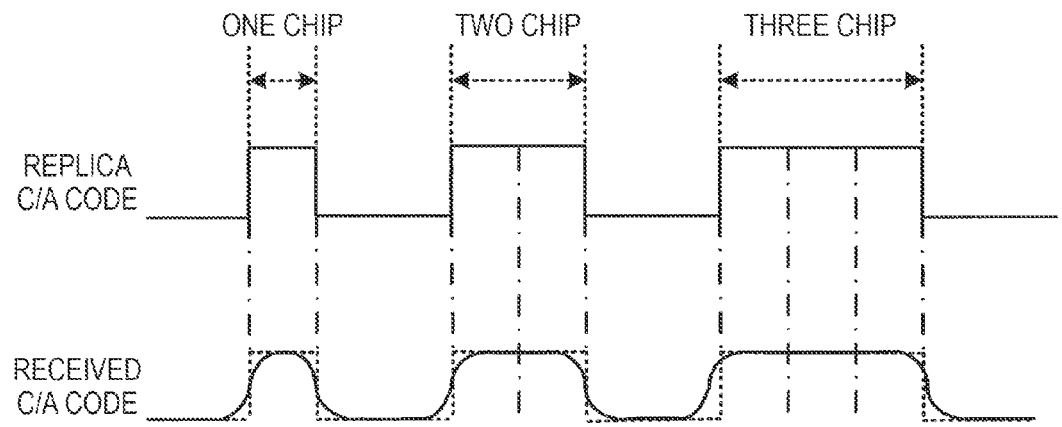
FIG. 32 is an explanatory diagram of the relationship between the number of consecutives of a chip value and the amplitude of increase and decrease of a ΔPL value.

FIG. 32 is an explanatory diagram of the result of considering the above-described relevance. The inventor considered that the number of consecutives of the chip values such as the C/A codes was effective in the correlation operation of the received C/A code and the replica C/A code, and obtained the following results. Referring to FIG. 32, a case of performing the correlation operation of the received C/A code, the PRN number, and the replica C/A code of which the code phase is accurately coincident will be described. The uppermost end indicates the replica C/A code, and the second end indicates the received C/A code.

In the case of performing a signal process of a GPS satellite signal, it is general that a GPS receiver attenuates a high-band frequency signal by making the received signal pass through a filter in the front end portion in a receiving circuit. By the action of this filter, the shape of the received C/A code does not become an ideal pulse waveform such as the replica C/A code as shown at the uppermost end, but is a blunt shape in which edges as shown at the second end are removed. In this case, by performing the correlation operation of the received C/A code and the replica C/A code, a loss of correlation power occurs.

Figure 33:
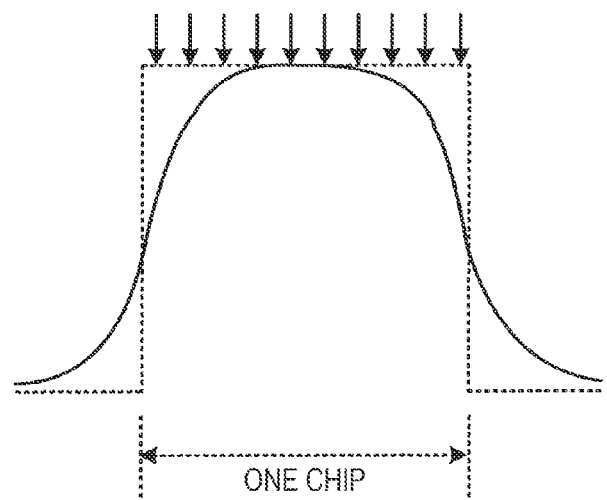
FIG. 33 is an explanatory diagram of a correlation operation.

When the correlation operation is performed, for example, as shown in FIG. 33, the received C/A code and the replica C/A code are sampled at sampling intervals of 1/n (n is an integer that is equal to or larger than 2) of the chip period of each C/A code. That is, 1023 chips, which correspond to the code length of the C/A code, are sampled at an interval of 1/n chip. In FIG. 33, sampling timing is indicated by arrows which are directed downward. Further, the correlation value is calculated by multiplying the sampling value of the received C/A code and the sampling value of the replica C/A code in each sampling timing and adding the results of multiplication together.

If the phase of the received C/A code accurately coincides with the phase of the replica C/A code, the result of multiplication in each sampling timing will be "1=1×1 or (−1)×(−1) by multiplication of the sampling value (1 or −1) of the received C/A code and the sampling value (1 or −1) of the replica C/A code. However, since the shape of the received C/A code is blunt, the result of multiplication may not be "1" in the sampling timing of the blunt portion. The correlation value that is finally obtained may be smaller than an ideal value due to a loss of the above-described correlation power.

The loss of the correlation power occurs in a portion where the chip value rises from "0" to "1" and in a portion where the chip value falls from "1" to "0". In this case, if the number "S" of consecutives of the same chip value becomes larger, the loss of the correlation power becomes lower that much. For example, in FIG. 32, in the chip portion where the number of consecutives is "1", the loss of the correlation power occurs in both side portions of the corresponding chip, and thus the loss of the correlation power in the corresponding chip portion becomes higher. In the chip portion where the number of consecutives is "2", the loss of the correlation power occurs in both side portions of the two consecutive chips, but no loss of the correlation power occurs in the center portion. Further, in the chip portion where the number of consecutives is "3", no loss of the correlation power occurs in the center chip among the three consecutive chips.

Figure 34:
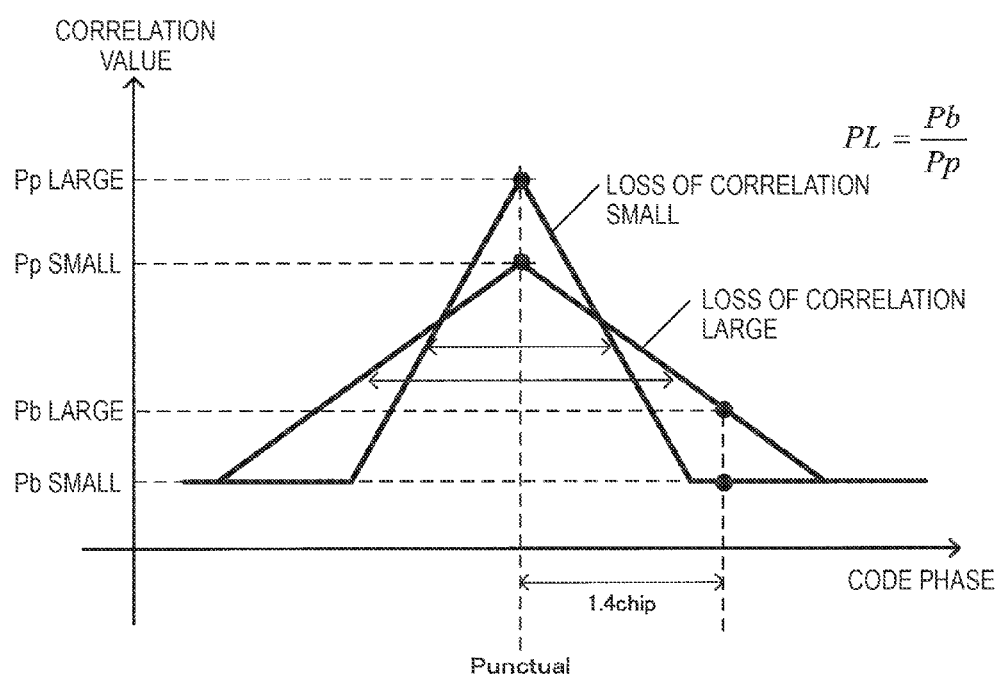
FIG. 34 is an explanatory diagram of the relationship between a loss of correlation power and a shape of a correlation value.

FIG. 34 is a diagram illustrating the relationship between the loss of the correlation power and the shape of the correlation value. If the loss of the correlation power becomes higher, the finally obtained correlation value becomes smaller that much. Due to this, in the case where the loss of the correlation power is high in comparison to a case where the loss of the correlation power is low, the correlation peak value becomes smaller. Further, in the case where the loss of the correlation is high, the result of multiplication does not occur accurately in respective sampling timing, and the permissible amount of phase shift becomes larger. That is, even if the phase of the replica C/A code is somewhat shifted from the phase of the received C/A code, the result of multiplication would have a value in somewhat extensive sampling timing. As a result, the mountain width of the correlation peak (the code phase width around the peak phase) tends to be widened as the loss of the correlation power becomes higher.

The PL value is the ratio of the correlation value Pb of the phase delayed for a specified phase from the punctual phase to the punctual correlation value Pp. Due to this, the punctual correlation value Pp becomes smaller, and as the correlation value Pb becomes larger, the PL value become larger. As the loss of the correlation power becomes higher, the punctual correlation value Pp becomes smaller and the correlation value Pb becomes larger, and thus the PL value becomes larger. Accordingly, it is considered that the PL value becomes relatively large in the case where the loss of the correlation power becomes higher in comparison to the case where the loss of the correlation power becomes smaller.

If the PL value becomes larger, the ΔPL value tends to become larger. Due to this, as the loss of the correlation power becomes higher, the ΔPL value tends to become larger. Although the ΔPL value is changed by the phase difference between the direct wave signal and the indirect wave signal, it is considered that as the loss of the correlation power becomes higher, the maximum value of the ΔPL value becomes larger, and thus the amplitude of increase and decrease change of the ΔPL value also becomes larger. As described above, the loss of the correlation power becomes higher in the case where the number of consecutives of the same chip value such as the C/A code is small. Accordingly, the amplitude of the change of the ΔPL value becomes larger in the satellite group in which the number of consecutives of the same chip value such as the C/A code is small, and the amplitude of the change of the ΔPL value becomes smaller in the satellite group in which the number of consecutives of the same chip value is large.

Up to now, the relationship between the satellite group and the amplitude of increase and decrease change of the ΔPL value has been considered. Since the amplitude of the ΔPL value differs for each satellite group as described above, in order to distinguish (discriminate) the ΔPL value between the satellite groups, it is necessary to set the threshold value for reliability determination for each satellite group. As the threshold value for reliability determination, an appropriate value may be selected and set based on the amplitude of increase and decrease change of the ΔPL value that is observed with respect to each satellite group.

Further, since the ΔPL value is changed to be increased or decreased, it is appropriate to set different threshold values in the case where the ΔPL value is changed in the increasing direction and in the decreasing direction. For example, it is easy to think of it focusing on the maximum value and the minimum value of the ΔPL value. In the case of thinking of the same phase difference, in order to distinguish the maximum values of the ΔPL values between the satellite groups, it is necessary to set the threshold value to a large value as the amplitude of the ΔPL value is large in the satellite group. In contrast, in the case of thinking of the same phase difference, in order to distinguish the minimum values of the ΔPL values between the satellite groups, it is necessary to set the threshold value to a small value as the amplitude of the ΔPL value is large in the satellite group.

Accordingly, in this embodiment, the threshold value condition on the ΔPL value is changed according to the type of interference between the direct wave signal and the indirect wave signal. This is because the direction of increase and decrease of the ΔPL value is changed according to the type of interference. If the type of interference is the increased interference, the ΔPL value is changed in the decreasing direction. In contrast, if the type of interference is the decreased interference, the ΔPL value is changed in the increasing direction.

In this embodiment, the type of interference between the direct wave signal and the indirect wave signal is detected using an index value that is called a "$\Delta PE$ value" that is obtained by subtracting the PE offset value from the PE value in equation (1). That is, the $\Delta PE$ value is calculated according to the calculation equation of "$\Delta PE = PE - PE_{offset}$". Here, although illustration and detailed description thereof will be omitted, if the type of interference is the increased interference, the $\Delta PE$ value becomes a positive value. In contrast, if the type of interference is the decreased interference, the $\Delta PE$ value becomes a negative value.

In summary, if the $\Delta PE$ value is positive ($\Delta PE \geq 0$), the type of interference becomes the increased interference, and the $\Delta PL$ value is changed in the decreasing direction. Due to this, the threshold value for reliability determination is set to be small in the satellite group in which the amplitude of the change of the $\Delta PL$ value is large (first threshold value condition). This corresponds to the determination of the threshold value condition (the first threshold value condition) in the case where the type of interference is the increased interference so that the amplitude of the change of the $\Delta PL$ value and the threshold value for reliability determination have negative correlation.

In contrast, if the $\Delta PE$ value is negative ($\Delta PE < 0$), the type of interference becomes the decreased interference, and the $\Delta PL$ value is changed in the increasing direction. Due to this, the threshold value for reliability determination is set to be large in the satellite group in which the amplitude of the change of the $\Delta PL$ value is large (second threshold value condition). This corresponds to the determination of the threshold value condition (the second threshold value condition) in the case where the type of interference is the decreased interference so that the amplitude of the change of the $\Delta PL$ value and the threshold value for reliability determination have positive correlation.

1-3. Calculation of the Code Phase Error

Next, a method of calculating a code phase will be described. As the $\Delta PL$ value becomes larger, the reliability of the received signal becomes higher, and as the reliability of the received signal becomes higher, the amplitude of the change of the code phase error ERR becomes smaller. That is, the reliability of the received signal relates to the size of the amplitude of the code phase error ERR. Further, in the case where the direct wave signal and the indirect wave signal are strengthened (the increased interference), the code phase error ERR has a positive value, while in the case where the direct wave signal and the indirect wave signal are weakened (the decreased interference), the code phase error ERR has a negative value. That is, the type of interference between the direct wave signal and the indirect wave signal relates to positive and negative signs of the code phase error ERR.

Based on these findings, the inventor determined that it was appropriate to calculate the code phase error ERR by changing the respective calculation methods based on two factors: (a) the type of interference between the direct wave signal and the indirect wave signal and (b) the reliability of the received signal. (a) The type of interference between the direct wave signal and the indirect wave signal can be determined based on the $\Delta PE$ value, and (b) the reliability of the received signal can be determined based on the $\Delta PL$ value.

More specifically, model equations for calculating the code phase error ERR are prepared with respect to four kinds of patterns: (A) the sign of the $\Delta PE$ value is "positive" and the reliability of the received signal is "high", (B) the sign of the $\Delta PE$ value is "positive" and the reliability of the received signal is "low", (C) the sign of the $\Delta PE$ value is "negative" and the reliability of the received signal is "high", and (D) the sign of the $\Delta PE$ value is "negative" and the reliability of the received signal is "low". For example, the following error model equations (3) to (6) are prepared.

$$ERR = a_1 \cdot \Delta PE + b_1 (\Delta PE \geq 0, \text{ or the reliability of the received signal is high}) \quad (3)$$

$$ERR = a_2 \cdot \Delta PE + b_2 (\Delta PE \geq 0, \text{ or the reliability of the received signal is low}) \quad (4)$$

$$ERR = a_3 \cdot \Delta PE + b_3 (\Delta PE < 0, \text{ or the reliability of the received signal is high}) \quad (5)$$

$$ERR = a_4 \cdot \Delta PE + b_4 (\Delta PE < 0, \text{ or the reliability of the received signal is low}) \quad (6)$$

However, "$a_1$" to "$a_4$" and "$b_1$" to "$b_4$" are coefficients according to the respective error model equations. These error model equations may be obtained, for example, by applying a least squares method to the $\Delta PE$ value and sample data of the code phase error ERR.

Further, the code phase error ERR is calculated by selecting one of the error model equations based on positive and negative of the $\Delta PE$ value and the reliability of the received signal. That is, by substituting $\Delta PE$ value in the selected error model equation, the code phase error ERR is calculated. If the code phase error ERR is calculated, the code phase error ERR is corrected by subtracting the code phase error ERR from the code phase acquired through the correlation operation.

The code phase calculated as above becomes the error-corrected code phase having high accuracy. Accordingly, the accuracy of the position calculation can be improved by calculating pseudo distance between the GPS satellite and the GPS receiver using the corresponding code phase and using the pseudo distance in position calculation.

2. Results of experiments

Figure 35:
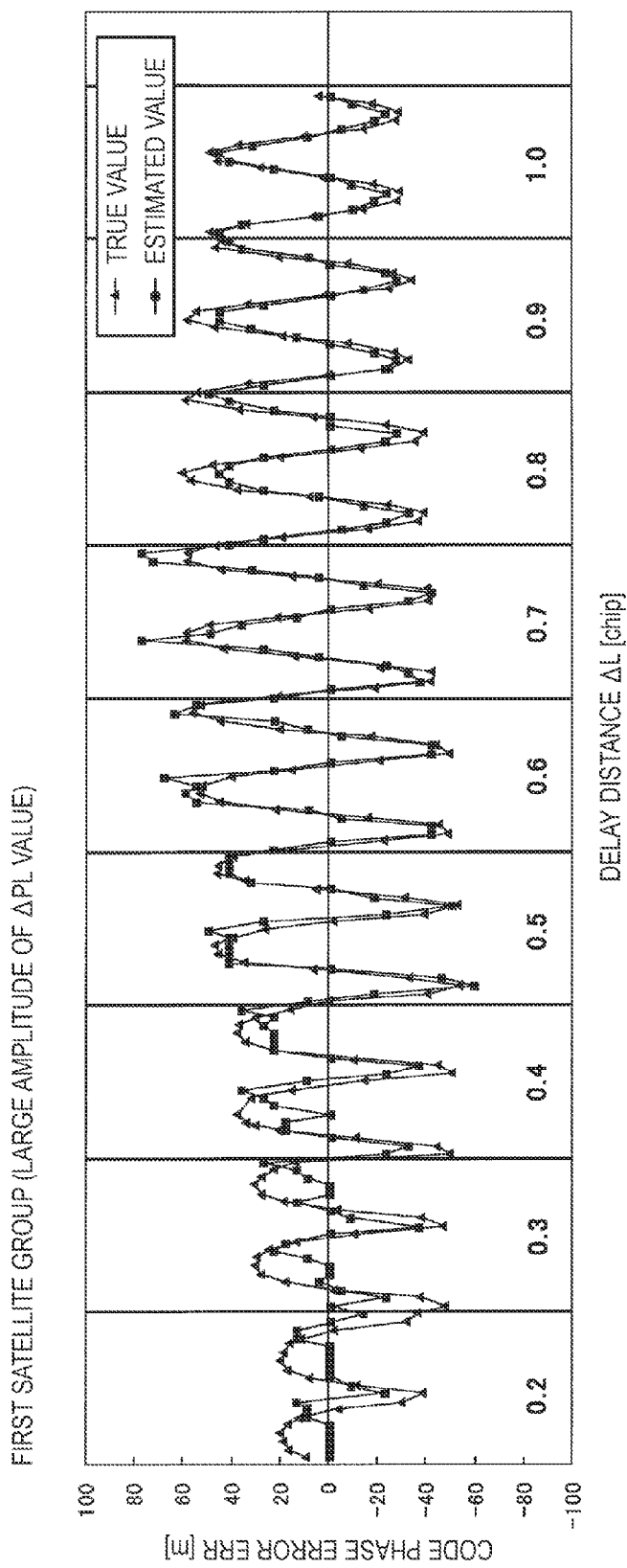
FIG. 35 is a diagram illustrating an example of the result of experiment that calculates a code phase error with respect to a first satellite group.
Figure 36:
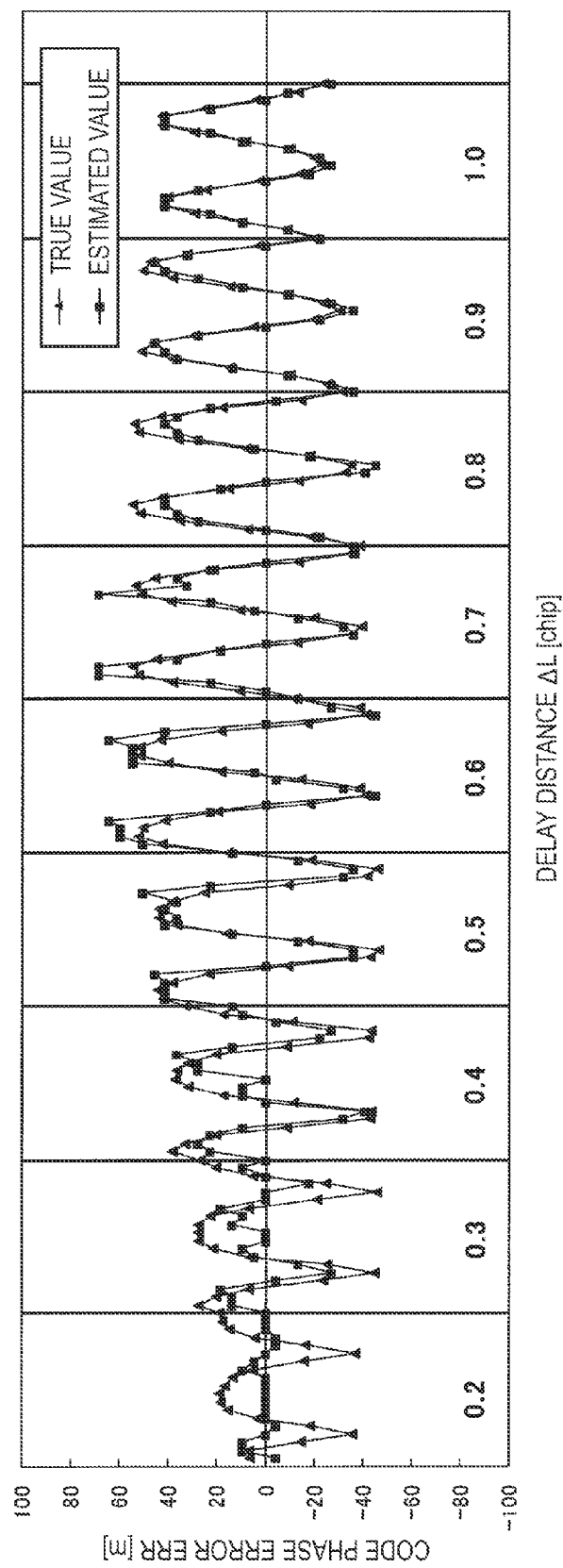
FIG. 36 is a diagram illustrating an example of the result of experiment that calculates a code phase error with respect to a second satellite group.
Figure 37:
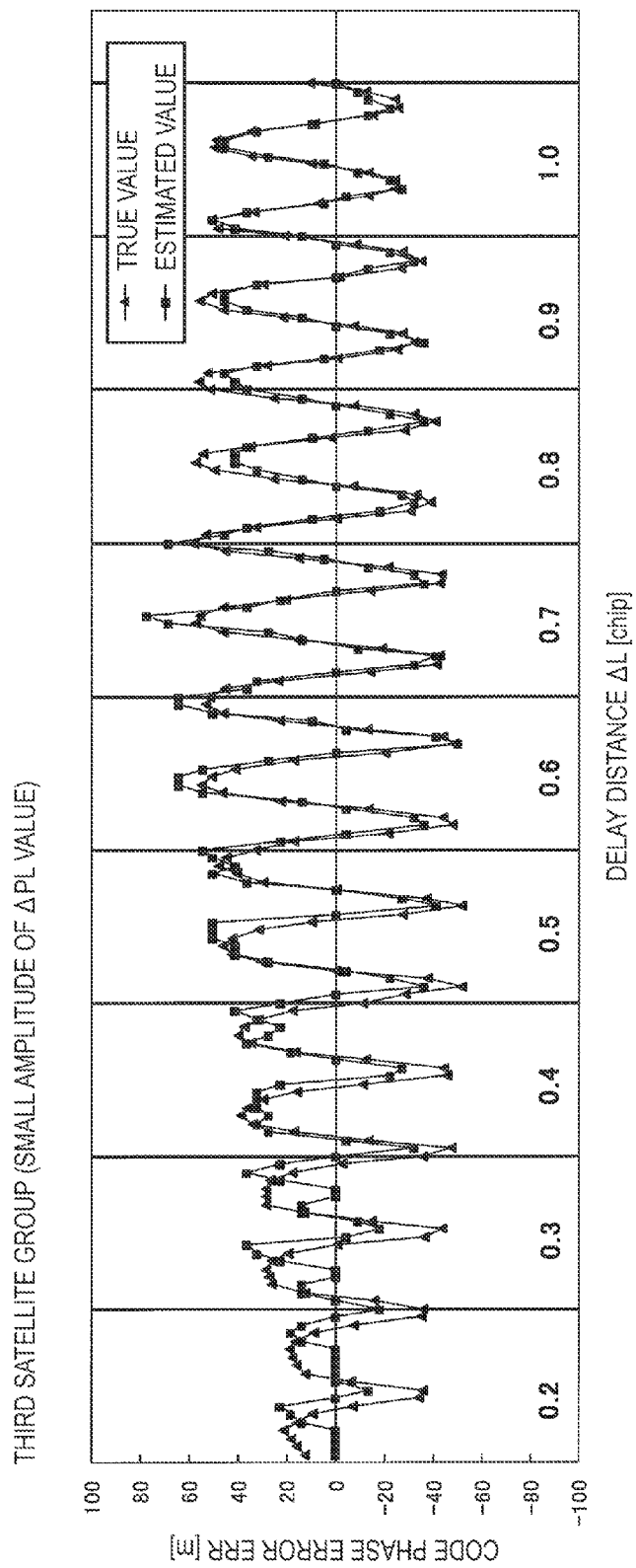
FIG. 37 is a diagram illustrating an example of the result of experiment that calculates a code phase error with respect to a third satellite group.

FIGS. 35 to 37 are diagrams illustrating an example of the results of experiments for calculating the code phase error ERR according to the above-described principle. Experiments were performed with respect to the first to third satellite groups as described above in the principle. FIG. 35 shows the code phase error ERR calculated with respect to the first satellite group, FIG. 36 shows the code phase error ERR calculated with respect to the second satellite group, and FIG. 37 shows the code phase error ERR calculated with respect to the third satellite group. The change of the code phase error ERR in each delay distance $\Delta L$ was observed by changing the delay distance $\Delta L$ in the unit of 0.1 chip in the range of "0.2 chip to 1.0 chip". The true value of the code phase error ERR is indicated by a triangular plot, and the estimated value of the calculated code phase error ERR is indicated by a rectangular plot.

As seen from the drawings, if the delay distance $\Delta L$ is "0.2 chip", the follow-up to the true value of the estimated value is not so good. However, if the delay distance $\Delta L$ is "0.3 chip or more", it can be known that the follow-up to the true value of the estimated value gets better. Particularly, in the respective satellite groups, if the delay distance $\Delta L$ is "1.0 chip", the estimated value almost coincides with the true value, and thus it can be known that the very good result can be obtained. In the environment surrounded by high-rise buildings such as an urban canyon environment, the delay distance $\Delta L$ tends to be lengthened. Thereby, it can be known that a method of calculating a code phase error in this embodiment is useful in a multipath environment.

3. Embodiment

Next, an embodiment of a position calculation apparatus for calculating the position by performing determination of the multipath signal, reliability determination of the received signal and calculation of the code phase error according to the above-described principle will be described. Here, a mobile phone that is a kind of electronic appliance having a position calculation apparatus is exemplified.

3-1. Functional Configuration of a Mobile Phone

Figure 38:
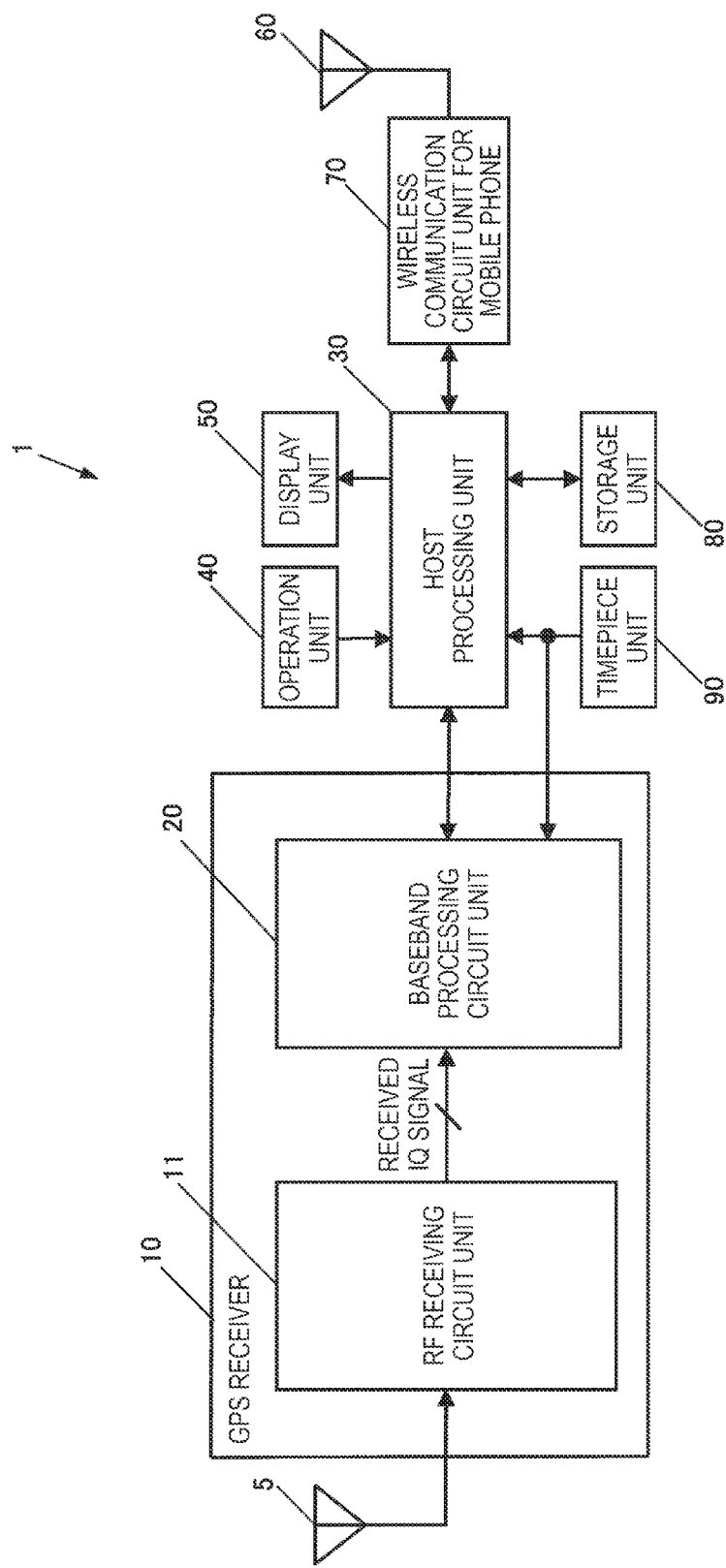
FIG. 38 is a block diagram illustrating an example of the functional configuration of a portable phone.

FIG. 38 is a block diagram illustrating an example of a functional configuration of a mobile phone 1 according to this embodiment. The mobile phone 1 includes a GPS antenna 5, a GPS receiving unit 10, a host processing unit 30, an operation unit 40, a display unit 50, an antenna 60 for a mobile phone, a wireless communication circuit unit 70 for a mobile phone, a storage unit 80, and a timepiece unit 90.

The GPS antenna 5 is an antenna that receives an RF (Radio Frequency) signal including a GPS satellite signal originating from the GPS satellites, and outputs a received signal to the GPS receiving unit 10.

The GPS receiving unit 10 is a position calculation circuit or a position calculation device that measures the position of the mobile phone 1 based on the signal output from the GPS antenna 5, and is a function block that corresponds to a so-called GPS receiving device. The GPS receiving unit 10 includes an RF receiving circuit unit 11 and a baseband processing circuit unit 20. Further, the RF receiving circuit unit 11 and the baseband processing circuit unit 20 may be fabricated as different LSI (Large Scale Integration) or may be fabricated into one chip.

The RF receiving circuit unit 11 is a receiving circuit of an RF signal. As a circuit configuration, for example, the RF receiving circuit unit 11 may be so configured that the RF signal output from the GPS antenna 5 is converted into a digital signal through an A/D converter and the digital signal is processed through a receiving circuit. Further, the RF receiving circuit unit 11 may be so configured that the RF signal output from the GPS antenna 5 is processed as an analog signal, the processed analog signal is finally converted into a digital signal through A/D conversion, and the digital signal is output to the baseband processing circuit unit 20.

In the latter case, for example, the RF receiving circuit unit 11 may be configured as follows. That is, the RF receiving circuit unit 11 generates an oscillation signal for multiplying the RF signal by dividing or multiplying a specified oscillation signal. Further, the RF receiving circuit unit 11 down-converts the RF signal into an IF (Intermediate Frequency) signal by multiplying the RF signal output from the GPS antenna 5 by the generated oscillation signal, amplifies the IF signal, and then converts the IF signal into a digital signal through an A/D converter to output the digital signal to the baseband processing circuit unit 20.

The baseband processing circuit unit 20 is a processing circuit block which acquires the GPS satellite signal by performing a correlation process or the like with respect to the received signal output from the RF receiving circuit unit 11, and calculating the position (position coordinates) of the mobile phone 1 by performing a specified position calculation based on satellite orbit data or time data extracted from the GPS satellite signal.

In this embodiment, the baseband processing circuit unit 20 functions as a correlation operation unit (a correlator) performing a correlation operation of the received GPS satellite signal and a replica code, a determination unit determining the reliability of the received signal according to a specified determination standard based on the correlation value output from the correlation operation unit, and a changing unit changing the determination standard according to the GPS satellite. The baseband processing circuit unit 20 may be called a received signal reliability determination device.

The host processing unit 30 is a processor totally controlling respective units of the mobile phone 1 according to various kinds of programs such as a system program stored in the storage unit 80. The host processing unit 30 makes a display unit 50 display a map that indicates the current position based on the position coordinates acquired from the baseband processing circuit unit 20, or uses the position coordinates in processing various kinds of applications.

The operation unit 40, for example, is an input device that is configured by a touch panel or button switches, and outputs a signal of a pressed key or button to the host processing unit 30. By the operation of this operation unit 40, various kinds of instruction inputs, such as a call request, a mail transmission/reception request, a position calculation request, and the like, are made.

The display unit 50 is a display device that is configured by an LCD (Liquid Crystal Display) or the like, and performs various kinds of display based on a display signal input from the host processing unit 30. On the display unit 50, a position display screen or time information is displayed.

The antenna 60 for a mobile phone is an antenna that performs transmission/reception of a wireless signal for a mobile phone between wireless base stations installed by a communication service provider of the mobile phone 1.

The wireless communication circuit unit 70 for a mobile phone is a communication circuit unit of a mobile phone that includes an RF conversion circuit, a baseband processing circuit, and the like, and realizes a call or transmission/reception of a mail by performing modulation/demodulation of a wireless signal for a mobile phone.

The storage unit 80 is a storage device that stores a system program for the host processing unit 30 to control the mobile phone 1, various kinds of programs or data for executing various kinds of application processes.

The timepiece unit 90 is an internal timepiece of the mobile phone 1, and includes an oscillation circuit such as a crystal oscillator. The time measurement time of the timepiece unit 90 is output to the baseband processing circuit unit 20 and the host processing unit 30 at any time.

3-2. Circuit Configuration of the Baseband Processing Circuit Unit

Figure 39:
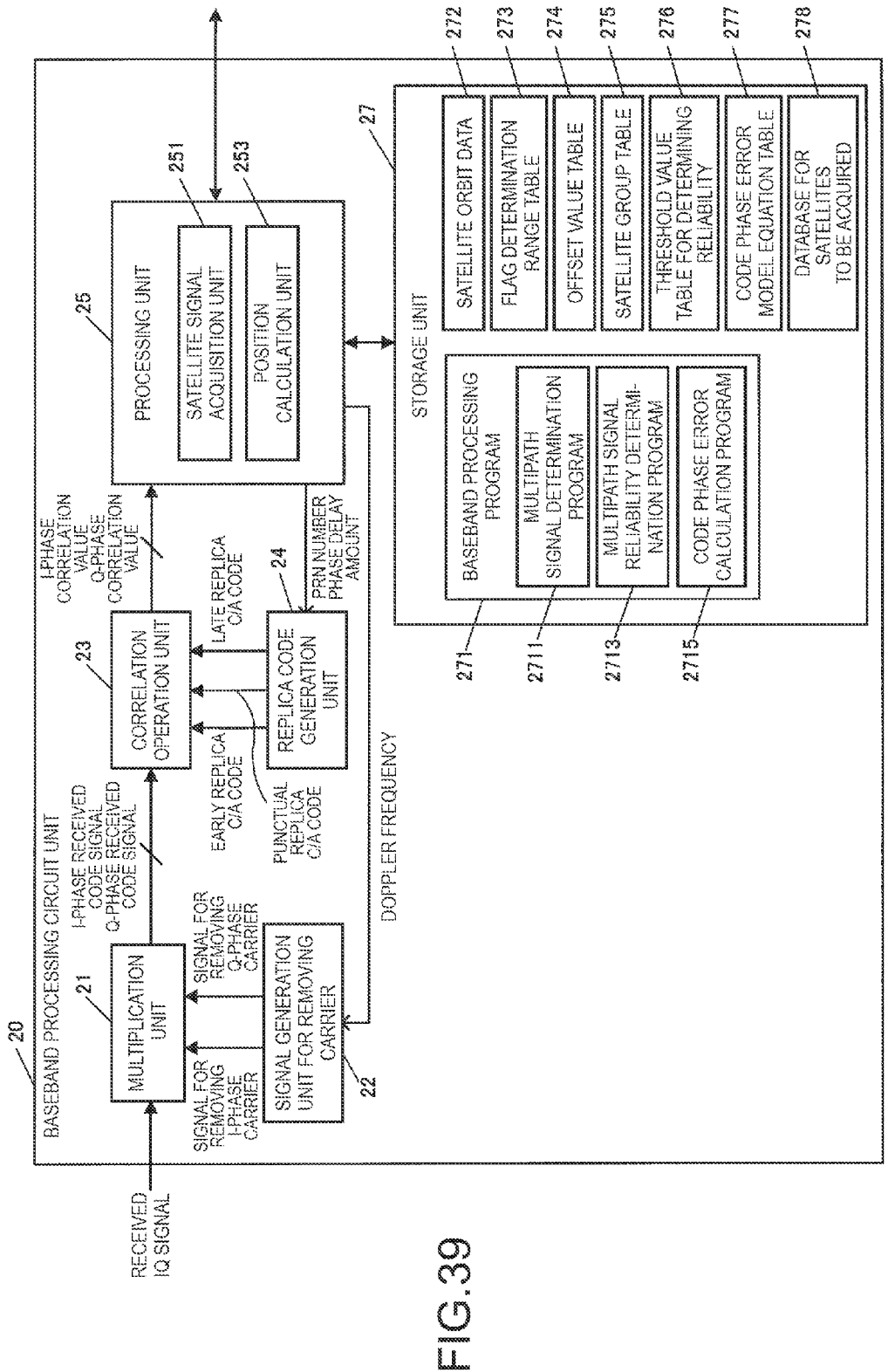
FIG. 39 is a block diagram illustrating an example of a circuit configuration of a baseband processing circuit unit.

FIG. 39 is a diagram illustrating an example of a circuit configuration of the baseband processing circuit unit 20. In FIG. 39, the circuit blocks according to this embodiment are mainly illustrated. The baseband processing circuit unit 20, for example, includes a multiplication unit 21, a signal generation unit 22 for removing a carrier, a correlation operation unit 23, a replica code generation unit 24, a processing unit 25, and a storage unit 27.

The multiplication unit 21 is a circuit unit that removes a carrier from a received IQ signal by multiplying the received IQ signal, which corresponds to an I-phase and Q-phase received signals, by a signal for removing a carrier that is generated by the signal generation unit 22 for removing the carrier, and includes a multiplier and the like.

Further, although a circuit block that performs separation of IQ components (IQ separation) of the received signal is not illustrated, for example, the IQ separation can be performed by multiplying the received signal by a local oscillator signal having a 90° different phase when the received signal is down-converted into an IF signal in the RF receiving circuit unit 11. Further, if the signal output from the RF receiving circuit unit 11 is the IF signal, a signal for removing a carrier having an IF frequency may be generated. As described above, even in the case where the RF receiving circuit unit 11 down-converts the received signal into the IF signal, this embodiment is applicable substantially in the same manner.

The signal generation unit 22 for removing a carrier is a circuit that generates a signal for removing a carrier having the same frequency as the frequency of the carrier signal of the GPS satellite signal, and includes an oscillator such as a carrier NCO (Numerical Controlled Oscillator). When the received IQ signal is an IF signal, the signal of the IF frequency is generated. The signal generation unit 22 for removing a carrier generates a signal for removing an I-phase carrier of an I-phase received signal and a signal for removing a Q-phase carrier of the Q-phase received signal, and outputs the generated signals to the multiplication unit 21. The signal for removing the Q-phase carrier is a signal having a phase that is 90° different from the phase of the signal for removing the I-phase carrier.

Since the multiplication unit 21 multiplies the received IQ signal by the signal for removing the carrier that is generated by the signal generation unit 22 for removing the carrier, demodulation (detection) of the received IQ signal is performed and a received code signal, from which the carrier has been removed, is generated and output. That is, since the multiplication unit 21 multiplies the I-phase received signal by the signal for removing the I-phase carrier, the I-phase received code signal is generated, while since the multiplication unit 21 multiplies the Q-phase received signal by the signal for removing the Q-phase carrier, the Q-phase received code signal is generated. The multiplication unit 21 and the signal generation unit 22 for removing the carrier may be called a demodulation unit (detection unit).

The correlation operation unit 23 is a circuit unit that performs a correlation operation of the I-phase and Q-phase received code signals output from the multiplication unit 21 and the replica C/A code generated by the replica code generation unit 24, and includes a plurality of correlators. The correlation operation unit 23 performs the correlation operation of three kinds of replica C/A codes which are generated by the replica code generation unit 24 for each of the received code signal of I-phase and Q-phase, and obtains three kinds of correlation values of "early", "punctual", and "late".

The replica code generation unit 24 is a circuit unit that generates replica C/A codes that are replicas that simulate the C/A codes, and includes an oscillator such as a Code NCO. The replica code generation unit 24 generates three kinds of replica C/A codes of "early", "punctual", and "late" according to the PRN number (satellite number) that is indicated by the processing unit 25, and outputs the replica C/A codes to the correlation operation unit 23.

The processing unit 25 is a control device and operation device that totally controls respective functional units of the baseband processing circuit unit 20, and includes a processor such as a CPU (Central Processing Unit). The processing unit 25 is an important functional unit, and has a satellite signal acquisition unit 251 and a position calculation unit 253.

The satellite signal acquisition unit 251 performs peak determination of the results of correlation operation in the frequency direction and in the phase direction which are output from the correlation operation unit 23, and detects the frequency (received frequency) of the received signal and the phase (code phase) of the received C/A code as measurement information. The measurement information is mainly used in the position calculation, or the like.

The position calculation unit 253 calculates the position of the mobile phone 1 by performing a known position calculation using a pseudo distance by using the measurement information detected and acquired by the satellite signal acquisition unit 251 with respect to the respective captured satellites, and outputs the calculated position to the host processing unit 30.

The storage unit 27 is composed of a storage device (memory), such as a ROM (Read Only Memory), a flash ROM, and a RAM (Random Access Memory), and stores a system program of the baseband processing circuit unit 20, various kinds of programs for realizing various kinds of functions such as a satellite signal acquisition function and a position calculation function, and data. Further, the storage unit 27 has a work area for temporarily storing data being processed, the result of processing, and the like.

Figure 46:
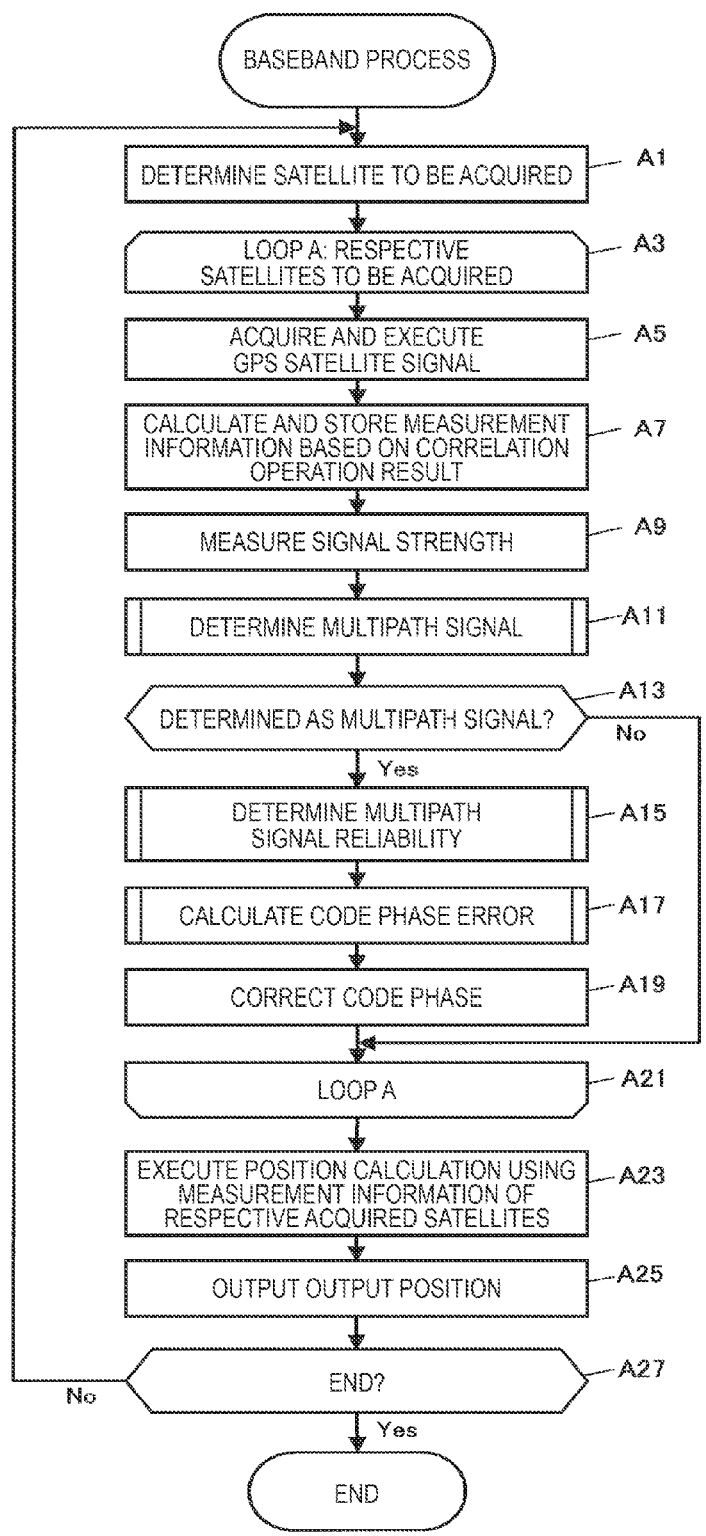
FIG. 46 is a flowchart illustrating a flow of a baseband process.

As illustrated in FIG. 39, the storage unit 27 stores a baseband processing program 271 that is read as a program by the processing unit 25 and is executed as a baseband process (see FIG. 46). The base band processing program 271 includes a multipath signal determination program 2711, a multipath signal reliability determination program 2713, and a code phase error calculation program 2715 as subroutines.

Further, the storage unit 27 stores satellite orbit data 272 as data, a flag determination range table 273, an offset value table 274, a satellite group table 275, a threshold value table 276 for determining reliability, a code phase error model equation table 277, and a database 278 for respective satellites to be acquired.

The satellite orbit data 272 is data of almanac that stores brief satellite orbit information of all GPS satellite or ephemeris that stores detailed satellite orbit information of respective GPS satellites. This satellite orbit data 272, for example, acquires assist data from a base station of the mobile phone 1 or an assist server in addition to acquiring of the GPS satellite signal received from the GPS satellite through decoding.

FIG. 40 is a diagram illustrating an example of the table configuration of a flag determination range table 273. The flag determination range table 273 stores center values of determination ranges A to C to correspond to the respective GPS satellites and corresponding widths in forward and backward directions based on the center values. This flag determination range table 273 is used to determine whether or not the received signal to be determined is a multipath signal in the multipath signal determination process.

Figure 41:
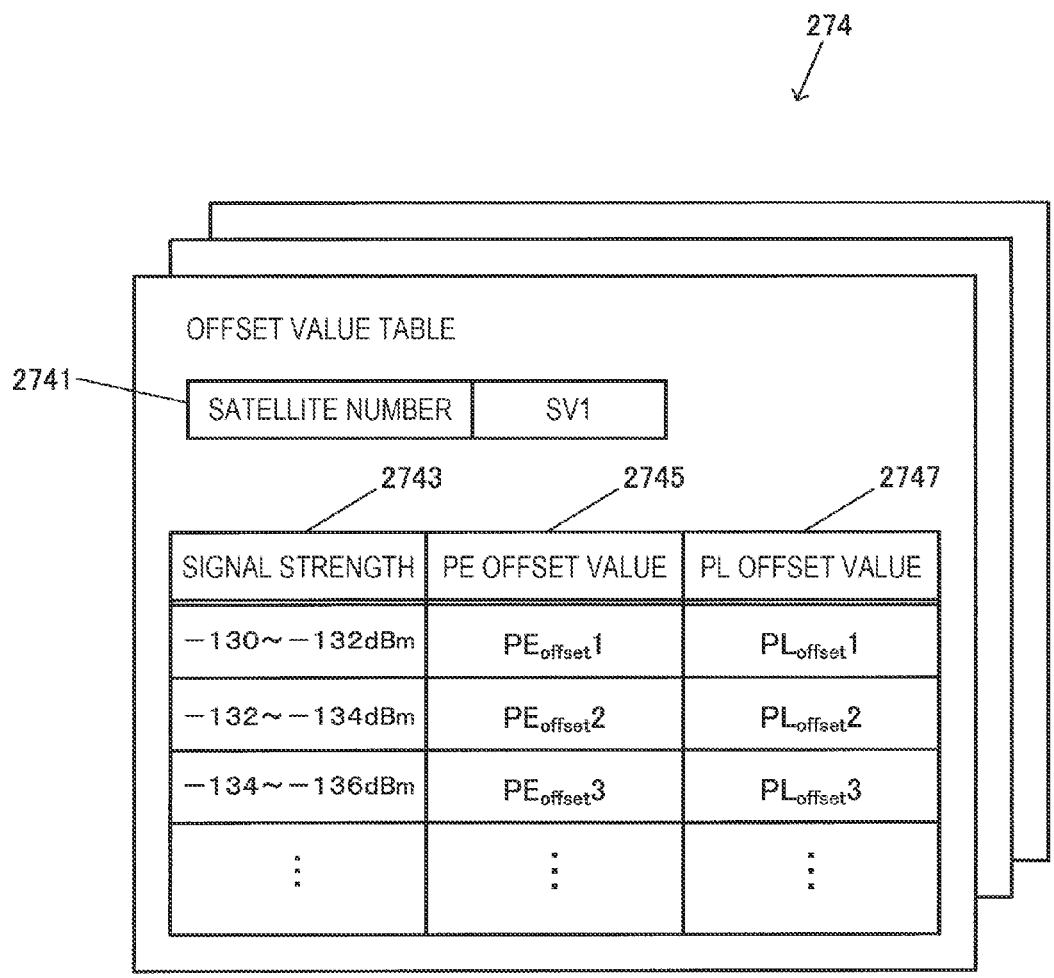
FIG. 41 is a diagram illustrating an example of the configuration of an offset value table.

FIG. 41 is a diagram illustrating an example of the data configuration of an offset value table 274. The offset value table 274 stores PE offset values 2745 and PL offset values 2747 for signal strength 2743 of the received GPS satellite signals to correspond to the respective GPS satellites 2741. These offset values are used to calculate the $\Delta PE$ value and $\Delta PL$ value.

Figure 42:
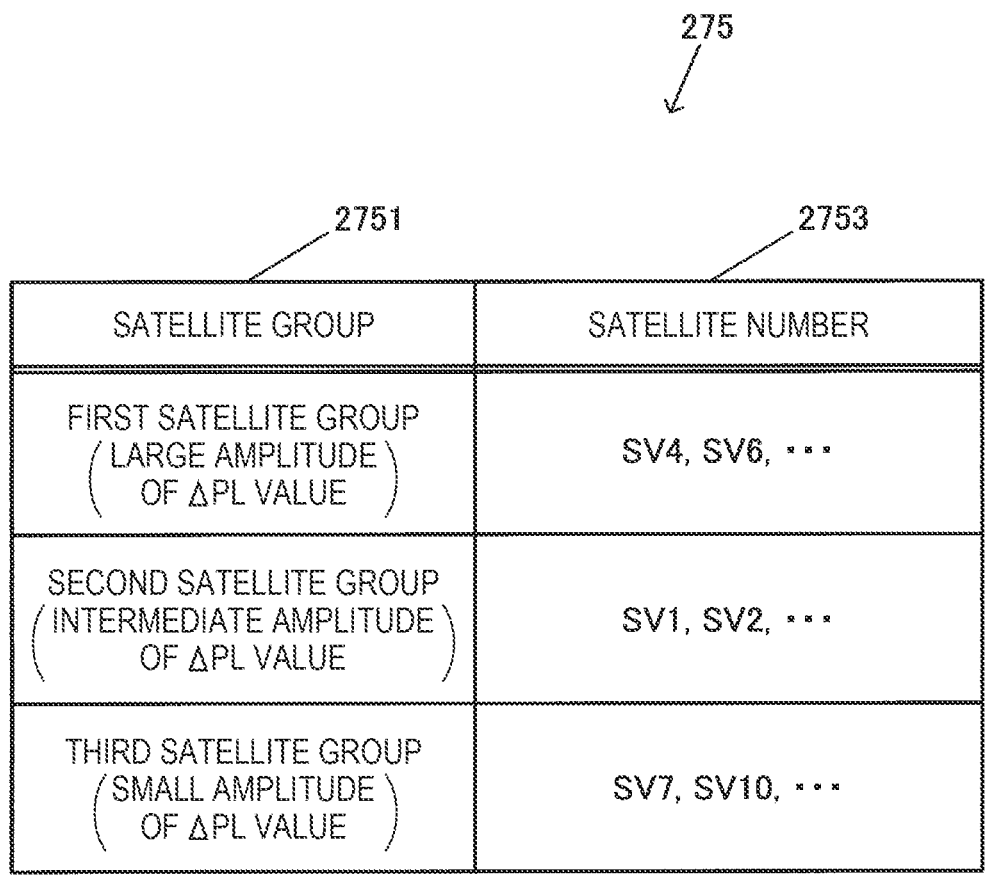
FIG. 42 is a diagram illustrating an example of the configuration of a satellite group table.

FIG. 42 is a diagram illustrating an example of the table configuration of a satellite group table 275. The satellite group table 275 stores satellite groups 2751, and corresponding satellite numbers 2753 of GPS satellites that belong to the corresponding satellite group. This satellite group table 275 is used to determine which satellite group the satellite to be acquired belongs to.

FIG. 43 is a diagram illustrating an example of the table configuration of a threshold value table 276 for determining reliability. The threshold value table 276 for determining reliability stores satellite groups 2761, a corresponding first reliability determination threshold value 2763 in the case of $\Delta PE$ value$\geq 0$, and a corresponding second reliability determination threshold value 2765 in the case of $\Delta PE$ value$<0$.

Specifically, as a satellite group 2761, a first satellite group, a second satellite group, and a third satellite group are determined according to the amplitude of the change of the $\Delta PL$ value. Further, as the first reliability determination threshold values 2763 in the case of $\Delta PE$ value$\geq 0$, "$\theta p1$" is determined in the first satellite group, "$\theta p2$" is determined in the second satellite group, and "$\theta p3$" is determined in the third satellite group. The case of $\Delta PE$ value$\geq 0$ is a case where the type of interference between the direct wave signal and the indirect wave signal becomes the increased interference, and in this case, the ΔPL value is changed in the decreasing direction. Due to this, the threshold values are determined so that the size relationship becomes θp1<θp2<θp3.

Further, as the second reliability determination threshold values 2765 in the case of ΔPE value<0, "θm1" is determined in the first satellite group, "θm2" is determined in the second satellite group, and "θm3" is determined in the third satellite group. The case of ΔPE value<0 is a case where the type of interference between the direct wave signal and the indirect wave signal becomes the decreased interference, and in this case, the ΔPL value is changed in the increasing direction. Due to this, the threshold values are determined so that the size relationship becomes θm1>θm2>θm3.

Figure 44:
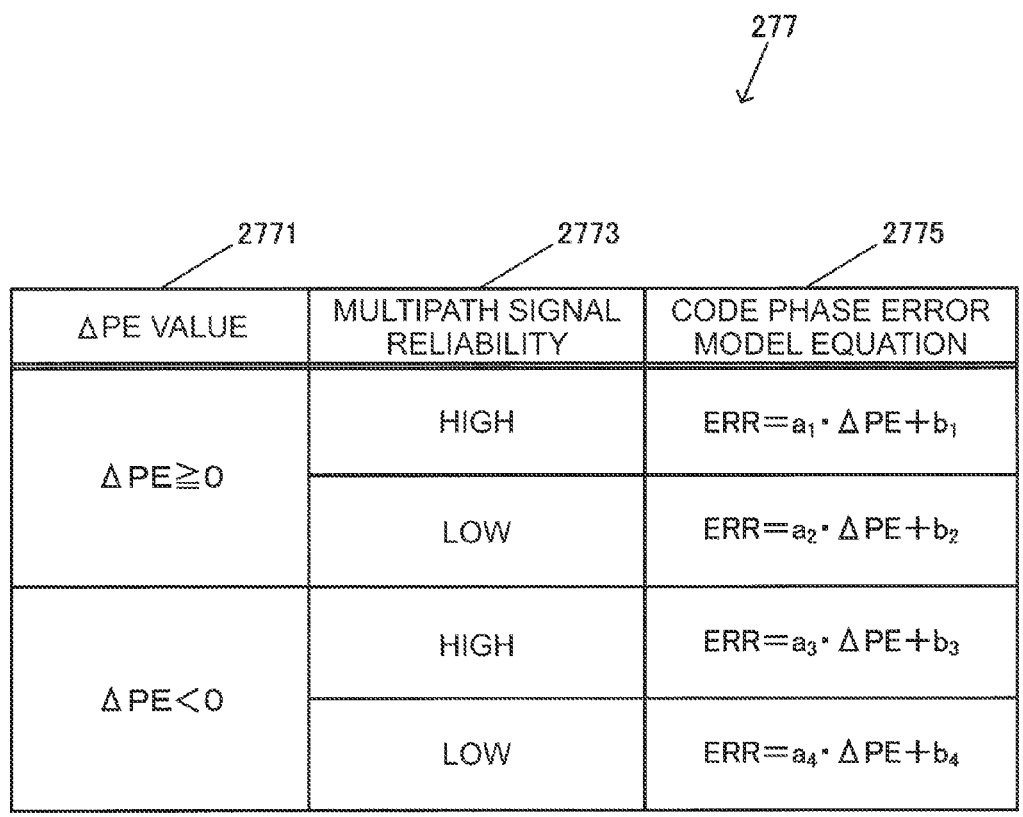
FIG. 44 is a diagram illustrating an example of the configuration of a code phase error model type table.

FIG. 44 is a diagram illustrating an example of the table configuration of a code phase error model equation table 277. The code phase error model equation table 277 stores ΔPE values 2771, reliability 2773 of multipath signals, and corresponding code phase error model equations 2775. Four kinds of code phase error model equations are determined according to a combination of four states of "positive" and "negative" of the ΔPE value and "high" and "low" of the reliability of the multipath signal.

Figure 45:
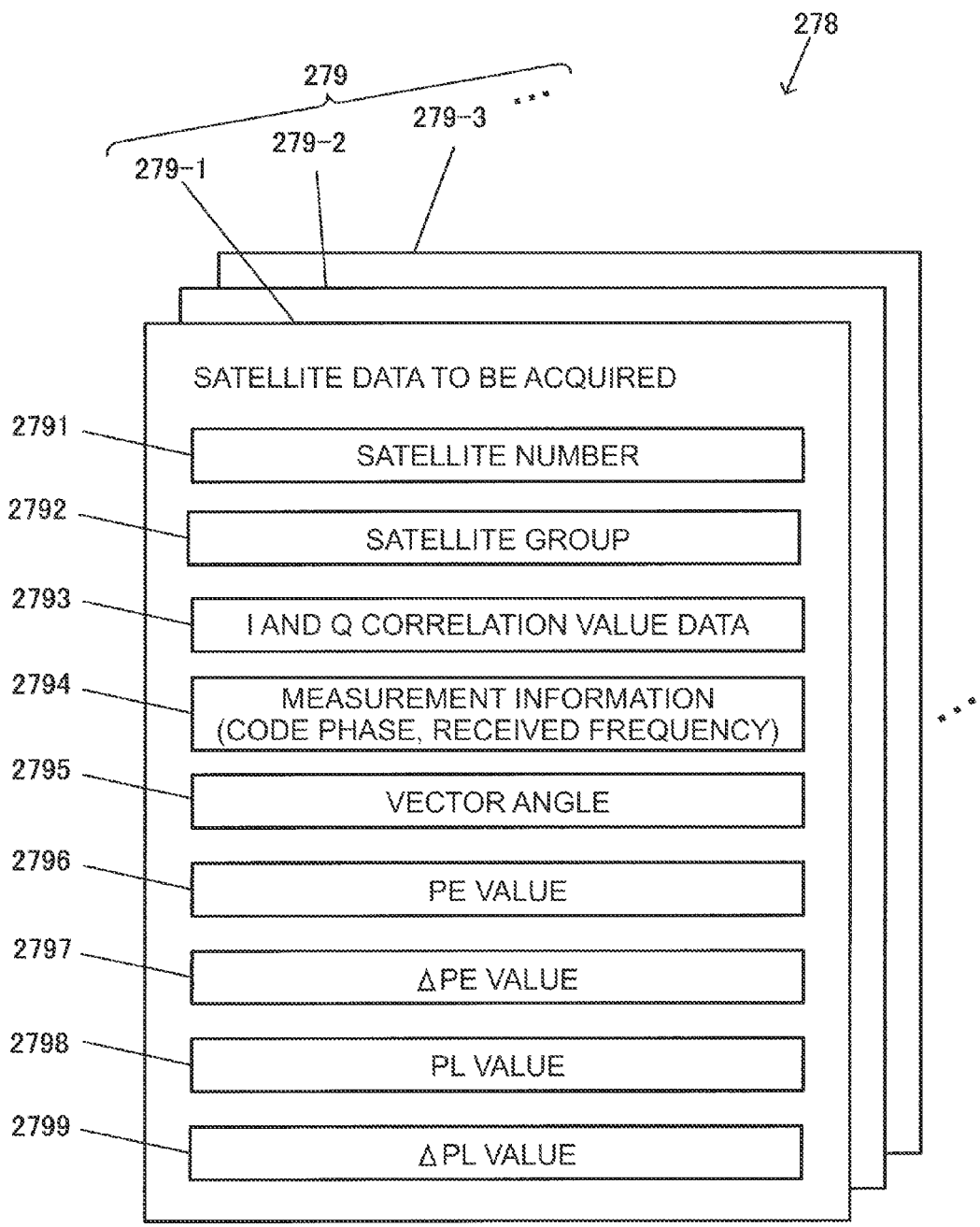
FIG. 45 is a diagram illustrating an example of the configuration of a database for a satellite to be captured.

FIG. 45 is a diagram illustrating an example of the data configuration of a database for satellites to be acquired. The database 278 of satellites to be acquired is a database in which satellite data 279 (279-1, 279-2, 279-3, . . . ) to be acquired, which are data of satellites to be acquired, are accumulatively stored.

As the satellite data 279 to be acquired, identification information of the corresponding satellite to be acquired or various kinds of amounts are stored. Specifically, for example, a satellite number 2791, a satellite group 2792 to which corresponding satellites to be acquired belong, IQ correlation value data 2793, measurement information 2794, a vector angle 2795, a PE value 2796, a ΔPE value 2797, a PL value 2798, and ΔPL value 2799 are stored. This satellite data 279 to be acquired is updated at any time in the baseband process.

3-3. Flow of Processing

FIG. 46 is a flowchart illustrating the flow of the baseband processing that is executed by the processing unit 25 of the baseband processing circuit unit 20 according to the baseband processing program 271 of the storage unit 27.

First, the satellite signal acquisition unit 251 performs determination process of satellites to be acquired (step A1). Specifically, at current time when the timepiece unit 90 measures time, the satellite signal acquisition unit 251 determines GPS satellites positioned in the sky of a specified reference position using the satellite orbit data 272 stored in the storage unit 27, and determines the determined GPS satellite as the satellite to be acquired. The reference position, for example, in the case of a first position calculation after the power supply input, is determined as the position acquired from an assist server through a so-called server assist, and in the case of a second position calculation or later, the reference position may be set by a method of determining the latest calculated position.

Then, the satellite signal acquisition unit 251 executes a process of a loop A with respect to the satellites to be acquired which are determined in step A1 (steps A3 to A21). In the process of loop A, the satellite signal acquisition unit 251 experimentally performs the acquisition of the GPS satellite signal from the corresponding satellite to be acquired (step A5). That is, the satellite signal acquisition unit 251 controls the signal generation unit 22 for removing the carrier and the replica code generation unit 24 to perform the carrier removal and the correlation operation of the received IQ signal output from the RF receiving circuit unit 11.

Then, the satellite signal acquisition unit 251 calculates the measurement information based on the I-phase correlation value and Q-phase correlation value of the satellite to be acquired, and stores the calculated information in the storage unit 27 (step A7). That is, the satellite signal acquisition unit 251 detects the received frequency and a code phase in which the correlation value takes the peak correlation value, and determines the detected frequency and phase as the measurement information of the corresponding satellite to be acquired. Here, the code phase that is acquired as the measurement information is a punctual phase that is considered to coincide with the above-described peak correlation value, and is a code phase that may include the code phase error ERR.

Then, the satellite signal acquisition unit 251 measures the signal strength of the received signal from the corresponding satellite to be acquired (step A9). The signal strength, for example, may be measured as the C/N (Carrier to Noise ratio) ratio. Further, the satellite signal acquisition unit 251 performs the multipath signal determination process according to the multipath signal determination program 2711 that is stored in the storage unit 27 (step A11).

Figure 47:
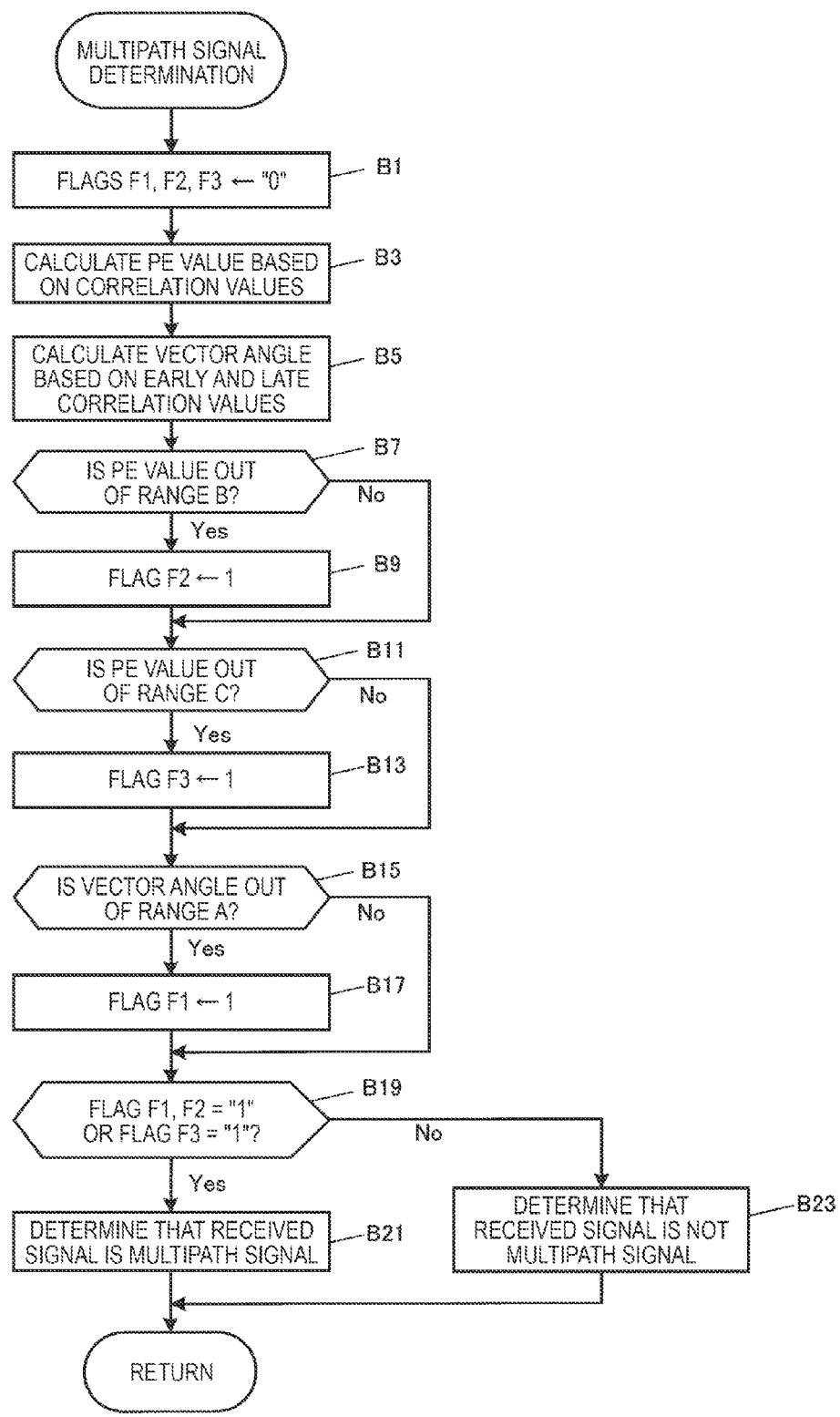
FIG. 47 is a flowchart illustrating a flow of a multipath signal determination process.

FIG. 47 is a flowchart illustrating a flow of a multipath signal determination process.

First, the satellite signal acquisition unit 251 initially sets the whole flags F1 to F3 to "0" (step B1). Further, the satellite signal acquisition unit 251 calculates the PE value by using the result of correlation operation of the corresponding satellite to be acquired that is output from the correlation operation unit 23 (step B3). Further, the satellite signal acquisition unit 251 calculates the vector angle θ based on the early correlation value and the late correlation value output from the correlation operation unit 23 (step B5).

Then, the satellite signal acquisition unit 251 compares the calculated PE value with specified determination ranges B and C with reference to the flag determination range table 273 of the storage unit 27. If the PE value is out of the determination range B ("Yes" in step B7), the satellite signal acquisition unit 251 sets the flag F2 to "1" (step B9), and if the PE value is out of the determination range C ("Yes" in step B11), the satellite signal acquisition unit 251 sets the flag F3 to "1" (step B13). Further, the satellite signal acquisition unit 251 compares the calculated vector angle θ with a specified determination range A, and if the calculated vector angle is out of the determination range A ("Yes" in step B15), it sets the flag F1 to "1" (step B17).

Further, the satellite signal acquisition unit 251 determines whether or not the received signal from the corresponding satellite to be acquired is the multipath signal based on the set values of the flags F1 to F3. That is, if at least one of "condition A: Flags F1 and F2 are all "1"" and "condition B: Flag F3 is "1"" is satisfied ("Yes" in step B19), the satellite signal acquisition unit 251 determines that the received signal is the multipath signal (step B21), while if both conditions are not satisfied ("No" in step B19), the satellite signal acquisition unit 251 determines that the received signal is not the multipath signal (step B23). Further, the satellite signal acquisition unit 251 finishes the multipath signal determination process.

After returning to the baseband process in FIG. 46 and performing the multipath signal determination process, the satellite signal acquisition unit 251 performs the multipath signal reliability determination process according to the multipath signal reliability determination program 2713 that is stored in the storage unit 27 (step A15) if it determines that the received signal from the corresponding satellite to be acquired is the multipath signal ("Yes" in step A13).

Figure 48:
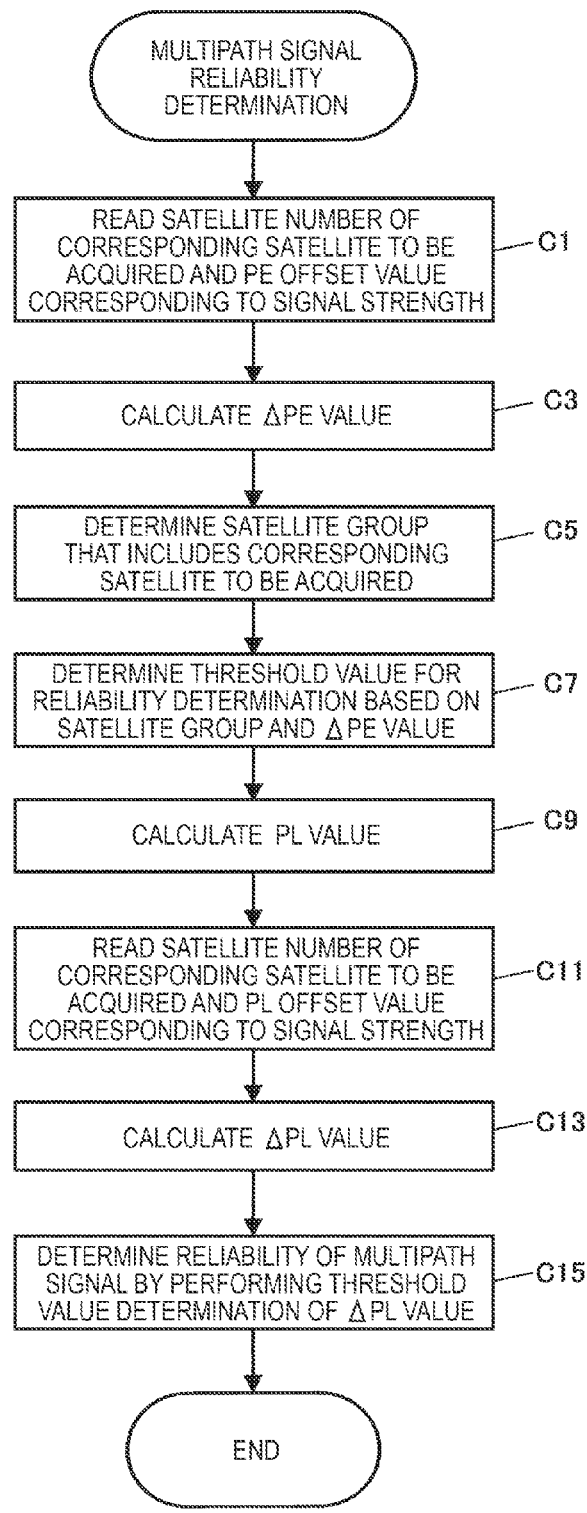
FIG. 48 is a flowchart illustrating a flow of a multipath signal reliability determination process.

FIG. 48 is a flowchart illustrating the flow of the multipath signal reliability determination process.

First, the satellite signal acquisition unit 251 reads the satellite number 2741 of the corresponding satellite to be acquired and the PE offset value 2745 that corresponds to the signal strength 2743 of the corresponding satellite to be acquired that is measured in step A9 (step C1). Then, the satellite signal acquisition unit 251 calculates the ΔPE value by subtracting the PE offset value 2745 from the PE value calculated in step B3 (step C3).

Then, the satellite signal acquisition unit 251 determines the satellite group 2751 that corresponds to the satellite number 2753 of the corresponding satellite to be acquired with reference to the satellite group table 275 of the storage unit 27 (step C5). Then, the satellite signal acquisition unit 251 determines the reliability determination threshold value based on the determined satellite group 2751 and the ΔPE value that is calculated in step C3 with reference to the reliability determination threshold value table 276 of the storage unit 27 (step C7).

Thereafter, the satellite signal acquisition unit 251 calculates the PL value using the correlation value of the corresponding satellite to be acquired (step C9). Then, the satellite signal acquisition unit 251 reads the satellite number 2741 of the corresponding satellite to be acquired and the PL offset value 2747 that corresponds to the signal strength 2743 of the corresponding satellite to be acquired that is measured in step A9 (step C11). Then, the satellite signal acquisition unit 251 calculates the ΔPL value by subtracting the PL offset value 2747 from the PL value (step C13).

Then, the satellite signal acquisition unit 251 determines the reliability of the received multipath signal by performing the threshold value determination using the reliability determination threshold value that is determined in step C7 with respect to the ΔPL value calculated in step C13 (step C15). Then, the satellite signal acquisition unit 251 finishes the multipath signal reliability determination process.

After returning to the baseband process in FIG. 46 and performing the multipath signal reliability determination process, the satellite signal acquisition unit 251 performs the code phase error calculation process according to the code phase error calculation program 2715 stored in the storage unit 27 (step A17).

Figure 49:
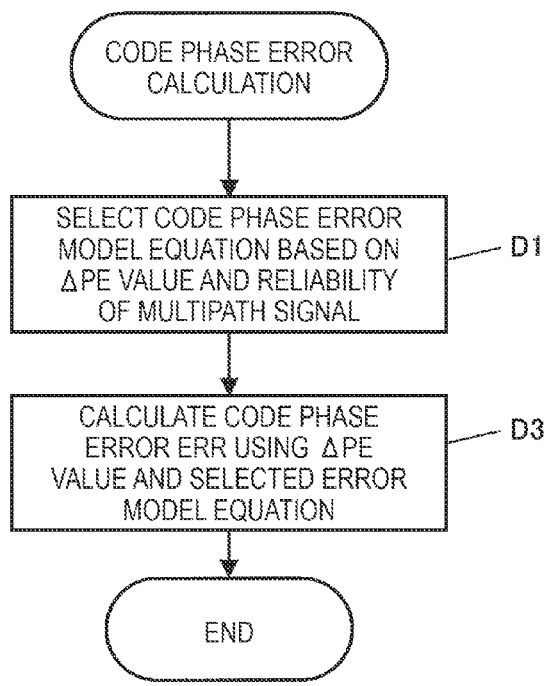
FIG. 49 is a flowchart illustrating a flow of a code phase error calculation process.

FIG. 49 is a flowchart illustrating the flow of the code phase error calculation process.

First, the satellite signal acquisition unit 251 selects the ΔPE value 2771 calculated in step C3 and the code phase error model equation 2775 that corresponds to the multipath signal reliability 2773 that is determined in the multipath signal reliability determination process with reference to the code phase error model equation table 277 of the storage unit 27 (step D1).

Then, the satellite signal acquisition unit 251 calculates the code phase error ERR by substituting the ΔPE value in the code phase error model equation 2775 selected in step D1 (step D3). Then, the satellite signal acquisition unit 251 finishes the code phase error calculation process.

After returning to the baseband process in FIG. 46 and performing the code phase error calculation process, the satellite signal acquisition unit 251 corrects the code phase by subtracting the code phase error ERR calculated in the code phase error calculation process from the code phase included in the measurement information calculated in step A7 (step A19). Then, the satellite signal acquisition unit 251 shifts the process to the next satellite to be acquired.

At this time, if it is determined that the received signal is not the multipath signal ("No" in step A13), the satellite signal acquisition unit 251 shifts the process to the next satellite to be acquired. That is, the satellite signal acquisition unit 251 does not correct the code phase with respect to the satellite to be acquired that is determined the received signal is not the multipath signal, and uses the code phase as it is in the position calculation.

After performing the process of steps A5 to A19 with respect to all the satellites to be acquired, the satellite signal acquisition unit 251 finishes the process of the loop A (step A21). Thereafter, the position calculation unit 253 executes the position calculation using the measurement information of the acquired satellites (step A23). Specifically, the position calculation unit 253 calculates the pseudo distance using the code phase that is corrected in step A19 with respect to the acquired satellite that is determined the received signal is the multipath signal, and calculates the pseudo distance using the code phase that is calculated in step A7 with respect to the acquired satellite that is determined the received signal is not the multipath signal. Then, using the pseudo distance, the position calculation unit 253 calculates the position of the mobile phone 1 by performing convergent calculation using the least-square method or a Kalman filter.

Thereafter, the position calculation unit 253 outputs the calculated position to the host processing unit 30 as the output position (step A25). Then, the position calculation unit 253 determines whether to finish the process (step A27), and if the process is not finished ("No' in step A27), it returns to step A1. Further, if the process is finished ("Yes" in step A27), it finishes the baseband process.

4. Working Effects

According to this embodiment, the correlation operation of the received GPS satellite signal and the replica code is performed. Then, the ΔPL value, which is the index value of the delay distance with respect to the direct wave signal of the indirect wave signal that is included in the multipath signal, is calculated using the peak correlation value (first correlation value) of the peak phase obtained through the correlation operation and the correlation value (second correlation value) of the phase that is delayed for a specified phase from the peak phase. Then, the reliability of the received signal is determined in consideration of "high" and "low" of the ΔPL value against the specified threshold value for reliability determination as the determination standard. In this case, the threshold value for the reliability determination is changed according to a predetermined phase group.

In the multipath signal, since the propagation distance from the GPS satellite to the GPS receiver is longer than the direct wave signal, the indirect wave signal becomes a delayed signal with respect to the direct wave signal. Because of this, if the received signal is the multipath signal, the influence of the indirect wave signal on the phase that is delayed from the peak phase appears, and the correlation value becomes a somewhat large value. Due to this, by calculating the ΔPL value, the degree of influence that the indirect wave signal exerts on the direct wave signal can be determined, and thus good or bad of the received signal can be determined.

Further, the degree of influence that the indirect wave signal exerts on the direct wave signal may differ according to the GPS satellite. Because of this, in this embodiment, the GPS satellites are classified into three satellite groups according to the amplitude of the increase and decrease change of the ΔPL value in the case of calculating the ΔPL value by changing the phase difference between the direct wave signal and the indirect wave signal. Further, the threshold value for reliability determination is changed for each satellite group. Accordingly, the reliability of the received signal can be determined more accurately.

5. Modified Example

The applicable embodiments of the invention are not limited to the above-described embodiments, and can be appropriately modified within the range that does not depart from the scope of the invention.

5-1. Purpose of Reliability of the Received Signal

The purpose of the reliability of the received signal that is determined in the above-described embodiment is not limited to the calculation of the code phase error. For example, based on the reliability of the received signal, an inadequate positioning satellite that is a satellite inadequate to the position calculation may be determined. For example, the GPS satellite of which the reliability of the received signal is determined to be "low" is determined as the inadequate positioning satellite. The GPS satellite signal that is received from the inadequate positioning satellite is not used for position calculation, and the position calculation may be performed using only the GPS satellite signals received from the GPS satellites that are not determined as the inadequate positioning satellite. Even in this case, the accuracy of the position calculation can be improved.

5-2. Setting of Reliability of the Received Signal

In the above-described embodiment, the reliability is classified into "high" and "low" according to whether the $\Delta PL$ value is equal to or larger than the threshold value for reliability determination or is smaller than the threshold value for reliability determination. However, the reliability may be classified more precisely. Since the reliability of the received signal becomes higher as the $\Delta PL$ value becomes larger, the reliability determination of the received signal in a gradual manner can be realized by setting the threshold values for reliability determination in a gradual manner.

Even in this case, it is sufficient if the plural kinds of code phase error model equations according to the reliability of the received signal are prescribed, the code phase error model equation according to the reliability of the received signal is selected, and the code phase error ERR is calculated. Further, even in the case of applying the technique of determining the inadequate positioning satellite based on the reliability of the received signal as described above, it is sufficient if the inadequate positioning satellites are selected successively from the satellite having low reliability of the received signal.

5-3. Setting of the Threshold Value for Reliability Determination

In the above-described embodiment, it is exemplified that the threshold value for reliability determination is determined for each satellite group. However, the threshold value for reliability determination may be determined for each satellite rather than each satellite group.

Specifically, in the above-described embodiment, the satellites are classified into three satellite groups according to the amplitude of increase and decrease change of the $\Delta PL$ value. However, the amplitude of increase and decrease change of the $\Delta PL$ value differs for each satellite. Due to this, it is also possible to perform the reliability determination of the received signal by setting the threshold value for reliability determination for each satellite through more precise classification of the amplitude of increase and decrease change of the $\Delta PL$ value of each satellite. In the case of classifying the satellites into satellite groups, it is not necessary that the satellites are classified into three satellite groups, and the number of satellite groups can be appropriately changed.

5-4. PE Value and a Method of Calculating the PE Value

Figure 50:
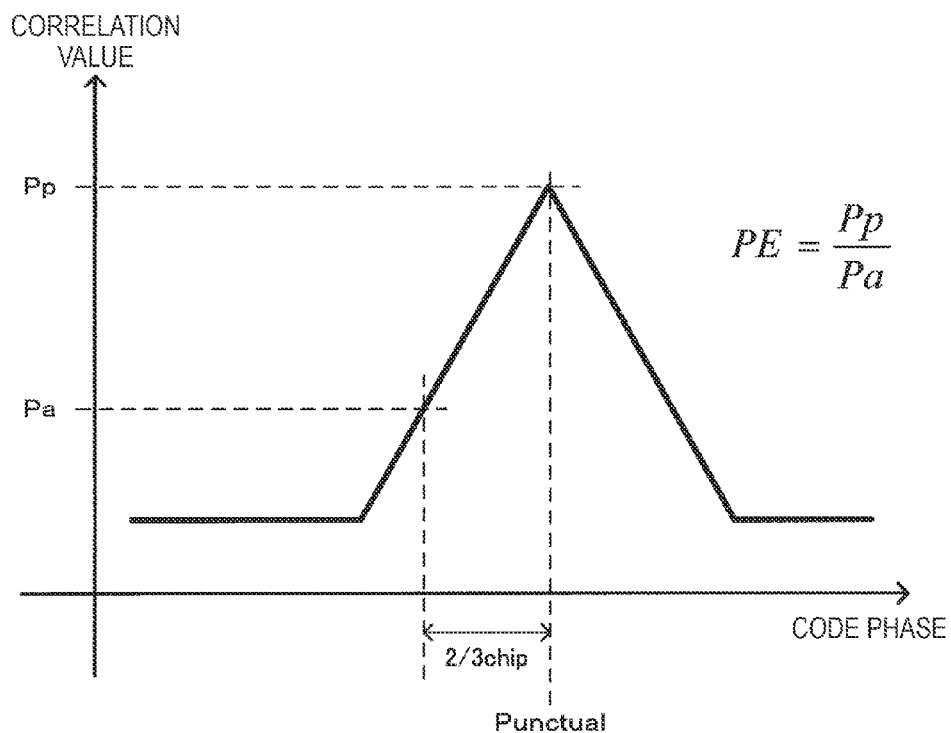
FIG. 50 is an explanatory diagram of a method of calculating a PE value according to a modified example.

The method of calculating the PE value and the PL value as described above according to the above-described embodiment can be provided as follows. FIG. 50 is an explanatory diagram of a method of calculating a PE value according to a modified example. In FIG. 8, the PE value is calculated using a punctual correlation value Pp, a correlation value Pn of a phase that is advanced by one chip or more from the punctual phase, and a correlation value Pa of a phase that is advanced by N chips from the punctual phase. However, the PE value may be calculated according to the following equation (7) without using the correlation value Pn.

$$PE=Pp/Pa \qquad (7)$$

Figure 51:
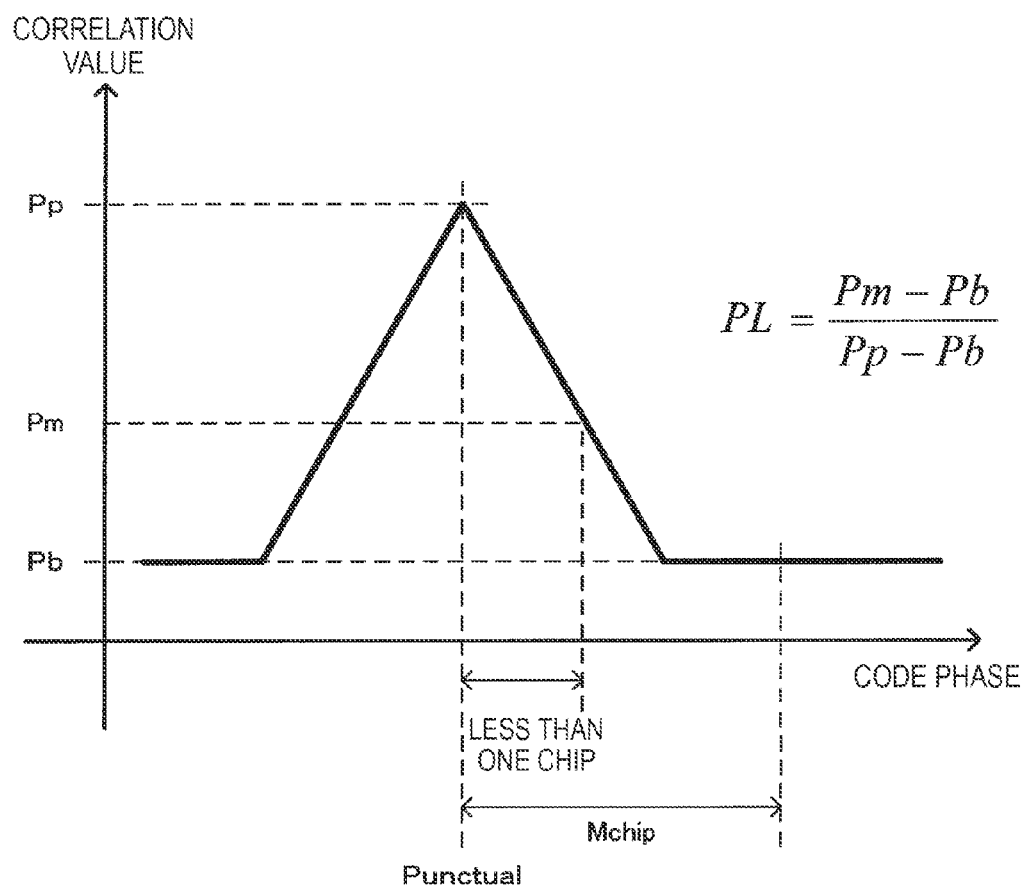
FIG. 51 is an explanatory diagram of a method of calculating a PL value according to a modified example.

FIG. 51 is an explanatory diagram of a method of calculating a PL value according to a modified example. In FIG. 18, the PL value is calculated using a punctual correlation value Pp and a correlation value Pb of a phase that is delayed by M chips from the punctual phase. However, the PL value may be calculated according to the following equation (8) in combination with the correlation value Pm of a phase that is delayed for less than one chip from the punctual phase.

$$PL=(Pm-Pb)/(Pp-Pb) \qquad (8)$$

5-5. Index Value

In the above-described embodiment, the $\Delta PL$ value is used as the index value of the delay distance of the indirect wave signal that is included in the multipath signal to the direct wave signal, and the $\Delta PE$ value is used as the index value of the types of interference between the direct wave signal and the indirect wave signal. However, in practice, even the PL value and the PE value may indicate the same time variation as the $\Delta PL$ value and $\Delta PE$ value. Because of this, it is also possible to use the PL value as the index value of the delay distance of the indirect wave signal that is included in the multipath signal to the direct wave signal, and the $\Delta PE$ value is used as the index value of the types of interference between the direct wave signal and the indirect wave signal.

5-6. Code Phase Error Model Equation

In the above-described embodiment, the code phase error model equation that indicates the relationship between the $\Delta PE$ value and the code phase error ERR is approximated to a primary function. However, the approximation can be made using various kinds of functions such as a quadratic function over, an exponential function, a logarithmic function, and the like.

5-7. Determination of the Multipath Signal

The method of determining the multipath signal according to the above-described embodiment is merely exemplary, and it is also possible to apply other known techniques. Even if any technique is used, the same effect as the above-described embodiment can be obtained by applying the method of determining the reliability of the received signal and the method of calculating the code phase error according to the above-described embodiment to the received signal that is determined to be the multipath signal.

Further, the determination of the multipath signal may be performed before determining the reliability of the received signal or after determining the reliability of the received signal. In the former case, the multipath determination of the received signal is initially performed, and if it is determined that the received signal is the multipath signal, the reliability determination of the received signal is performed. On the other hand, if it is determined that the received signal is not the multipath signal, the reliability determination of the received signal is not performed.

In the latter case, the reliability determination is initially performed, and thereafter, the multipath determination of the received signal is performed. If it is determined that the received signal is the multipath signal, a pre-calculated reliability is selected. On the other hand, if it is determined that the received signal is not the multipath signal, the pre-calculated reliability is not selected but is deleted.

5-8. Electronic Appliance

In the above-described embodiment, the present invention is applied to a mobile phone that is a kind of electronic appliance. In addition, it is also possible to apply the present invention to other electronic appliances such as a car navigation device, a portable navigation device, a PC, a PDA (Personal Digital Assistants), and a watch in the same manner.

5-9. Satellite Positioning System

Further, in the above-described embodiment, GPS is used as the satellite positioning system. However, for example, it is also possible to apply the invention to other satellite positioning systems so-called GALILEO that uses the same CDMA system as GPS. Further, the application is not limited to the satellite positioning system, and the invention can be applied to a system which outputs a signal that is modulated by a direct spectrum diffusion method, for example, a system that uses a wireless signal of a wireless LAN of the IEEE 802.11b standard as the positioning signal.

5-10. Subject of Processing

Further, in the above-described embodiment, the processing unit of the baseband processing circuit unit performs various kinds of processes. However, the host processing unit that is a processor of an electronic appliance may perform various kinds of processes. Further, the determination of the multipath signal, reliability determination of the received signal, and the code phase error calculation may be performed by the processing unit of the baseband processing circuit unit, and the position calculation may be performed by the host processing unit, so that two processing units can share the processes.

What is claimed is:

1. A method of determining reliability of a received signal, comprising:
    correlating a received signal from a satellite to a replica code;
    determining reliability of the received signal according to a predetermined reference using a first value and a second value, the first value being a correlation value of a peak phase obtained from the correlating and the second value being a correlation value of a phase delayed for a predetermined phase from the peak phase; and
    changing the reference according to the satellite.

2. The method of determining reliability of the received signal according to claim 1, wherein the determining comprises:
    calculating an index value of a delay distance of an indirect wave against a direct wave using the first value and the second value, the indirect wave included in the received signal; and
    determining the reliability of the received signal as the reference which the index value satisfies a predetermined threshold value condition,
    wherein the changing comprises changing the threshold value condition according to the satellite.

3. The method of determining reliability of the received signal according to claim 2, wherein the threshold value condition is a condition determined based on a changing trend of the index value in case of calculating the index value by changing a phase difference between the direct wave and the indirect wave.

4. The method of determining reliability of the received signal according to claim 3, wherein the threshold value condition is determined for each group to which the satellite belongs based on the changing trend.

5. The method of determining reliability of the received signal according to claim 3, wherein a first threshold value condition in case where a type of interference of the indirect wave against the direct wave is an increased interference and a second threshold value condition in case where a type of interference is a decreased interference are determined, and
    the determining comprises detecting the type of the interference using the first value and a third value, the third value being a correlation value having a phase advanced for a predetermined phase from the peak phase, and determining the reliability of the received signal according to the threshold value condition that corresponds to the type of the interference of the first and second threshold value conditions.

6. The method of determining reliability of the received signal according to claim 5, wherein the first threshold value condition is determined so that an amplitude of a change of the index value and a threshold value for the index value have a negative correlation, and the second threshold value condition is determined so that the amplitude of the change of the index value and the threshold value for the index value have a positive correlation.

7. A method of calculating a code phase error, comprising:
    executing a method of determining reliability of the received signal described in claim 1; and
    calculating an error from a true code phase of the peak phase using the reliability determined by the method of determining reliability of the received signal.

8. An apparatus for determining reliability of a received signal, comprising:
    a correlator that correlates a received signal from a satellite to a replica code;
    a determination unit that determines reliability of the received signal according to a predetermined reference using a first value and a second value, the first value being a correlation value of a peak phase obtained by the correlator and the second value being a correlation value of a phase delayed for a predetermined phase from the peak phase; and
    a change unit that changes the reference according to the satellite.

* * * * *